US008904416B2

(12) United States Patent
Harada et al.

(10) Patent No.: US 8,904,416 B2
(45) Date of Patent: Dec. 2, 2014

(54) CONTENT PLAYBACK APPARATUS, CONTENT PLAYBACK METHOD, PROGRAM, AND INTEGRATED CIRCUIT

(75) Inventors: Kumi Harada, Osaka (JP); Noriyo Hara, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 477 days.

(21) Appl. No.: 13/319,840

(22) PCT Filed: Jun. 4, 2010

(86) PCT No.: PCT/JP2010/003751
§ 371 (c)(1),
(2), (4) Date: Nov. 10, 2011

(87) PCT Pub. No.: WO2010/143388
PCT Pub. Date: Dec. 16, 2010

(65) Prior Publication Data
US 2012/0066705 A1    Mar. 15, 2012

(30) Foreign Application Priority Data
Jun. 12, 2009  (JP) .................................. 2009140769

(51) Int. Cl.
*H04H 60/33*    (2008.01)
*H04H 60/56*    (2008.01)
*H04N 21/422*   (2011.01)
*H04N 21/466*   (2011.01)

(52) U.S. Cl.
CPC ..... *H04N 21/42201* (2013.01); *H04N 21/4662* (2013.01)
USPC .............................................. 725/12; 725/10

(58) Field of Classification Search
None
See application file for complete search history.

(56) References Cited

U.S. PATENT DOCUMENTS 8,391,671 B2 *   3/2013  Saito et al. ..................... 386/239
2005/0132401 A1 *  6/2005  Boccon-Gibod et al. ....... 725/34
2013/0329966 A1 * 12/2013  Hildreth ........................ 382/115

FOREIGN PATENT DOCUMENTS

JP    2002-290901    10/2002
JP    3688214         6/2005

(Continued)

OTHER PUBLICATIONS

International Search Report issued Jun. 29, 2010 in corresponding International Application No. PCT/JP2010/003751.

(Continued)

*Primary Examiner* — Nathan Flynn
*Assistant Examiner* — Omar S Parra
(74) *Attorney, Agent, or Firm* — Wenderoth, Lind & Ponack, L.L.P.

(57) ABSTRACT

A content playback apparatus (100) includes: a viewing target content obtaining unit (20) obtaining the viewing target content; a viewer detecting unit (10) detecting a first viewer who views the viewing target content played back by the content playback apparatus; a viewer content selecting unit (204) selecting, from among viewer contents, a viewer content having a matching degree higher than a predetermined threshold, the matching degree indicating an amount of common points between the first viewer detected by the viewer detecting unit and a second viewer who views a same content as the viewing target content under temporally or spatially a different condition, and each of the viewer contents including information of video or sound of the second viewer; and a content playback unit (30) playing back the viewing target content obtained by the viewing target content obtaining unit and the viewer content selected by the viewer content selecting unit.

17 Claims, 34 Drawing Sheets

(56) References Cited

FOREIGN PATENT DOCUMENTS

| JP | 2006-74622 | 3/2006 |
|---|---|---|
| JP | 2008-278228 | 11/2008 |

OTHER PUBLICATIONS

Keita Watanabe et al., "PhotoLoop: Effortless Approach for Creating Natural Video Narration of Slideshows", Human Interface Society Journal, vol. 11, No. 1, 2009, pp. 69-76 (with partial English translation).

Keita Watanabe et al., "PhotoLoop: An annotation system using users' activities while watching slideshows", Human Interface Society Journal, 2007, pp. 1-4 (with partial English translation).

Keita Watanabe et al., "PhotoLoop: An annotation system using users' activities while watching slideshow", Workshop on international systems and software, 2007, pp. 1-4 (with partial English translation).

Extended European Search Report issued Mar. 3, 2014 in corresponding European Application No. 10785920.9.

Keita Watanabe, "PhotoLoop", Nov. 7, 2008, p. 1, XP54975328, Retrieved from the Internet, URL: http://www.youtube.com/watch?v=U8uQ9tKag94, [retrieved on Feb. 18, 2014].

Jason A. Brotherton et al., "Lessons Learned From eClass: Assessing Automated Capture and Access in the Classroom", ACM Transactions on Computer-Human Interaction, vol. 11, No. 2, Jun. 1, 2004, pp. 121-155, XP55103367.

Yoshinobu Tonomura et al., "Content Oriented Visual Interface Using Video Icons for Visual Database Systems", Visual Languages, 1989, IEEE Workshop on Rome, Italy, Oct. 4-6, 1989, Washington, DC, IEEE Comput. Soc. PR, US, Oct. 4, 1989, pp. 68-73, XP010017725.

Yoshinobu Tonomura et al., "Content Oriented Visual Interface Using Video Icons for Visual Database Systems", Journal of Visual Languages and Computing, London, GB, vol. 1, Jan. 1, 1990, pp. 183-198, XP000195706.

Ardhendu Behera et al., "Looking at Projected Documents: Event detection & document identification", 2004 IEEE International Conference on Multimedia and EXPO (ICME) (IEEE Cat. No. 04TH8763), vol. 3, Jan. 1, 2004, p. 2127, XP55103373.

Andy Crabtree et al., "Collaborating around Collections: Informing the Continued Development of Photoware", CSCW 2003, Computer Supported Cooperative Work, Conference Proceedings, Chicago, IL, Nov. 6-10, 2004, ACM Conference on Computer Supported Cooperative Work, New York, NY, ACM, US, Nov. 6, 2004, pp. 396-405, XP002396534.

* cited by examiner

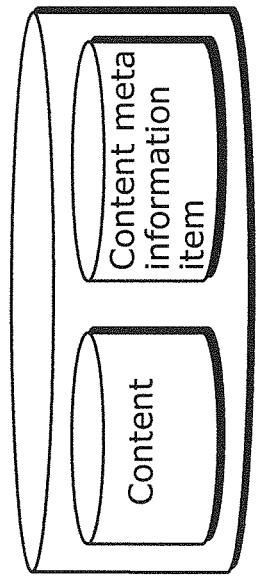

FIG. 3C

| Content A | Picture A1 | Picture A2 | ... | Picture A10 |
|---|---|---|---|---|
| Image-capturing time and date | 2008/5/3 | 2008/5/3 | ... | 2008/5/3 |
| Image-capturing equipment | Camera-z | Camera-z | ... | Camera-z |
| Image-capturing location | ..., Itami city, Osaka prefecture | ..., Okinawa city, Okinawa | ... | ..., Okinawa city, Okinawa |
| Photographer | Father | Father | ... | Unregistered |
| Focal distance | 5mm | 10mm | ... | 5mm |
| Image-capturing mode | Person | Landscape | ... | Person |
| The number of subjects | 1 | 0 | ... | 4 |
| ... | ... | ... | | ... |

Content meta information item (content B)

Content meta information item (content C)

FIG. 4A

| Viewer ID | Facial image | Voice print | Gender | Age | Birthday | Relationship between viewers | Social attribute | Physical information |
|---|---|---|---|---|---|---|---|---|
| User1 | Facial image 1 | Voice print 1 | Male | 40 | January 12, 1969 | Father | Company employee | Body1 |
| User2 | Facial image 2 | Voice print 2 | Female | 38 | February 1, 1971 | Mother | Homemaker | Body2 |
| User3 | Facial image 3 | Voice print 3 | Female | 9 | December 7, 1999 | Daughter | Elementary school student | Body3 |
| User4 | Facial image 4 | Voice print 4 | Female | 75 | February 9, 1934 | Grand mother | Unemployed | Body4 |
| User5 | Facial image 5 | Voice print 5 | Female | 9 | October 1, 1999 | Friend of daughter | Elementary school student | Body5 |
| ... | ... | ... | ... | ... | ... | ... | ... | ... |

FIG. 4B

| Physical information ID | Height | Seated height | Eye height (from head) | Eyesight | Dominant hand | Arm length | ... |
|---|---|---|---|---|---|---|---|
| Body1 | 1.81 | 0.98 | 0.14 | (0.5, 0.1) | Right | 0.50 | ... |
| Body2 | 1.62 | 0.89 | 0.10 | (1.2, 1.0) | Right | 0.41 | ... |
| Body3 | 1.30 | 0.73 | 0.07 | (1.5, 1.2) | Right | 0.28 | ... |
| Body4 | 1.53 | 0.83 | 0.09 | (0.3, 0.4) | Right | 0.38 | ... |
| Body5 | 1.33 | 0.74 | 0.07 | (0.8, 0.7) | Left | 0.29 | ... |
| ... | ... | ... | ... | ... | ... | ... | ... |

FIG. 5

| Viewing target content | A1 | A2 | ... | A10 | |
|---|---|---|---|---|---|
| Viewer content | A1-1 | A2-1 | ... | A10-1 | |
| Viewing time and date | 2008/8/10 | 2008/8/10 | ... | 2008/8/10 | 2008/8/10 |
| Viewing start time | 14:55:07 | 14:55:32 | ... | 15:03:48 | 15:03:55 |
| Viewing time | 25 seconds | 8 seconds | ... | 27 seconds | 7 seconds |
| Viewers | User1,2,3 | User1,2,3 | ... | User1,2,3 | User1,3 |
| The number of viewers | 3 | 3 | ... | 3 | 2 |

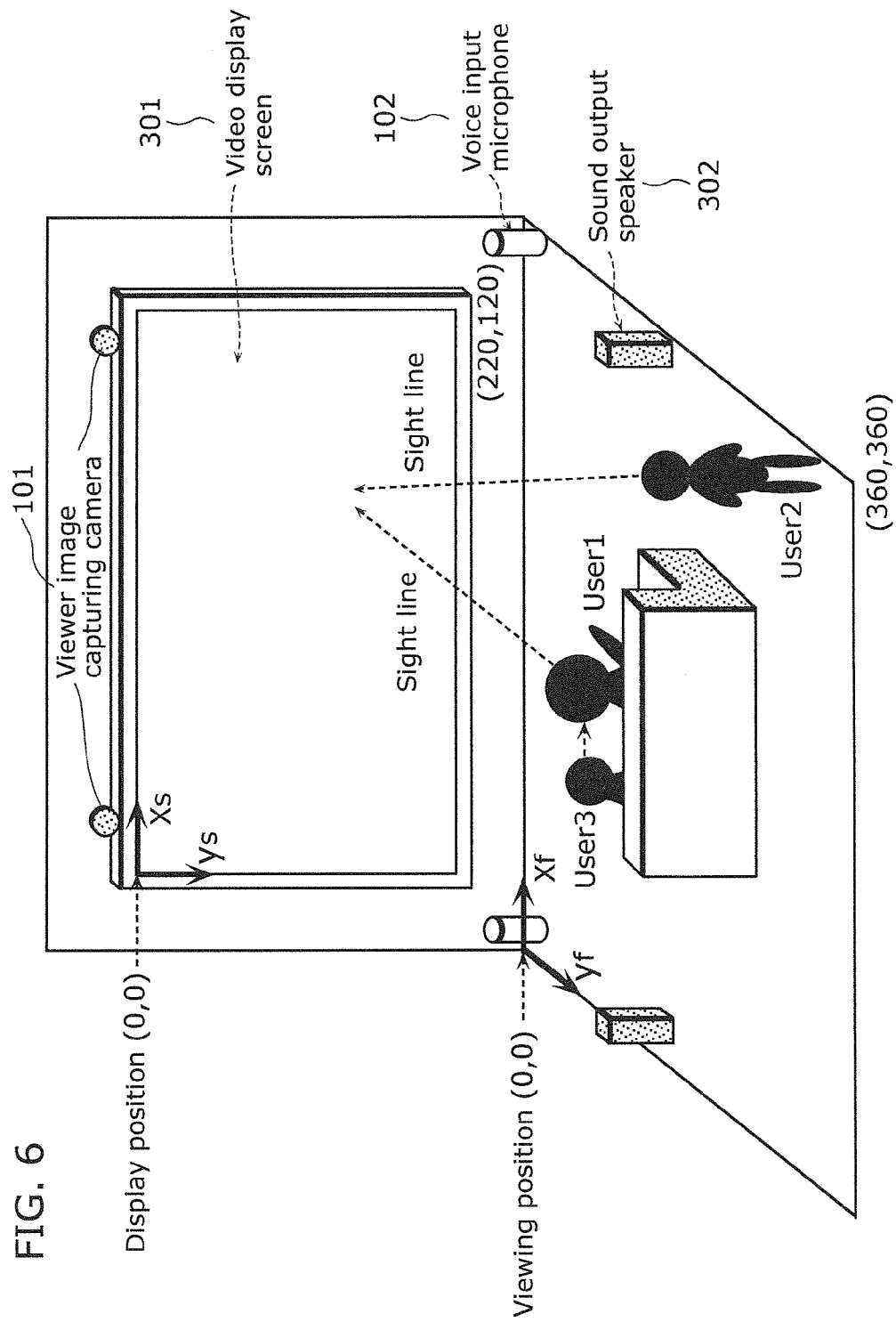

FIG. 7A

| Viewing target content | | A1 | A2 | ... | A10 |
|---|---|---|---|---|---|
| Viewer content | | A1-1 | A2-1 | ... | A10-1 |
| Viewing position | User1 | (230, 200) | (230, 200) | ... | (260, 205) |
| | User2 | (300, 315) | (300, 315) | | (120, 196) |
| | User3 | (160, 320) | (160, 320) | | (180, 330) |
| Posture | User1 | Sitting | Sitting | ... | Sitting |
| | User2 | Standing | Standing | | Sitting |
| | User3 | Sitting | Sitting | | Sitting |
| ... | | ... | ... | ... | ... |

FIG. 7B

| | | | |
|---|---|---|---|
| User1 | Time | 14:55:07 | ... |
| | Orientation of head | 18° | ... |
| | Sight line | (147, 77) | ... |
| User2 | Time | 14:55:07 | ... |
| | Orientation of head | 32° | ... |
| | Sight line | (156, 79) | ... |
| User3 | Time | 14:55:07 | ... |
| | Orientation of head | 87° | ... |
| | Sight line | — | ... |

Video display screen

Video display screen

Video display screen

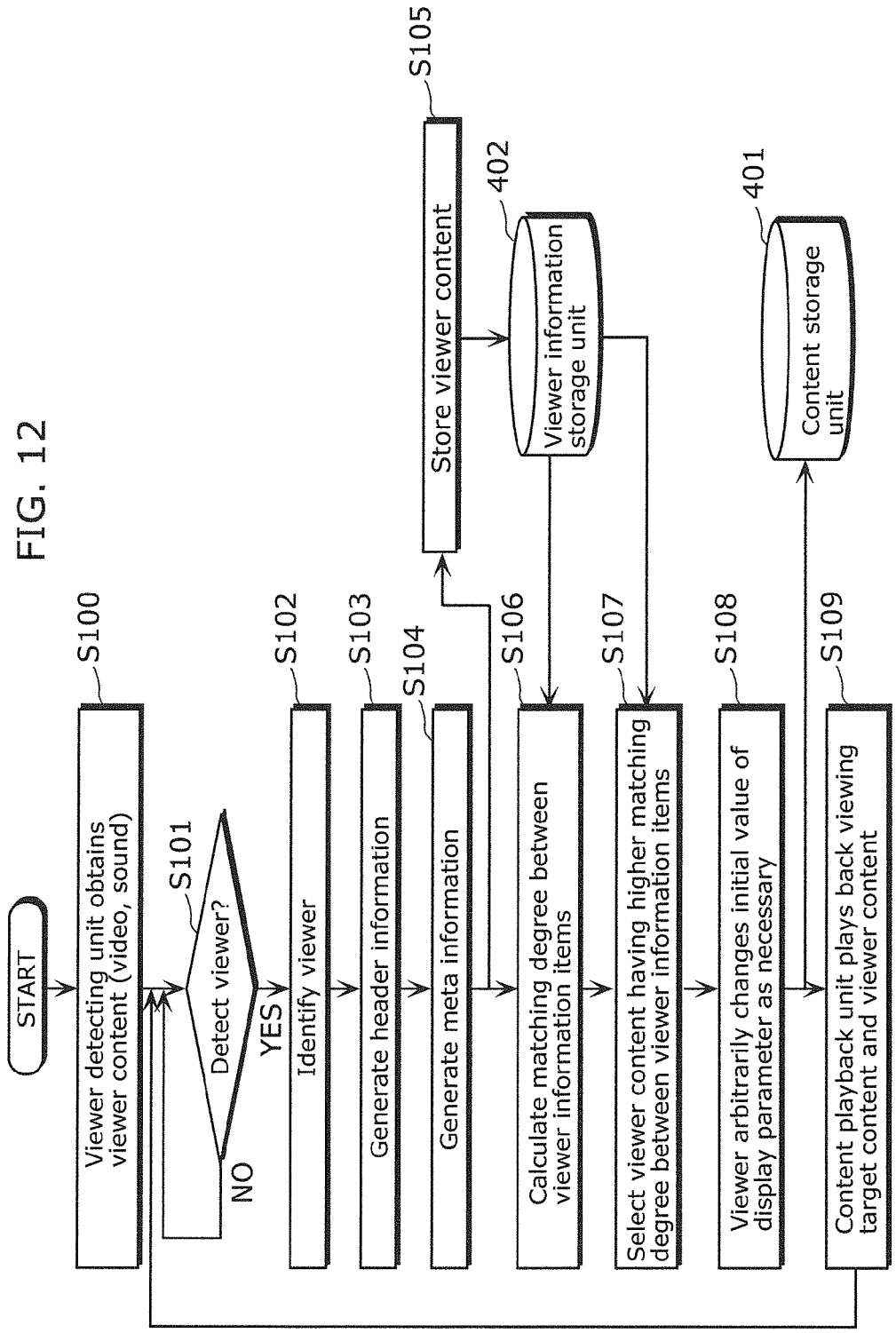

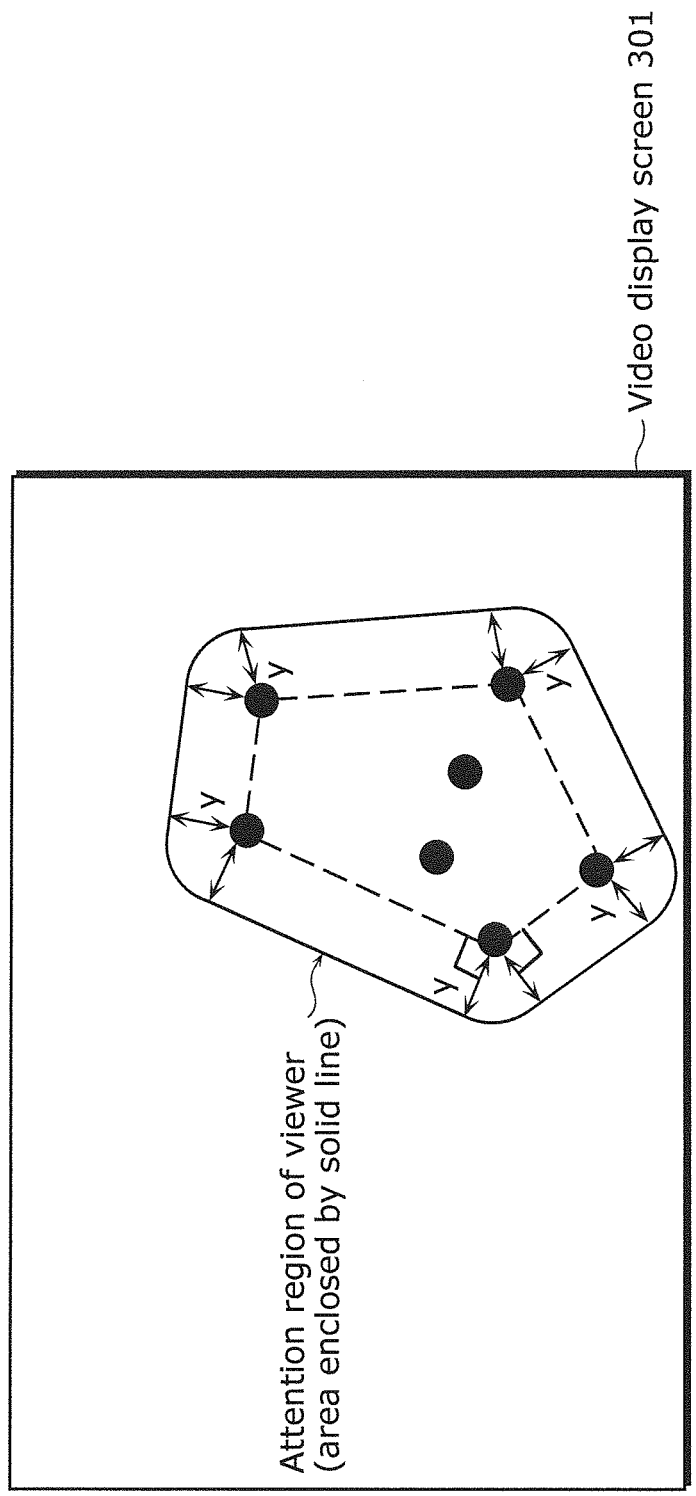

FIG. 25

| Content C | Picture C1 | Picture C2 | Picture C3 | ... | Picture C9 |
|---|---|---|---|---|---|
| Viewer content of viewer group A | C1-1 | C2-1 | C3-1 | ... | C9-1 |
| Viewer content of viewer group B | C2-1 | C2-2 | C3-2 | ... | C9-2 |

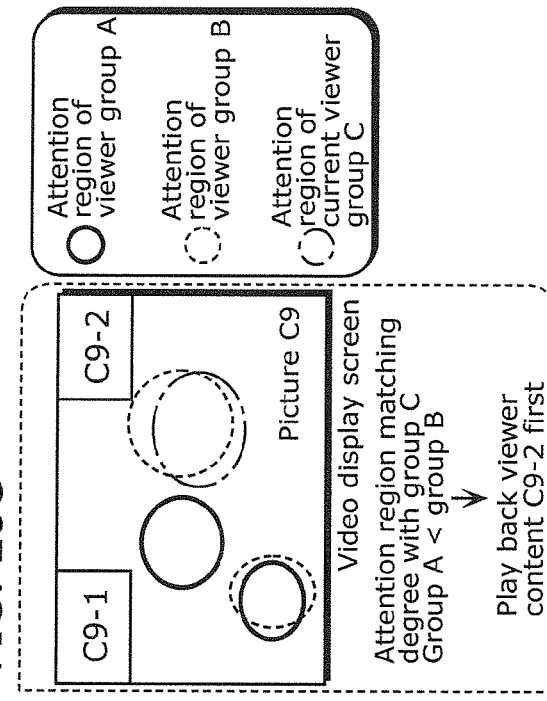
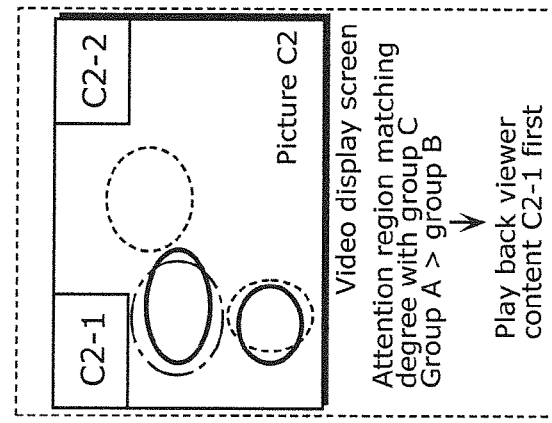
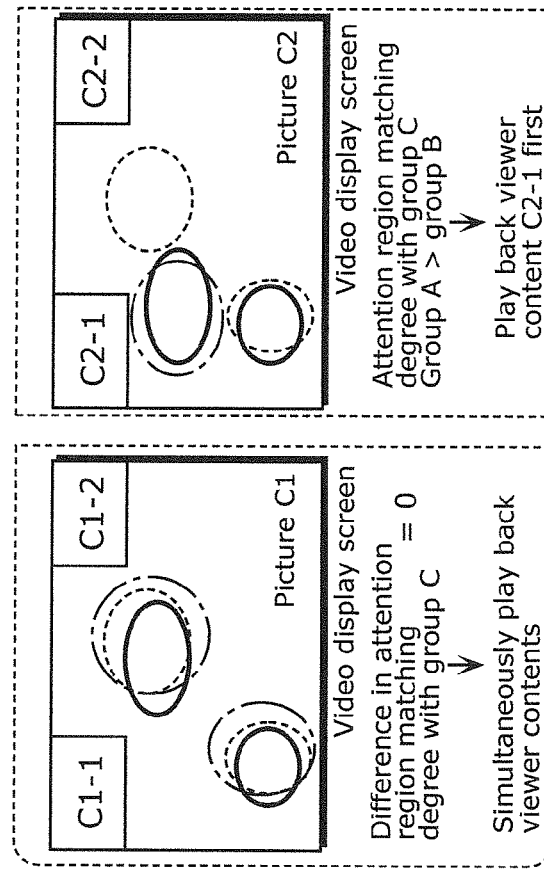
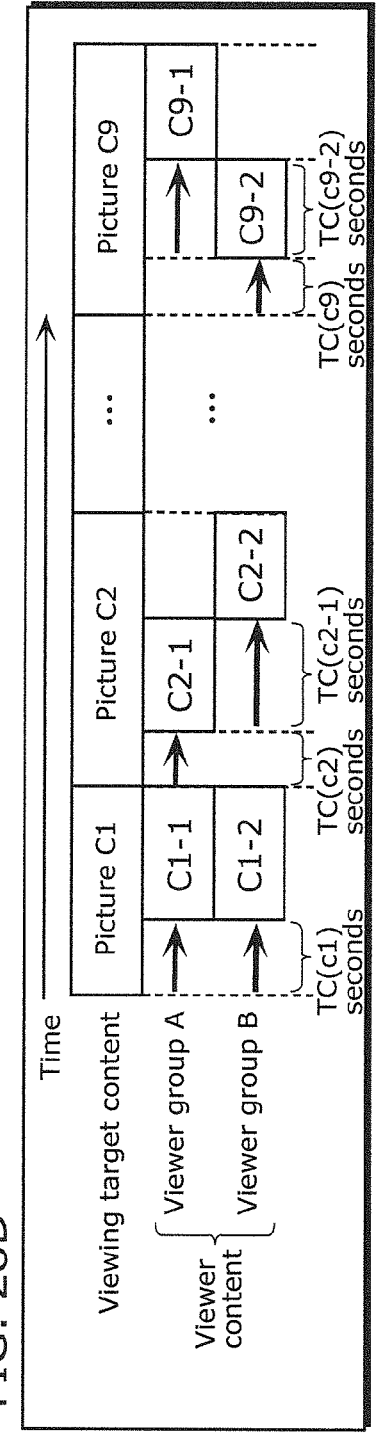

FIG. 29A

| Viewer content | A1-N | A2-N | ... | A10-N | Average (N=1, 2, 3, 4, 5) |
|---|---|---|---|---|---|
| First viewing:A-1 | 25 seconds | 8 seconds | ... | 31 seconds | Ta(A-1) seconds |
| Second viewing:A-2 | 18 seconds | 20 seconds | ... | 27 seconds | Ta(A-2) seconds |
| Third viewing:A-3 | 12 seconds | 5 seconds | ... | 17 seconds | Ta(A-3) seconds |
| Fourth viewing:A-4 | 33 seconds | 39 seconds | ... | 67 seconds | Ta(A-4) seconds |
| Fifth viewing:A-5 | 21 seconds | 12 seconds | ... | 23 seconds | Ta(A-5) seconds |
| Average | 21.8 seconds | 16.8 seconds | ... | 33.0 seconds | Ta(A) seconds |

FIG. 29B

| Viewer content | A1-6 | A2-6 | ... | A9-6 | Average until A9 | A10 |
|---|---|---|---|---|---|---|
| Sixth viewing:A-6 | 19 seconds | 8 seconds | ... | 35 seconds | Ta(A-6) seconds | Not viewed |

CONTENT PLAYBACK APPARATUS, CONTENT PLAYBACK METHOD, PROGRAM, AND INTEGRATED CIRCUIT

TECHNICAL FIELD

The present invention relates to a content playback apparatus that (i) records, as a viewer content, a state of a viewer who is viewing a viewing target content played back on a display or a screen with other viewers, and (ii) plays back the viewer content with the viewing target content.

BACKGROUND ART

In recent years, the sizes of television screens or displays of personal computers have been increasing, and projectors or screens on which the projectors project images have been achieving higher functionality. Accordingly, contents can be displayed larger easily in households, or contents, text, related information of the contents, and others can be displayed simultaneously using sub-screens. Popularization of digital or video cameras enable viewers to create contents easily by recording daily occurrence and events by themselves. In addition, the environment for enabling viewers to simultaneously view these personal contents easily by displaying the contents on large-screen televisions or screens has been put in place.

Furthermore, apparatuses that record states of viewers who are viewing original contents and display the recorded states as new contents, together with the original contents are being developed to improve the entertainment effects, such as facilitating the communication between the viewers and recording the memory of the original contents for the viewers.

For example, systems that record states of behaviors of viewers who are viewing contents and display the behaviors together with the contents are being developed. When viewers view a content, the viewers tell their thoughts and ideas to the content, and when the viewers themselves are in a place where the content is being captured, the viewers tell the memory associated with the occurrence during the time when the content is being captured. Furthermore, when the viewers enjoy and are excited, they smile. When they want to tell something or receive attention, they use gestures or finger pointing.

During viewing of a content, conversations, facial expressions, attitudes, and others represent the viewers' ideas to the content. Thus, such communication between viewers can be probably used as metadata of a content of vital use. Thus, communication between viewers is recorded as content metadata and the recorded content metadata is played back together with an original content, so that a new content will be created to improve the entertainment effect of the content.

Examples of such apparatuses include an apparatus that records video of a viewer upon detection of a cheer of the viewer, and plays back a composite content of the viewer when the original video is played back (for example, see PTL 1).

Furthermore, there is an apparatus that captures images of states of a viewer when each of a volume of a playback content, a pitch of a sound, brightness of video, and toning is changed by a fixed value or larger (for example, see PTL 2).

Furthermore, there is a system that provides metadata or generates a slide show with narration, by recording behaviors of viewers when the viewers view a photographic slide show and playing back the recorded content in association with the slide show (for example, see NPL 1).

CITATION LIST

Patent Literature

[PTL 1] Japanese Patent No. 3688214
[PTL 2] Japanese Unexamined Patent Application Publication No. 2006-74622

Non Patent Literature

[NPL 1] Human Interface Society, "PhotoLoop: Effortless Approach for Creating Natural Video Narration of Slideshows" Vol. 11, No. 1, 2009, pp. 69 to 70

SUMMARY OF INVENTION

Technical Problem

Since in general, a content is repeatedly viewed for multiple times, the aforementioned apparatuses need to record viewer contents for one viewing target content.

However, when viewer contents are recorded for a viewing target content, the conventional techniques do not consider a method of appropriately displaying the viewer contents. For example, when a very large number of viewer contents are recorded, there is a problem that it takes a great amount of time for a viewer to view all the viewer contents that are displayed together with the viewing target content at one time.

Furthermore, in order to solve the problem, it is necessary to select viewer contents to be viewed from among the viewer contents in order to reduce the number of viewer contents to be viewed. However, the viewer contents are not always viewed by the same viewer group for each viewing, and the viewers differ in individuality, personality, and character. Thus, viewer contents are recorded in different point of views for viewing a viewing target content, such as an attention target in a viewing target content, an interest degree, and a viewing time. Thus, the current viewer group has difficulty in selecting appropriate viewer contents. Furthermore, as the number of stored viewer contents is larger, it takes a greater amount of time to select viewer contents to be viewed.

The present invention is for solving the problems of the conventional techniques in view of the aforementioned points, and has an object of providing a content playback apparatus that selects an appropriate viewer content from among viewer contents associated with one viewing target content, based on an attribute or a behavior of a current viewer, and plays back the selected viewer content.

Solution to Problem

A content playback apparatus according to an aspect of the present invention plays back a viewing target content for a viewer, and includes: a viewing target content obtaining unit configured to obtain the viewing target content; a viewer detecting unit configured to detect a first viewer who views the viewing target content played back by the content playback apparatus; a viewer content selecting unit configured to select, from among a plurality of viewer contents, a viewer content having a matching degree higher than a predetermined threshold, the matching degree indicating an amount of common points between the first viewer detected by the viewer detecting unit and a second viewer who views a same content as the viewing target content under temporally or spatially a different condition, and each of the plurality of viewer contents including information of video or sound of the second viewer who views the same content; and a content playback unit configured to play back the viewing target content obtained by the viewing target content obtaining unit and the viewer content selected by the viewer content selecting unit.

With the configuration, appropriate viewer video can be played back for the current viewer (the first viewer). As a result, a content playback apparatus that increases the entertainment value of a content can be obtained. Furthermore, since only a viewer content that interests the first viewer is selectively played back, the processing load of the content playback apparatus can be reduced more than that in the case where all the viewer contents are played back.

More specifically, the content playback apparatus selects and plays back a viewer content having a higher matching degree indicating an amount of common points with the current viewers, from among viewer contents. Accordingly, the viewer content having common characteristics in an attribute of a viewer, and a point of view or preference to a viewing target content can be preferentially viewed. As a result, it does not take much time because there is no need to view all the viewer contents.

Furthermore, the viewer detecting unit may include: a viewer content obtaining unit configured to obtain a viewer content including information of video or sound of the first viewer who is currently viewing the viewing target content played back by the content playback apparatus; and a viewer information obtaining unit configured to obtain a viewer information item on the first viewer, from the viewer content obtained by the viewer content obtaining unit, the content playback apparatus may further include a storage unit configured to store, in association with each other, (i) a plurality of viewer contents of the second viewer that are obtained in the past and (ii) a plurality of viewer information items of the second viewer that are obtained from the viewer content, and the viewer content selecting unit may be configured to calculate matching degrees between the viewer information item of the first viewer detected by the viewer detecting unit and each of the plurality of viewer information items of the second viewer stored in the storage unit, and to select, from among the plurality of viewer contents of the second viewer stored in the storage unit, a viewer content associated with the viewer information item of the second viewer, the viewer information item of the second viewer having one of the matching degrees higher than the predetermined threshold.

Accordingly, an appropriate viewer content for the first viewer can be selected from the viewer contents of the second viewer who previously views the same content as the viewing target content.

Furthermore, the viewer information item may include a plurality of viewer IDs for identifying one or more viewers included in the viewer content, and the viewer content selecting unit may be configured to select the viewer content associated with a viewer information item including a largest number of a plurality of viewer IDs included in the viewer information item of the first viewer, from among the plurality of viewer information items of the second viewer that are stored in the storage unit.

Furthermore, the viewer content selecting unit may be configured to select the viewer content associated with a viewer information item including a smallest number of a plurality of viewer IDs that are not included in the viewer information item of the first viewer, from among the plurality of viewer information items of the second viewer that are stored in the storage unit.

Furthermore, the storage unit may be further configured to store, in advance, the plurality of viewer IDs of the viewers and a plurality of facial images of the viewers in association with each other, and the viewer information obtaining unit may be configured to extract a plurality of facial images of the first viewer from the viewer content obtained by the viewer content obtaining unit, and to obtain a plurality of viewer IDs associated with a plurality of facial images that match the extracted facial images, from among the plurality of facial images stored in the storage unit as the viewer information item of the first viewer.

Furthermore, the content playback unit may include a display screen that displays image data included in the viewing target content and the viewer content selected by the viewer content selecting unit, the content playback apparatus may further include a display control unit configured to display the viewing target content on the display screen, and to display the viewer content to be superimposed on a part of the viewing target content, the display control unit may includes: a non-attention region estimation unit configured to estimate, on the display screen, a non-attention region that is a region outside of a region on which the first viewer focuses attention; and an effective visual field estimation unit configured to estimate an effective visual field of the first viewer on the display screen, and the display control unit may be configured to display the viewer content within the non-attention region and the effective visual field.

Accordingly, the viewer content can be displayed at a position easily viewed by the first viewer without preventing the first viewer from viewing the viewing target content. For example, when viewer contents each having a higher matching degree are selected, each of the viewer contents is displayed at an appropriate position on the display screen. More specifically, the viewer contents are displayed within a non-attention region and an effective visual field on the display screen. Thus, the viewer contents are displayed without overlapping with the attention regions of the viewers, and at positions easily noticed and viewed by the viewers.

Furthermore, the display control unit may be configured to determine, when the viewer content selecting unit selects a plurality of viewer contents including the viewer content, display positions of the plurality of viewer contents in descending order of the matching degrees of the plurality of viewer contents.

Furthermore, the viewer information item may include information for identifying a position of a view point of the first viewer on the display screen, and the non-attention region estimation unit may be configured to estimate, as the non-attention region, a region outside of a predetermined region including all positions on the display screen at each of which the view point of the first viewer identified by the viewer information item is fixed for a predetermined fixation time or longer within a predetermined time period.

Furthermore, the viewer information item may include information for identifying a position of a view point of the first viewer on the display screen, and the effective visual field estimation unit may be configured to estimate, as the effective visual field, a predetermined region having the position of the view point of the first viewer identified by the viewer information item as a center.

Furthermore, the viewer content obtaining unit may include an image capturing unit configured to capture an image of the first viewer who is currently viewing the viewing target content played back by the content playback apparatus, and to output the captured image as the obtained viewer content, and the viewer information obtaining unit may be configured to extract the information for identifying the position of the view point of the first viewer, from the image captured by the image capturing unit.

Furthermore, the content playback unit may include a display screen that displays image data included in the viewing target content and the viewer content selected by the viewer content selecting unit, the content playback apparatus may further include a display control unit configured to display the viewer content on the display screen, after a lapse of a predetermined time after displaying the viewing target content on the display screen, and the display control unit may include: an attention region estimation unit configured to estimate, on the display screen, respective attention regions that are regions on which a plurality of first viewers including the first viewer focus attention; an attention region matching degree calculating unit configured to calculate an attention region matching degree that is a matching degree between the attention regions of the plurality of first viewers estimated by the attention region estimation unit; and a display time control unit configured to set the predetermined time longer as the attention region matching degree calculated by the attention region matching degree calculating unit is higher.

Accordingly, for example, the display timing of a viewer content can be delayed when it is possible to determine the first viewers have a good conversation (the attention region matching degree is high), and the display timing of the viewer content can be made earlier when it is possible to determine that the first viewers do not have a good conversation (the attention region matching degree is low).

For example, when viewer contents each having a higher matching degree are selected, each of the viewer contents is displayed with appropriate timing. More specifically, as the attention region matching degree between the current viewers is higher, the viewer content starts to be displayed with much more delay. As such, the viewer content is displayed with appropriate timing by delaying the display time, without interrupting the viewing.

Furthermore, the attention region matching degree calculating unit may be configured to calculate, for each of overlapping regions in each of which two or more of the attention regions of the plurality of first viewers overlap, the attention region matching degree based on a product of (i) an area of the overlapping region, (ii) a length of a time during which the attention regions overlap, and (iii) the number of the plurality of first viewers who focus attention on the overlapping region.

Furthermore, the content playback unit may include a display screen that displays image data included in the viewing target content and the viewer content selected by the viewer content selecting unit, the content playback apparatus may further include a display control unit configured to display, when the viewer content selecting unit selects a plurality of viewer contents including the viewer content, the selected plurality of viewer contents on the display screen at different display start times, and the display control unit may include: an attention region estimation unit configured to estimate, on the display screen, attention regions that are regions on which a plurality of first viewers including the first viewer focus attention, based on the viewer information item obtained by the viewer information obtaining unit, and to estimate attention regions on which the second viewer focus attention, based on a plurality of viewer information items associated with the plurality of viewer contents, the plurality of viewer information items including the viewer information item of the second viewer; an attention region matching degree calculating unit configured to calculate attention region matching degrees that are respective matching degrees between the attention regions of the plurality of first viewers and the attention regions of the second viewer, both of the attention regions being estimated by the attention region estimation unit; and a display time control unit configured to determine the display start times of the plurality of viewer contents so that the plurality of viewer contents are displayed on the display screen in descending order of the attention region matching degrees.

Accordingly, for example, the viewer content for which the first viewers can have empathetic feelings can be displayed first from among the selected viewer contents. More specifically, when viewer contents are selected, an attention region between the current viewers is compared with an attention region between the viewers in each of the selected viewer contents, the viewer contents are displayed in descending order of the matching degrees. Thus, the viewers can first view the viewer contents having the large number of common points on which the viewers focus attention.

Furthermore, the content playback apparatus may further include a control unit configured to adjust a play-back time of the viewer content selected by the viewer content selecting unit, and to control the content playback unit to play back the viewer content in which the play-back time is adjusted, wherein the control unit may be configured to estimate a viewing time of the viewing target content that is viewed by the first viewer, and to extend or shorten the play-back time of the viewer content to be closer to the estimated viewing time of the viewing target content.

Accordingly, the viewers can effectively play back a viewer content, according to the play-back time of a viewing target content. More specifically, a viewing time of a viewing target content is estimated, and a play-back time of a viewer content is extended or shortened to be closer to the estimated viewing time of the viewing target content. Thus, when the play-back time of the viewer content is extended, the viewer content is always displayed without any interruption during the time when the viewers view the viewing target content. In contrast, when the play-back time of the viewer content is shortened, the viewers can effectively view the viewer content because playing back of the viewer content ends at an estimated end time of the viewing target content.

Furthermore, the content playback unit may include a display screen that displays image data included in the viewing target content and the viewer content selected by the viewer content selecting unit, the viewer content selecting unit may be configured to extract, as a still image, a most exciting portion in each of one or more viewer contents associated with the viewing target content, and to output the extracted one or more still images as the viewer content, and the content playback unit may be configured to display the one or more still images as the viewer content in a slideshow mode or a thumbnail mode, before displaying the viewing target content.

Thus, the current viewers can get an overview of states of the second viewer who has viewed the viewer content in the past, by displaying the viewer still images before actually viewing the viewing target content. More specifically, before playing back the viewing target content, the still images estimated as the most exciting portions in the viewer contents are displayed in a slideshow mode or a thumbnail mode. Thus, the current viewers can effectively know the states or reactions of all the viewers who have viewed the viewing target content in the past, before viewing the viewing target content.

Furthermore, the viewer content selecting unit may be configured to select the viewer content obtained from the second viewer who views the same content as the viewing target content at a place different from a place of the first viewer and at a same time as the first viewer.

A content playback method according to an aspect of the present invention is a method of playing back a viewing target content for a viewer, and includes: obtaining the viewing target content; detecting a first viewer who views the viewing target content; selecting, from among a plurality of viewer contents, a viewer content having a matching degree higher than a predetermined threshold, the matching degree indicating an amount of common points between the first viewer detected in the detecting and a second viewer who views a same content as the viewing target content under temporally or spatially a different condition, and each of the plurality of viewer contents including information of video or sound of the second viewer who views the same content; and playing back the viewing target content obtained in the obtaining and the viewer content selected in the selecting.

A program according to an aspect of the present invention causes a computer that plays back a viewing target content for a viewer to execute: obtaining the viewing target content; detecting a first viewer who views the viewing target content; selecting, from among a plurality of viewer contents, a viewer content having a matching degree higher than a predetermined threshold, the matching degree indicating an amount of common points between the first viewer detected in the detecting and a second viewer who views a same content as the viewing target content under temporally or spatially a different condition, and each of the plurality of viewer contents including information of video or sound of the second viewer who views the same content; and playing back the viewing target content obtained in the obtaining and the viewer content selected in the selecting.

An integrated circuit according to an aspect of the present invention plays back a viewing target content for a viewer, and includes: a viewing target content obtaining unit configured to obtain the viewing target content; a viewer detecting unit configured to detect a first viewer who views the viewing target content played back by the content playback apparatus; a viewer content selecting unit configured to select, from among a plurality of viewer contents, a viewer content having a matching degree higher than a predetermined threshold, the matching degree indicating an amount of common points between the first viewer detected by the viewer detecting unit and a second viewer who views a same content as the viewing target content under temporally or spatially a different condition, and each of the plurality of viewer contents including information of video or sound of the second viewer who views the same content; and a content playback unit configured to play back the viewing target content obtained by the viewing target content obtaining unit and the viewer content selected by the viewer content selecting unit.

Advantageous Effects of Invention

The content playback apparatus according to the present invention can select a viewer content from among viewer contents based on a matching degree with the current viewers, and play back the selected viewer content.

BRIEF DESCRIPTION OF DRAWINGS

FIG. 3A illustrates an example of information to be stored in a content storage unit according to Embodiment 1.

FIG. 3B illustrates an example of a data structure of the content illustrated in FIG. 3A.

FIG. 3C illustrates an example of a data structure of the content meta information item illustrated in FIG. 3A.

FIG. 4A illustrates an example of a data structure of viewer attribute information according to Embodiment 1.

FIG. 4B illustrates an example of a data structure of physical information according to Embodiment 1.

FIG. 5 illustrates an example of header information according to Embodiment 1.

FIG. 6 illustrates an example of an external view of the content playback apparatus according to Embodiment 1.

FIG. 7A illustrates an example of a data structure of meta information according to Embodiment 1.

FIG. 7B illustrates another example of a data structure of meta information according to Embodiment 1.

FIG. 12 is a flowchart indicating an example of operations performed by the content playback apparatus according to Embodiment 1.

FIG. 15 illustrates an example of procedure for estimating an attention region of each viewer using a non-attention region estimation unit according to Embodiment 2.

FIG. 25 illustrates an example of viewer contents selected by a viewer content selecting unit according to Embodiment 4 in the present invention.

FIG. 28A illustrates an example in which attention region matching degrees calculated between the current viewer information item and each of the past two information items are the same.

FIG. 28B illustrates an example in which attention region matching degrees calculated between the current viewer information item and each of the past two information items are different.

FIG. 28C illustrates another example in which attention region matching degrees calculated between the current viewer information item and each of the past two information items are different.

FIG. 28D illustrates display timing of a viewer content in each cases of FIGS. 28A to 28C.

FIG. 29A illustrates an example of past header information stored in a viewer information storage unit according to Embodiment 5 in the present invention.

FIG. 29B illustrates an example of current header information generated by a header information generating unit according to Embodiment 5.

DESCRIPTION OF EMBODIMENTS

Embodiments according to the present invention will be described with reference to drawings.

Embodiment 1

A content playback apparatus according to Embodiment 1 selects a viewer content to be displayed with a viewing target content, based on a matching degree between viewer information items. More specifically, the content playback apparatus plays back a viewing target content for a viewer, and includes: a viewing target content obtaining unit configured to obtain the viewing target content; a viewer detecting unit configured to detect a first viewer who views the viewing target content played back by the content playback apparatus; a viewer content selecting unit configured to select, from among a plurality of viewer contents, a viewer content having a matching degree higher than a predetermined threshold, the matching degree indicating an amount of common points between the first viewer detected by the viewer detecting unit and a second viewer who views a same content as the viewing target content under temporally or spatially a different condition, and each of the plurality of viewer contents including information of video or sound of the second viewer who views the same content; and a content playback unit configured to play back the viewing target content obtained by the viewing target content obtaining unit and the viewer content selected by the viewer content selecting unit.

Hereinafter, a person having a possibility to view a viewing target content using the content playback apparatus will be referred to as a user, and a user who actually views a viewing target content will be referred to as a viewer.

<External View>

Figure 1:
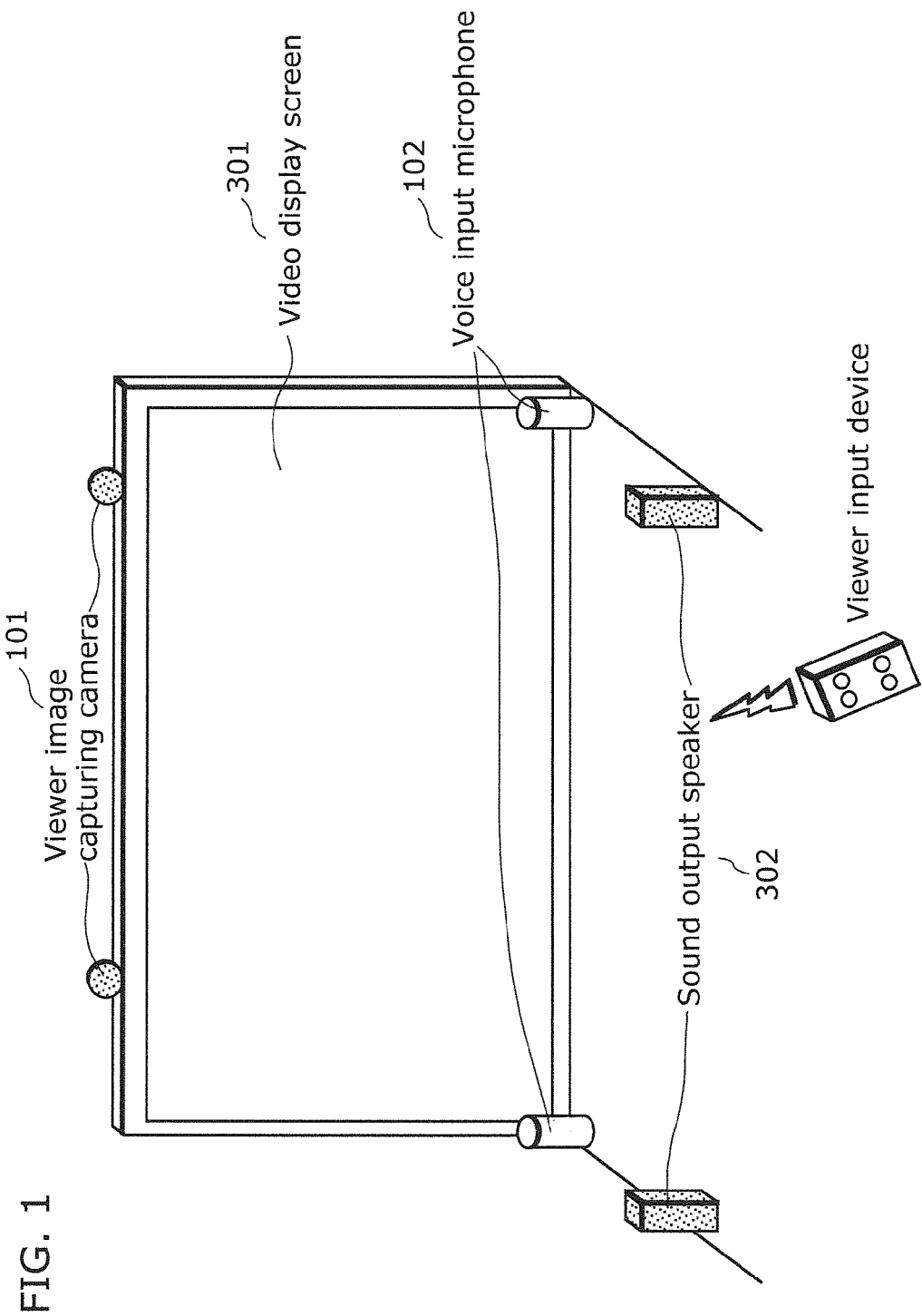
FIG. 1 illustrates an example of an external view of a content playback apparatus according to Embodiment 1 in the present invention.

FIG. 1 illustrates an example of an external view of various input/output devices included in a content playback apparatus 100 according to the present invention. The content playback apparatus 100 includes viewer image capturing cameras 101, voice input microphones 102, sound output speakers 302, and a video display screen 301, each at a predetermined position. Although FIG. 1 exemplifies a case with two sets of the viewer image capturing cameras 101, the voice input microphones 102, and the sound output speakers 302, and one video display screen 301, the number of each of the constituent elements is not limited to such.

It is assumed herein that a viewer is in front of the video display screen 301, and views a viewing target content to be displayed on the video display screen 301.

The position of each of the constituent elements is not limited to the position in FIG. 1. For example, the voice input microphones 102 may be located in front center of the video display screen 301. Furthermore, the sound output speakers 302 may be suspended from the ceiling.

<Configuration>

Figure 2A:
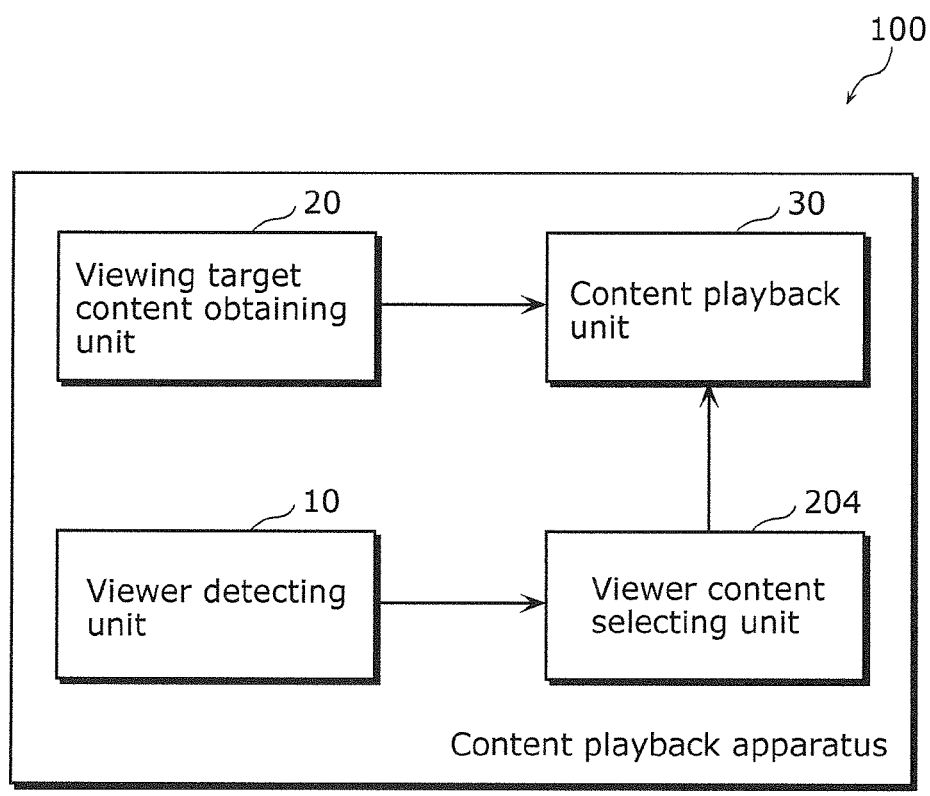
FIG. 2A is a block diagram schematically illustrating the content playback apparatus according to Embodiment 1.

FIG. 2A is a block diagram schematically illustrating the content playback apparatus 100 according to Embodiment 1. As illustrated in FIG. 2A, the content playback apparatus 100 includes a viewing target content obtaining unit 20, a viewer detecting unit 10, a viewer content selecting unit 204, and a content playback unit 30.

The viewing target content obtaining unit 20 obtains a viewing target content. Although any specific method of obtaining a viewing target content is not defined herein, typically, the viewing target content obtaining unit 20 selects a viewing target content designated by a viewer. Furthermore, the viewing target content to be obtained may be recorded not only in the content playback apparatus 100 but also in an external recording medium. Moreover, the viewing target content obtaining unit 20 may obtain a viewing target content recorded in an external content server or others, via a communication network.

The viewer detecting unit 10 detects a viewer (first viewer) who is currently viewing a viewing target content played back by the content playback apparatus 100. More specifically, the detecting includes capturing an image of a state of the viewer, collecting voice of the viewer, and receiving an input of remote control by the viewer.

The viewer content selecting unit 204 selects an appropriate viewer content for the current viewer. The viewer content is a content obtained from a viewer (second viewer) who views the same content as the viewing target content, under a temporally or spatially different condition. More specifically, the viewer content includes video data obtained by capturing images of states of the second viewer, and/or sound data obtained by collecting voice of the second viewer. Furthermore, the viewer content selecting unit 204 selects a viewer content having a matching degree higher than a predetermined threshold, from among selectable viewer contents. Here, the matching degree indicates common points between the first viewer and the second viewer.

The content playback unit 30 plays back the viewing target content obtained by the viewing target content obtaining unit 20 and the viewer content selected by the viewer content selecting unit 204. Here, the playing back includes displaying video (image) data included in the contents, and outputting sound data included in the contents.

The viewer detecting unit 10 includes: a viewer content obtaining unit (the illustration is omitted) configured to obtain a viewer content including information of video or sound of the first viewer who is currently viewing the viewing target content played back by the content playback apparatus; and a viewer information obtaining unit (the illustration is omitted) configured to obtain a viewer information item that is information on the first viewer, from the viewer content obtained by the viewer content obtaining unit. Furthermore, the content playback apparatus 100 further includes a storage unit 40 (the illustration is omitted in FIG. 2A) configured to store, in association with each other, (i) a plurality of viewer contents of the second viewer that are obtained in the past and (ii) a plurality of viewer information items of the second viewer that are obtained from the viewer content. Then, the viewer content selecting unit calculates matching degrees between the viewer information item of the first viewer detected by the viewer detecting unit 10 and each of the viewer information items of the second viewer stored in the storage unit 40, and selects, from among the plurality of viewer contents of the second viewer stored in the storage unit, a viewer content associated with the viewer information item of the second viewer, the viewer information item of the second viewer having one of the matching degrees higher than the predetermined threshold.

Figure 2B:
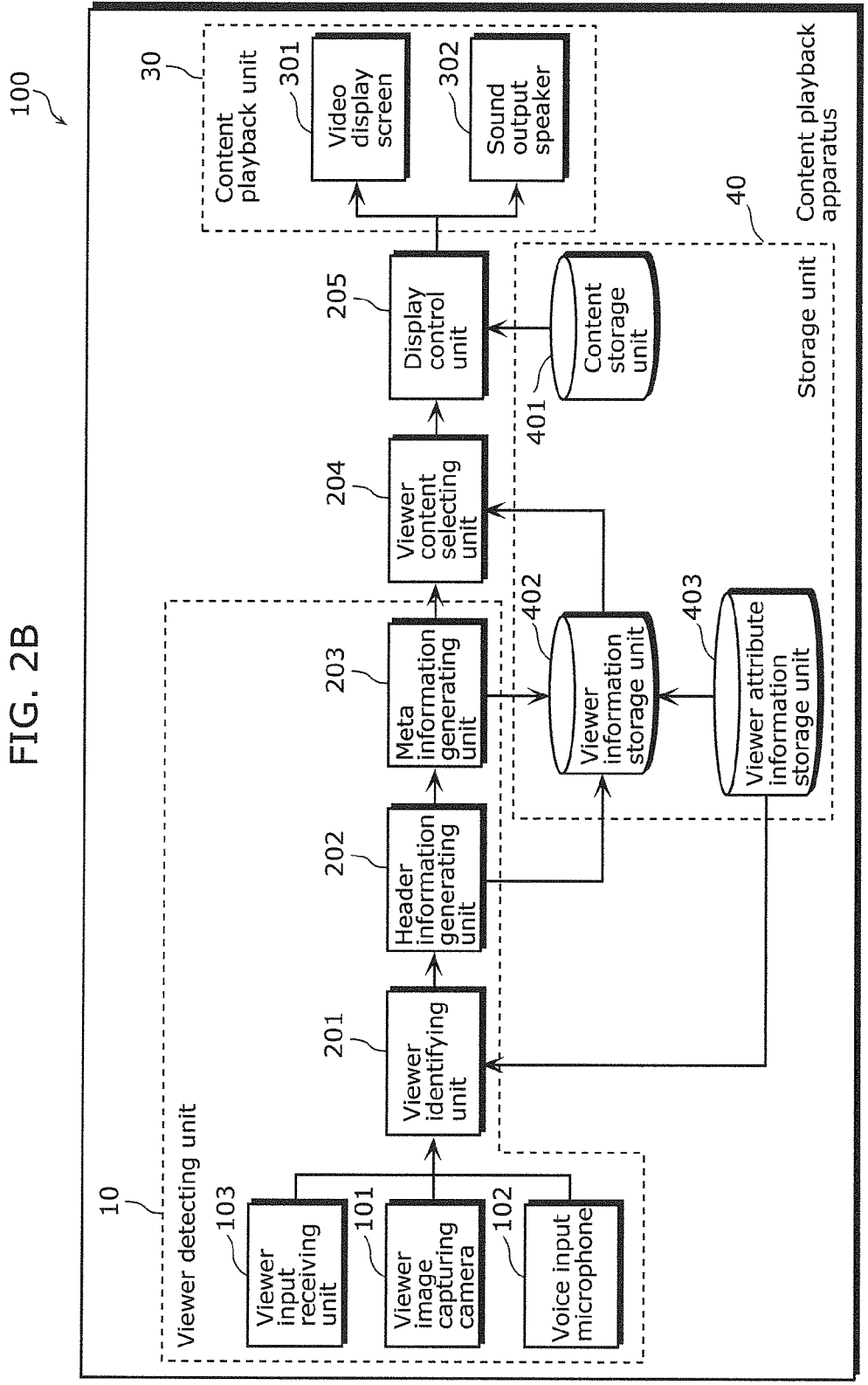
FIG. 2B is a block diagram illustrating a detailed configuration of the content playback apparatus according to Embodiment 1.

Next, FIG. 2B is a block diagram illustrating a detailed configuration of the content playback apparatus 100 according to Embodiment 1. As illustrated in FIG. 2B, the content playback apparatus 100 includes the viewer detecting unit 10, the viewer content selecting unit 204, a display control unit 205, the content playback unit 30, and a storage unit 40. The constituent elements used in common between FIGS. 2A and 2B are denoted by the same reference numerals. Furthermore, the display control unit 205 in FIG. 2B includes functions of the viewing target content obtaining unit 20 in FIG. 2A.

The viewer detecting unit 10 includes the viewer image capturing camera 101, the voice input microphone 102, a viewer input receiving unit 103, a viewer identifying unit 201, a header information generating unit 202, and a meta information generating unit 203. Here, each of the viewer image capturing camera 101, the voice input microphone 102, and the viewer input receiving unit 103 functions also as a viewer content obtaining unit. Furthermore, each of the viewer identifying unit 201, the header information generating unit 202, and the meta information generating unit 203 functions also as a viewer information obtaining unit.

The viewer image capturing camera (image capturing unit) 101 captures an image of a viewer who is viewing a viewing target content played back by the content playback apparatus 100. The voice input microphone 102 collects voice of the viewer who is viewing the viewing target content played back by the content playback apparatus 100. The viewer input receiving unit 103 receives an instruction entered using a remote controller of a viewer and others.

The viewer identifying unit 201 counts the number of viewers based on a viewer content including video captured by the viewer image capturing camera 101 and sound obtained by the voice input microphone 102 and/or based on information of the remote control by the viewer that is received by the viewer input receiving unit 103, and identifies the current viewer who is viewing the viewing target content.

More specifically, the storage unit 40 stores, in advance, viewer IDs of viewers and facial images of the viewers in association with each other. Then, the viewer identifying unit 201 that functions as a viewer information obtaining unit extracts the facial image of the first viewer from the viewer content, and obtains a viewer ID in association with a facial image that matches the extracted facial image from among the facial images stored in the storage unit 40, as a viewer information item.

In addition to a result of the identification by the viewer identifying unit 201, the header information generating unit 202 generates header information that is basic information on a viewer content, such as a viewing time and date. Furthermore, the meta information generating unit 203 generates meta information for specifying the characteristics of the behavior, attitude, or others of the viewer based on the viewer content. Furthermore, the viewer content and the viewer information item including the header information and the meta information that are obtained or generated as described above are stored in a viewer information storage unit 402 in association with each other.

A viewer attribute information storage unit 403 stores viewer attribute information on attributes and physical information of viewers. When a new user is added or there is a change in the current user information, the viewer attribute information is updated by receiving a user input for the change by the viewer input receiving unit 103 or based on the viewer content as necessary. In addition, the header information has a pointer indicating the viewer attribute information, so that the viewer attribute information of the identified viewer can be referred to.

The viewer content selecting unit 204 selects, based on the header information or the meta information (that is, a viewer information item), a viewer content to be displayed together with the viewing target content that is currently being played back, from among viewer contents obtained when the same content as the viewing target content has been played back out of the past viewer contents stored in the viewer information storage unit 402.

More specifically, the viewer information item includes viewer IDs for identifying one or more viewers included in a corresponding viewer content. Then, the viewer content selecting unit 204 selects a viewer content associated with a viewer information item including the largest number of the viewer IDs included in the viewer information item of the first viewer, from among the second viewer information items stored in the storage unit 40. Furthermore, the viewer content selecting unit 204 selects a viewer content associated with a viewer information item including the smallest number of the viewer IDs that are not included in the viewer information item of the first viewer, from among the second viewer information items stored in the storage unit 40.

The display control unit 205 sets a display parameter, such as a display position or a display size of each of a viewer content and a viewing target content, based on an input from the viewer input receiving unit 103 or a predetermined value. Then, the display control unit 205 outputs, to the content playback unit 30, the viewer content selected by the viewer content selecting unit 204 and the viewing target content obtained from a content storage unit 401.

The content playback unit 30 plays back the viewer content and the viewing target content obtained from the display control unit 205. More specifically, the content playback unit 30 includes a video display screen 301 for displaying video (image) data in the obtained contents, and the sound output speaker 302 that outputs sound data in the obtained contents.
<Storage Unit 40>

The storage unit 40 includes the content storage unit 401, the viewer information storage unit 402, and the viewer attribute information storage unit 403. The content storage unit 401 stores one or more contents that are candidates for a viewing target content. The viewer information storage unit 402 stores viewer contents and viewer information items that are obtained in the past by the viewer detecting unit 10, in association with each other. The viewer attribute information storage unit 403 stores information of viewers who uses the content playback apparatus 100.
<Content Storage Unit 401>

FIGS. 3A to 3C illustrate examples of contents which are candidates for a viewing target content.

As illustrated in FIG. 3A, the content storage unit 401 stores a content that is a candidate for a viewing target content and a content meta information item that is information on the content, in association with each other. In the example of FIG. 3B, the content storage unit 401 stores three contents A, B, and C. The content A includes 10 pictures (A1 to A10), the content B includes 7 pictures (B1 to B7), and the content C includes 9 pictures (C1 to C9).

The following examples will be described, assuming a slideshow content including pictures (still images) as a viewing target content. Furthermore, this slideshow content is typically assumed to be a content in which pictures are switched to one after another, according to an instruction from a viewer (for example, an instruction from a viewer through the viewer input receiving unit 103). In other words, it is assumed that the viewing time for viewing the pictures included in the slideshow content and the total viewing time for viewing the entire slideshow content differ for each viewer.

As illustrated in FIG. 3C, the content meta information item is generally information obtained by an image-capturing apparatus in capturing contents, such as an image-capturing time and date, a model of image-capturing equipment, a focal distance, and an image-capturing mode. Furthermore, as long as the image-capturing equipment is equipped with functions, such as GPS, fingerprint authentication, and a face recognition technique, it can obtain, as a content meta information item, an image-capturing location, the number of persons included in the content (the number of subjects), and persons at a location where the content was captured (photographer, those who accompanied the photographer, etc.) although they are not included in the content.

Here, the content is not limited to pictures but may be a television broadcast program, a movie, a digital content on the Internet, and an advertisement, or a combination of these.
<Viewer Information Storage Unit 402>

Figure 8:
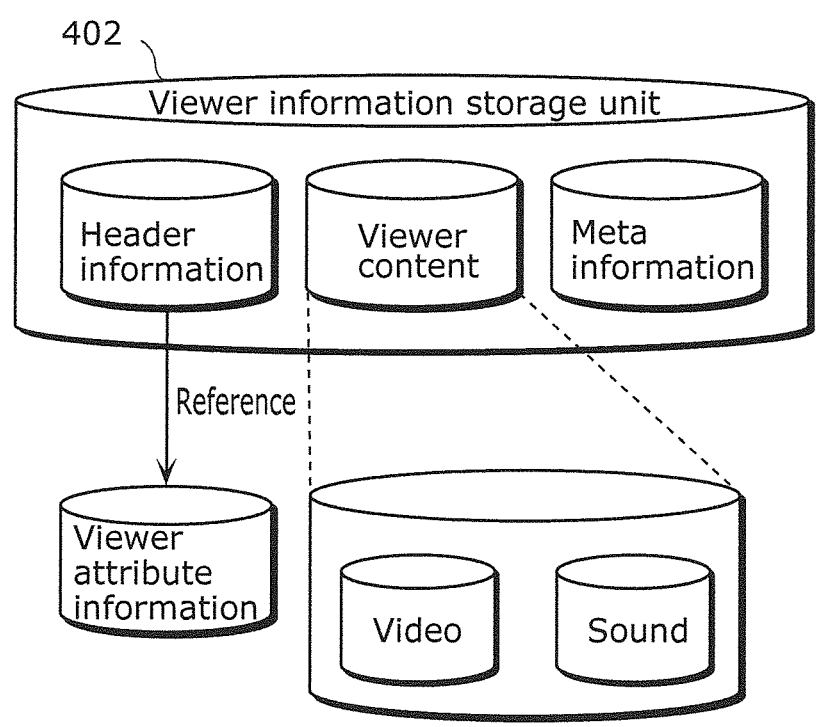
FIG. 8 illustrates an example of a configuration of a viewer information storage unit according to Embodiment 1.
Figure 9:
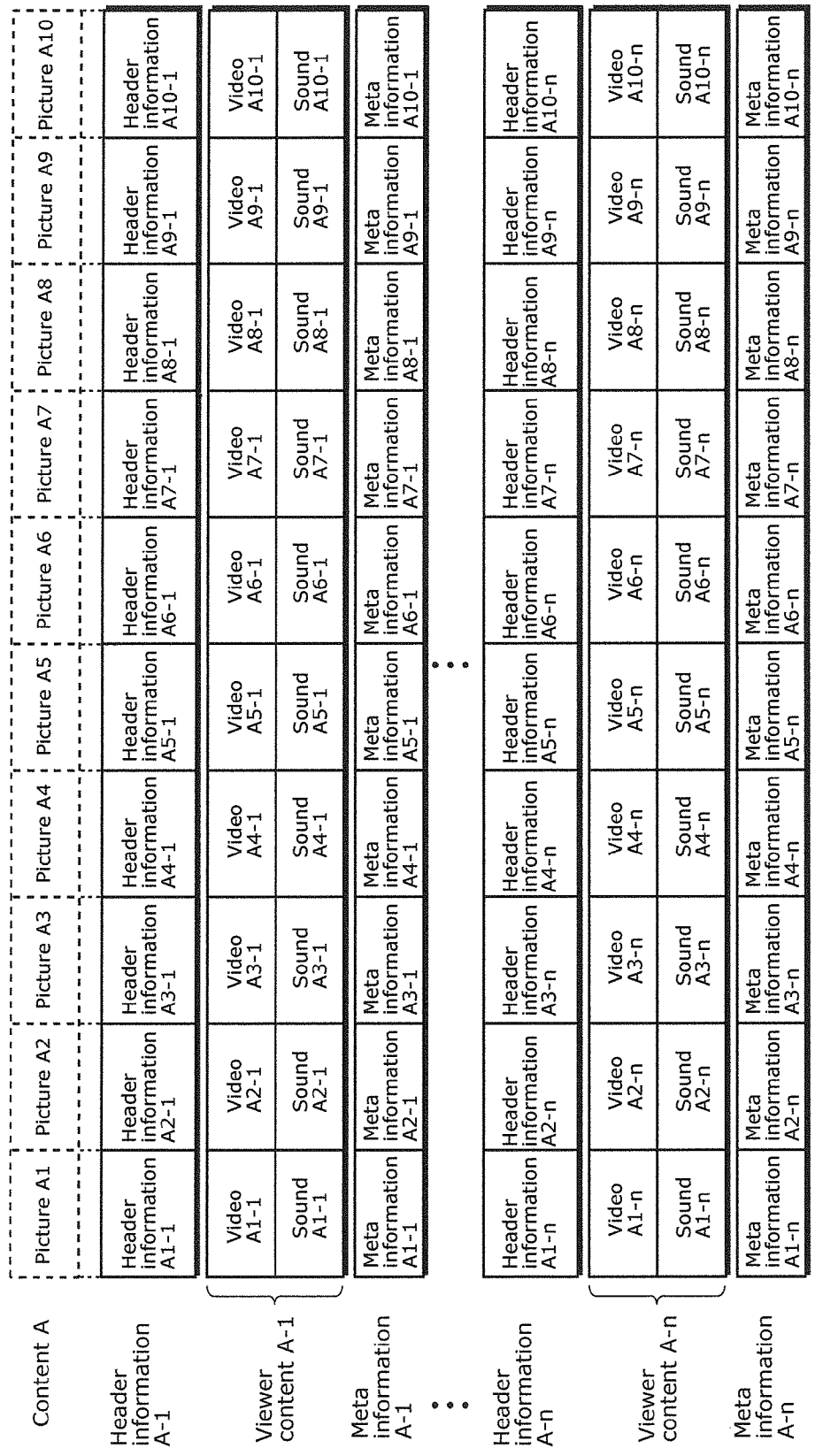
FIG. 9 illustrates an example of a structure of a viewer information item according to Embodiment 1.

As illustrated in FIG. 8, the viewer information storage unit 402 stores a viewer content and a viewer information item including header information and meta information in association with each other. More specifically, as illustrated in FIG. 9, the viewer information storage unit 402 stores viewer information items and data elements of the content A (pictures A1 to A10) in association with each other. The viewer content A-n indicates that the content A is data obtained in the n-th viewing with respect to the number of times the content A has been viewed.

The viewer content generated when a picture A1 included in the content A has been viewed for the first time is stored as video A1-1 and sound A1-1. Similarly, the viewer content generated when the picture A1 included in the content A has been viewed for the n-th time is stored as video A1-*n* and sound A1-*n*. Furthermore, the viewer content A-n is associated with header information A-n and meta information A-n. The viewer information storage unit 402 stores viewer contents and viewer information items for the number of times each content has been viewed.
<Viewer Attribute Information Storage Unit 403>

The viewer attribute information storage unit 403 obtains and stores attribute information of each user.

The viewer attribute information is information for enabling identifying of a viewer from among users. For example, as illustrated in FIG. 4A, the viewer attribute information includes a facial image, a voice print, gender, age, birth date, a relationship between viewers, a social attribute, and physical information, and each of the attributes is stored in association with a viewer ID. Furthermore, the viewer attribute information may additionally include a name. Furthermore, as illustrated in FIG. 4B, the physical information is physical information of a viewer, such as height, seated height, eye height, eyesight, dominant hand, and arm length.

The viewer detecting unit 10 obtains the viewer attribute information. For example, the viewer input receiving unit 103 receives, from the user, an input of information including gender, birth date, and a relationship between viewers, such as parent and child and friend. Furthermore, the viewer image capturing camera 101 obtains a facial image, and the voice input microphone 102 obtains a voice print.

The viewer attribute information is not limited to these examples but may be other information as long as the information can be used for identifying a viewer.

Furthermore, since the user is a person who probably uses the content playback apparatus 100, for example, the viewer attribute information storage unit 403 may further store the viewer attribute information of the children, parents, or friends of the owner of the content playback apparatus 100.

The viewer attribute information is updated as necessary.

Next, operations of the content playback apparatus 100 according to Embodiment 1 will be described with reference to FIGS. 1, 5 to 7B, and 10 to 12.
<Viewer Detecting Unit 10>

First, the viewer detecting unit 10 obtains a viewer content from viewers who are currently viewing the viewing target content played back by the content playback apparatus 100

(S100). More specifically, the viewer image capturing camera 101 captures images of the viewers who are currently viewing the viewing target content played back by the content playback apparatus 100. Furthermore, the voice input microphone 102 obtains sound of a conversation between the viewers who are currently viewing the viewing target content played back by the content playback apparatus 100. Hereinafter, one of or each of the video obtained by the viewer image capturing camera 101 and the sound obtained by the voice input microphone 102 is referred to as a viewer content.

For example, when there are the two viewer image capturing cameras 101 as illustrated in FIG. 1, three-dimensional positions of the viewers can be calculated based on the stereoscopy principle. When the positions of the viewers are calculated, each of the viewer image capturing cameras 101 can automatically calculate and set an appropriate angle and an angle of field so that an image of the upper bodies of all the viewers is the largest within the display screen using the image processing technique.

Here, in order to detect the viewers and calculate positions of the viewers, not limited to the video, but the sound data obtained by the two voice input microphones 102 may be used in a method for identifying the sound source. Furthermore, although not illustrated in FIG. 1, the viewer detecting unit 10 may include various sensors, such as a thermography and a floor sensor, as the viewer input receiving unit 103. Here, the viewers may be detected and the positions of the viewers may be calculated, using sensor information, such as a heat distribution image and pressure distribution.

<Viewer Identifying Unit 201>

Next, when the viewer detecting unit 10 detects a viewer in the obtained viewer content (Yes at S101), the viewer identifying unit 201 identifies the viewer with the viewer ID from among the viewer IDs registered in the viewer attribute information storage unit 403 (S102). The viewer identifying unit 201 identifies the viewer by determining whether or not information of the viewer input using the viewer input receiving unit 103 or the facial image or the voice print extracted from the viewer content matches that in the viewer attribute information stored in the viewer attribute information storage unit 403, and outputting the matching viewer ID or the viewer ID determined as having the highest matching degree.

For example, when the viewer enters the birthday "Feb. 1, 1971" through the viewer input receiving unit 103, the viewer identifying unit 201 outputs the viewer ID "User2" having the matching birthday with reference to the viewer attribute information storage unit 403, and identifies the viewer as "User2". In another example, the viewer identifying unit 201 can identify a viewer by extracting a facial image from a viewer content using the image processing technique such as the template matching method and outputting (i) a viewer ID with a facial image that is determined as matching in the amount of characteristics with the extracted facial image and that is stored in the viewer attribute information storage unit 403 or (ii) a viewer ID with a facial image that is determined as having the highest matching degree with the extracted facial image and that is stored in the viewer attribute information storage unit 403.

Furthermore, each time the number of viewers increases or decreases during the time when the viewers are viewing a viewing target content, the viewer identifying unit 201 identifies the respective viewers, and outputs the identified viewer IDs.

The viewer attribute information entered by the viewer is not limited to the birthday but may be the gender or age. Furthermore, when one viewer is identified, the social relationship with the viewer, such as "mother" may be entered as the viewer attribute information. Furthermore, the viewer may be identified by extracting a voice print from the sound in the viewer content and checking the voice print against a registered voice print.

When the viewers include a person who is not registered in the viewer attribute information, the person cannot be identified. In such a case, the viewer identifying unit 201 outputs a guest ID for the person.

<Header Information Generating Unit 202>

The header information generating unit 202 generates header information of a viewer content (S103). More specifically, the header information generating unit 202 generates the header information including a viewing target content, a viewer content, a viewing time and date, a viewing start time, a viewing time, viewers of the contents identified by the viewer identifying unit 201, the number of the viewers, and others, as indicated in FIG. 5.

In the example of FIG. 5, the header information generating unit 202 generates the header information for each picture that is the smallest unit of a content. When a picture A1 of a content A is viewed by a viewer for the first time, the header information generating unit 202 assigns an identification number of A1-1 to the viewer content. Similarly, when a content An (picture) is viewed for the m-th time, the header information generating unit 202 assigns an identification number of An-m to the viewer content. The viewing time is recorded when the viewer finishes viewing the picture A1.

Furthermore, each time the viewer identifying unit 201 detects the increase or decrease in the number of viewers, it outputs the latest viewer ID and updates the header information for each time, as indicated in the example of the picture A10 in FIG. 5.

Since the header information has a viewer ID, the header information generating unit 202 can refer to the viewer attribute information stored in the viewer attribute information storage unit 403.

<Meta Information Generating Unit 203>

The meta information generating unit 203 generates meta information of a viewer content by digitizing the reaction of the viewer to a viewing target content (S104). The reaction of the viewer to the viewing target content is found in behavior or attitude, etc. of the viewer. Thus, the meta information generating unit 203 generates the meta information by digitizing the behavior or attitude, etc. of the viewer seen in the viewer content, using the image or speech recognition technique.

FIG. 6 illustrates a state where three viewers (viewer IDs are User1, User2, and User3) are viewing the content A that is a viewing target content and is played back by the content playback apparatus 100. Here, the User 1, User2, and User3 are to view the content A in a state where the User1 and User3 are sitting on a sofa in front of the video display screen 301 and the User2 is standing.

Here, the meta information generating unit 203 generates, as meta information for each viewer ID, information indicating, for example, a viewing position, a posture, an orientation of a head, and a sight line position (a position on the video display screen 301, also referred to as an position of a view point) as indicated in examples of FIGS. 7A and 7B. The meta information generating unit 203 records a value calculated by the viewer detecting unit 10, as a viewing position. Furthermore, the meta information generating unit 203 detects a position of the face of a viewer, and determines whether the viewer is sitting or standing by checking the position against the physical information in the viewer attribute information. The meta information generating unit 203 determines the orientation of the head of a viewer, using a position of an eye in the face. The meta information generating unit 203 detects a sight line position using the orientation of a head and a position of a pupil with image processing to estimate the position on the video display screen 301. The calculation method of the meta information may be, but not limited to these examples, other methods.

The viewer content, the header information, and the meta information that are generated through the processes (S100 to S104) are stored in the viewer information storage unit 402 in association with each other (S105). Here, the header information in FIG. 5 and the meta information in FIGS. 7A and 7B are examples, and obviously, may include other information. Furthermore, the meta information may include a part of the header information in FIG. 5, and the header information may include a part of the meta information in FIGS. 7A and 7B.

<Viewer Content Selecting Unit 204>

The viewer content selecting unit 204 selects an appropriate viewer content according to the behavior or attitude of the viewer to display it together with a viewing target content, when viewer contents are stored in the viewer information storage unit 402 (except for the viewer content that is obtained this time) (S106, S107). For this reason, the viewer content selecting unit 204 selects a viewer content based on header information or meta information (that is, a viewer information item) indicating, for example, the attribute, behavior, and attitude of the viewer, in the viewer information item.

The header information indicates, for example, an attribute or preference of the viewer. Furthermore, the meta information indicates, for example, characteristics of behaviors or attitudes of the viewer to the viewing target content. When the viewer contents are stored, since it is difficult for the viewer to view all the viewer contents together with the viewing target content at the same time, one of the viewer contents supposed to be appropriate for the viewer needs to be selected.

Here, it is probable that viewing the viewer content viewed by the viewers having the same attributes or preference enables the viewers to have empathy with the state when the viewers were viewing the viewing target content and increase the entertainment value. Thus, an example that the viewer content selecting unit 204 selects a viewer content of which attributes or the reactions to the viewing target content between the current viewer and the past viewer match or for which a matching degree in the attributes or the reactions to the viewing target content between the current viewer and the past viewer is higher will be hereinafter described.

More specifically, the viewer content selecting unit 204 determines a viewer content having a higher matching degree indicating an amount of common points, such as the attribute or preference, between viewers by comparing the header information or the meta information of the current viewer with that of the past viewer, and selects an appropriate viewer content for the current viewer. Conversely, since it is probable that viewing video that has been viewed by other viewers having different attributes and preferences enables the current viewers to obtain a new point of view and perspective to the viewing target content, the viewer content having a lower matching degree may be selected.

In another example of a specific operation of the viewer content selecting unit 204, a case where matching degrees between viewer information items are calculated and a viewer content having the highest matching degree is selected will be described hereinafter.

For example, three viewers (viewer IDs are User1, User2, and User3) start viewing the content A that is a viewing target content. The content A has already been viewed five times, and the viewer information storage unit 402 stores viewer contents A-1 for the first viewing to A-5 for the fifth viewing as illustrated in FIG. 10.

First, the viewer content selecting unit 204 calculates a matching degree between viewer information items (S106). For simplification, this example will be described with calculation of a matching degree between viewer IDs in header information. Assuming that the matching degree between viewer information items herein is defined as a degree in which the viewer information items match or are identical to each other between the current viewers and the past viewers, the matching degree between viewer IDs may be defined as the number of the same viewers overlapping between the current viewers and the past viewers.

Figure 10:
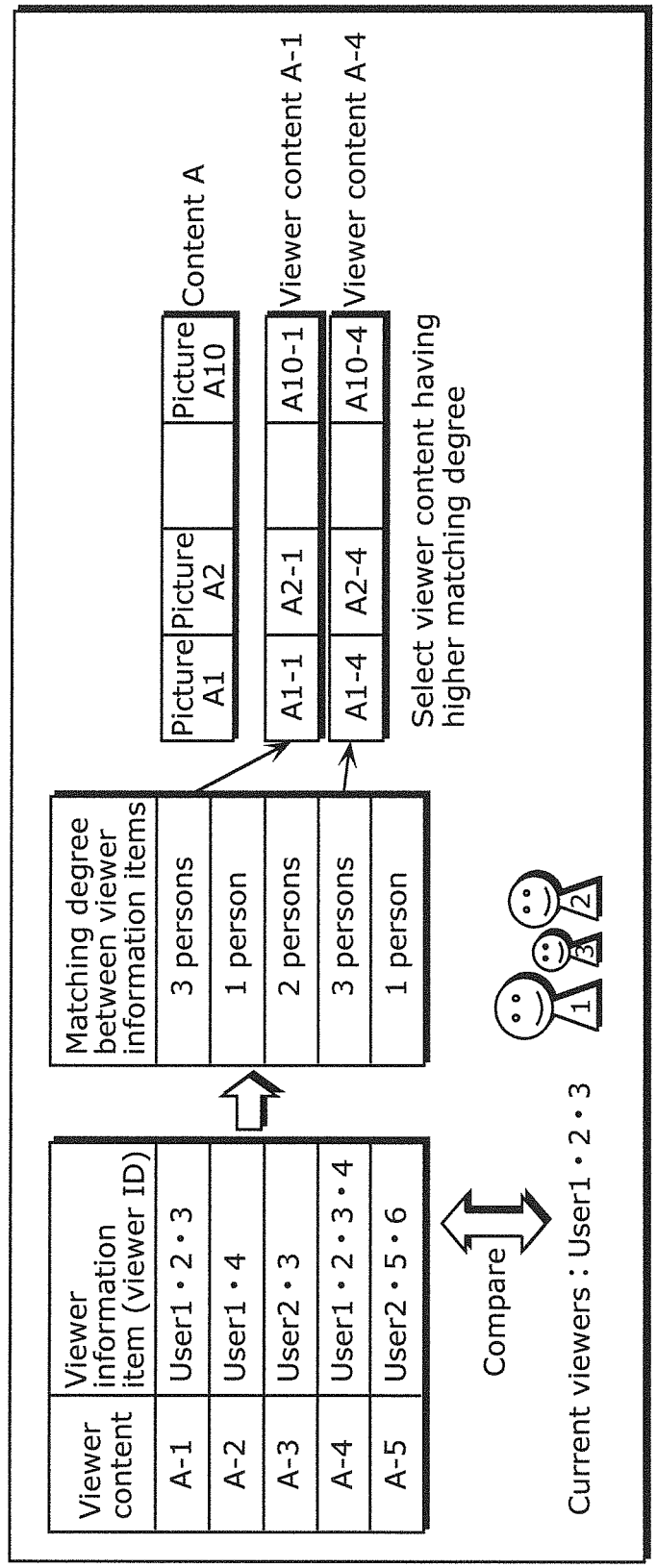
FIG. 10 illustrates an operation example of a viewer content selecting unit according to Embodiment 1.

As illustrated in FIG. 10, the viewer IDs of the viewer content A-1 are the User1, User2, and User3 from the header information included in the viewer information item stored in the viewer information storage unit 402. Similarly, the viewer IDs of the viewer contents A-2, A-3, A-4, and A-5 are the User1 and User4, User2 and User3, User1, User2, User3, and User4, and User2, User5, and User6, respectively. Since the current viewers are three users of User1, User2, and User3, the matching degree of the viewer IDs are 3 viewers for the viewer content A-1, 1 viewer for the viewer content A-2, 2 viewers for the viewer content A-3, and 1 viewer for the viewer content A-5. Thus, the viewer contents A-1 and A-4 have the highest matching degree between the viewer IDs. Accordingly, the viewer content selecting unit 204 selects one of or both of the viewer contents A-1 and A-4 as a viewer content or viewer contents (S107).

When the number of viewers increases or decreases during the time when the viewers are viewing a viewing target content, since the header information of the viewer IDs is updated, a viewer content may be reselected by calculating a matching degree between the viewer IDs. However, change in the viewer content is not desired for the viewers who are viewing the current viewer content. Thus, when the user desires to reselect the current viewer content, it is desired that the viewer explicitly notifies the content playback apparatus 100 to reselect the viewer content.

Although the matching degree between viewer IDs is calculated, it may be calculated using other header information or meta information.

Although a viewer content having the highest matching degree between viewer information items is selected in the aforementioned example, the number of viewer contents may be determined according to an initial value or a value specified by the viewers, and the viewer contents may be selected in descending order of the matching degrees.

For example, in the example of FIG. 10, the viewer contents A-1 and A-4 have the highest matching degree between the viewer IDs. When the number of viewer contents to be selected is one, the precision of the matching degree is increased by calculating the number of non-matching viewer IDs. More specifically, the viewers of the viewer content A-1 have the same viewer IDs as the current viewers. In contrast, in the viewer content A-4, the viewer ID of one viewer (User4) does not match those of the current viewers. In other words, it is determined that the matching degree of the viewer content A-1 is higher than that of the viewer content A-4, so that the viewer content selecting unit 204 selects the viewer content A-1. Furthermore, when other viewer information items, such as a sight line position or movement of the head of a viewer, vary and are updated with time, matching degrees between the viewer information items may be calculated by calculating averages of the matching degrees during a time period or statistical values of the matching degrees such as a standard deviation and then using these values as the viewer information items for comparison.

Although the number of the viewer contents to be selected is one in the example, the number may be two or more.

Although in the example, a matching degree between viewer information items is calculated using one indicator (viewer IDs), the matching degree may be calculated using multiple indicators. In this case, assuming that i(n) denotes a matching degree between n viewer information items, and $a_n$ denotes a weighting coefficient of the n viewer information items, the matching degree can be calculated using viewer information items according to Equation 1. Furthermore, regulating the balance of the weighting coefficient $a_n$ makes it possible to determine which one of matching degrees between viewer information items is emphasized in order to control selecting a viewer content.

[Math. 1]

$$\text{Matching degree between viewer information items} = a_1 i(1) \times a_2 i(2) \times a_3 i(3) \times \ldots \times a_2 i(2) \quad \text{(Equation 1)}$$

<Display Control Unit 205>

The display control unit 205 sets a display parameter for playing back, by the content playback unit 30, the viewing target content obtained from the content storage unit 401 and the viewer content selected by the viewer content selecting unit 204 (S108). The display parameter includes information of respective positions and sizes, a time, etc. for playing back the viewing target content and the viewer content by the content playback unit 30. Furthermore, when the viewing target content and the viewer content are displayed to be superimposed on the video display screen 301, the display parameter may include information on, for example, a position relationship between the viewing target content and the viewer content in a depth direction and the transparency. Furthermore, the information may include information on whether or not sound of the viewer content is output from the sound output speaker 302, and on the volume of the viewer content when the sound is output.

Figure 11A:
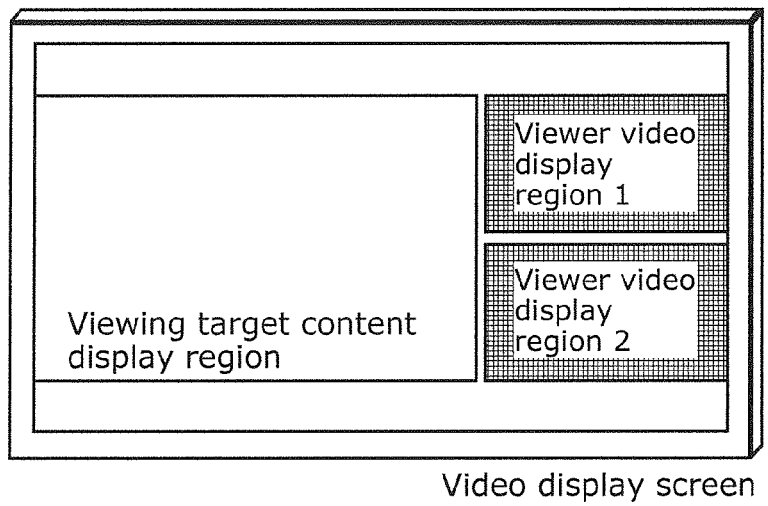
FIG. 11A illustrates an example of displaying a viewing target content and viewer contents displayed side by side on a video display screen according to Embodiment 1.
Figure 11B:
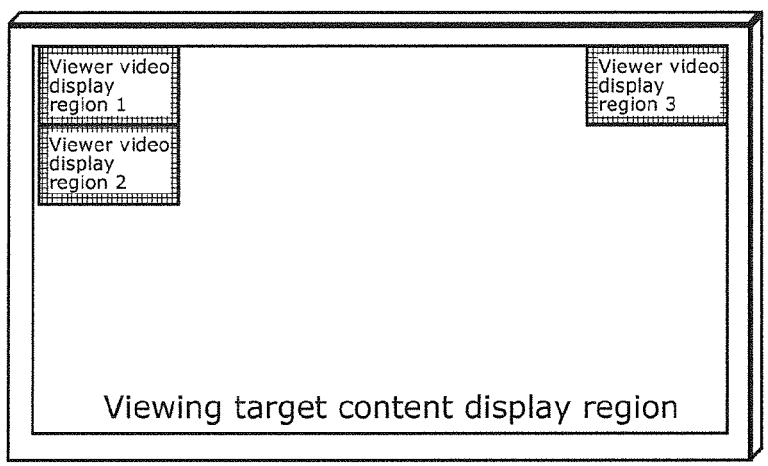
FIG. 11B illustrates an example of displaying viewer contents to be superimposed on a viewing target content, on a video display screen according to Embodiment 1.
Figure 11C:
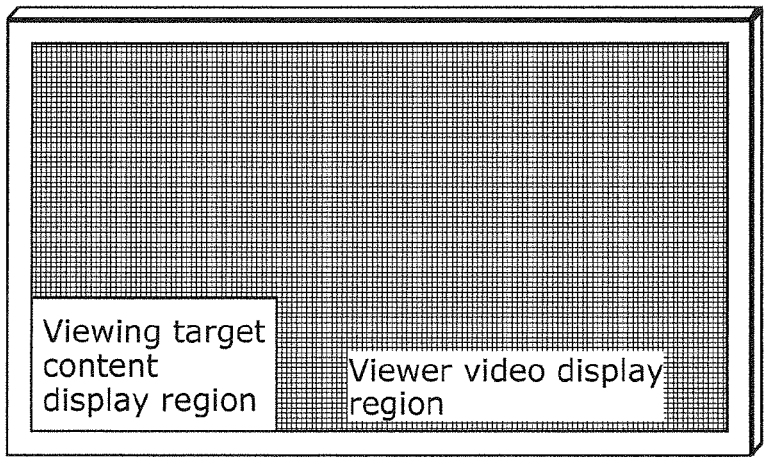
FIG. 11C illustrates an example of displaying a viewing target content to be superimposed on a viewer content, on a video display screen according to Embodiment 1.

FIGS. 11A to 11C illustrate examples of position relationships between viewing target contents and viewer contents when they are displayed on the video display screen 301. FIG. 11A illustrates an example of displaying a viewing target content and two viewer contents side by side so that the contents are not superimposed on each other. Furthermore, FIG. 11B illustrates an example of displaying three viewer contents to be superimposed on a viewing target content. Furthermore, FIG. 11C illustrates an example of displaying a viewing target content to be superimposed on a viewer content.

The viewer can arbitrarily change the number of viewer contents to be displayed on the video display screen 301, through the viewer input receiving unit 103.

<Content Playback Unit 30>

The content playback unit 30 displays video data included in a viewing target content and a viewer content, on the video display screen 301 according to the display parameter set to the display control unit 205, and outputs the sound data to the sound output speaker 302 (S109). The viewing target content is played back in parallel with the viewer content, in Embodiment 1 and Embodiments 2 to 5 to be described later. However, since only a viewing target content is played back during a time for obtaining the viewer information items necessary for selecting a viewer content, the start of playing back the viewer content is slightly delayed.

<Advantage>

With the configuration, one of past viewer contents obtained in the past when the same viewing target content has been viewed is selected based on a matching degree between viewer information items or between content meta information items. Accordingly, a viewer content is preferentially selected according to characteristics, such as an attribute of a viewer, and a point of view or preference to a viewing target content, so that the content can be displayed. Furthermore, a matching degree between viewer information items is updated according to the increase or decrease in the number of viewers, so that the viewer content can be selected according to change in the characteristics of the viewers.

Embodiment 2

A content playback apparatus 200 according to Embodiment 2 will be described hereinafter.

The content playback apparatus 200 according to Embodiment 2 determines a display size and a display position of a viewer content based on a sight line position and a viewing position of a viewer, when the viewer content is displayed to be superimposed on a viewing target content. More specifically, a content playback unit includes a display screen for displaying image data included in the viewer content and the viewing target content. The content playback apparatus 120 further includes a display control unit that displays a viewing target content on an entire display screen, and displays a viewer content to be superimposed on a part of the viewing target content. The display control unit includes: a non-attention region estimation unit configured to estimate, on the display screen, a non-attention region that is a region outside of a region on which the first viewer focuses attention; and an effective visual field estimation unit configured to estimate an effective visual field of the first viewer on the display screen, and the display control unit is configured to display the viewer content within the non-attention region and the effective visual field.

Figure 13:
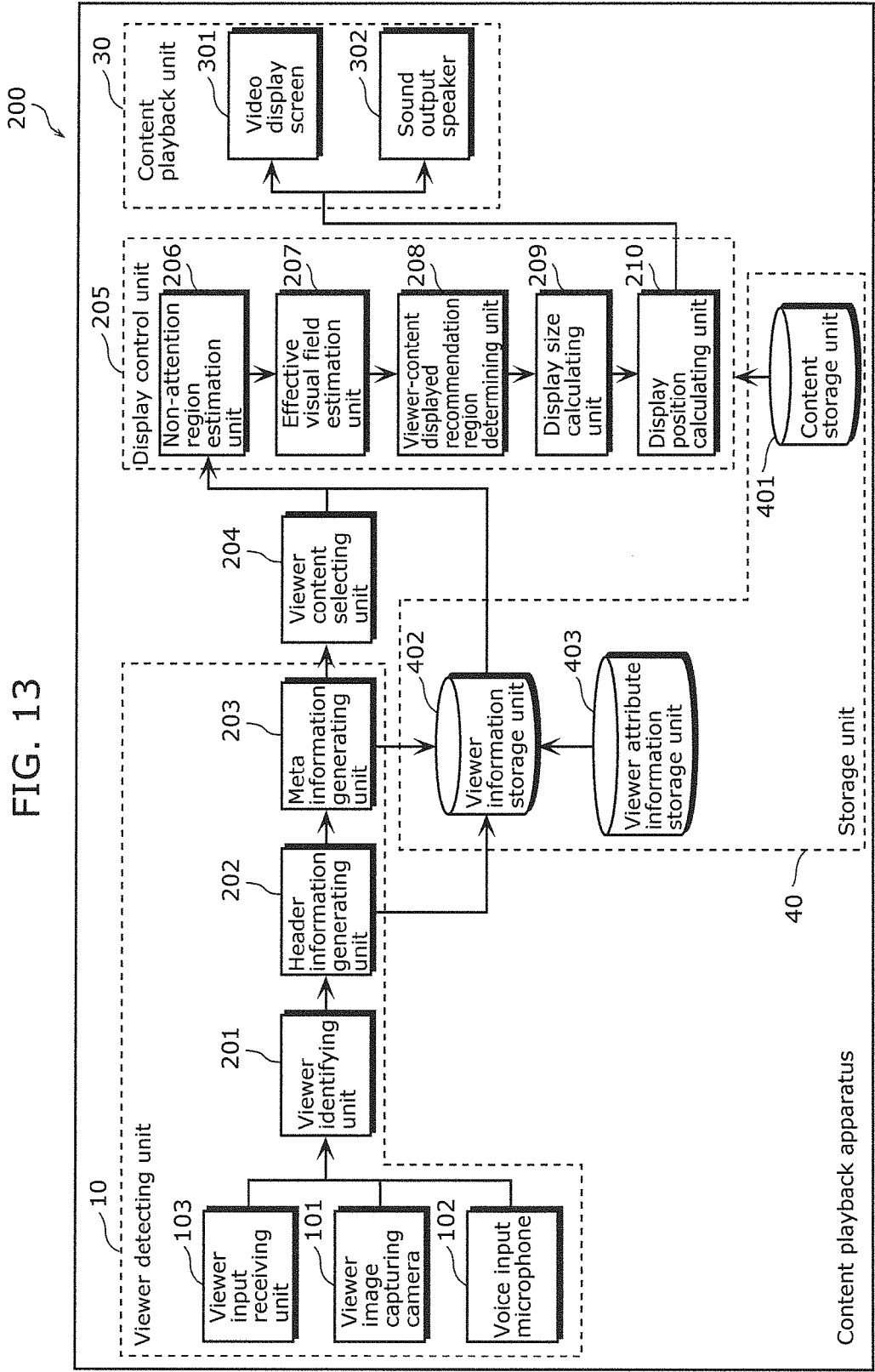
FIG. 13 is a block diagram illustrating a configuration of a content playback apparatus 200 according to Embodiment 2 in the present invention.

FIG. 13 is a block diagram illustrating a configuration of the content playback apparatus 200 according to Embodiment 2. Since the content playback apparatus 200 according to Embodiment 2 has almost the same configuration as that of the content playback apparatus 100 according to Embodiment 1, the detailed description of the constituent elements having the same functions as those in Embodiment 1 will be omitted using the same reference numerals.

<Configuration>

The content playback apparatus 200 includes a viewer detecting unit 10, a storage unit 40, a viewer content selecting unit 204, and a content playback unit 30. Since the constituent elements other than the display control unit 205 have the same functions as those according to Embodiment 1, the detailed description thereof will be omitted in Embodiment 2.

The display control unit 205 includes a non-attention region estimation unit 206, an effective visual field estimation unit 207, and a viewer-content displayed recommendation region determining unit 208. The non-attention region estimation unit 206 estimates an attention region (non-attention region) from a current sight line position of each viewer or the transition of the sight line position, based on a viewer information item. The effective visual field estimation unit 207 estimates a current effective visual field of each viewer based on a viewer information item. The viewer-content displayed recommendation region determining unit 208 determines, on a video display screen 301, a display region appropriate for displaying a viewer content for all viewers.

Furthermore, the display control unit 205 includes a display size calculating unit 209 and a display position calculating unit 210. The display size calculating unit 209 calculates a display size of a viewer content on the display region determined by the viewer-content displayed recommendation region determining unit 208. The display position calculating unit 210 calculates a display position of the viewer content on the display region determined by the viewer-content displayed recommendation region determining unit 208. Then, the display control unit 205 outputs, to the content playback unit 30, the viewer content and the viewing target content according to a parameter including the calculated display size and display position.

With reference to FIG. 6, operations of the display control unit 205 will be described in detail, assuming a scene in which three users of User1, User2, and User3 view a content, for example.

Each of viewer image capturing cameras (image capturing units) 101 that operates as a viewer content obtaining unit captures images of first viewers who are currently viewing a viewing target content played back by the content playback apparatus 200, and outputs the captured images as a viewer content. A viewer identifying unit 201 identifies the three viewers with the viewer IDs of User1, User2, and User3 in the same manner as according to Embodiment 1. Each viewing position of the viewers is calculated in the same method as Embodiment 1, and is stored in a viewer information storage unit 402 as meta information. A meta information generating unit 203 that operates as a viewer information obtaining unit extracts information for identifying a position of a view point of the first viewer, from the images captured by the viewer image capturing cameras 101.

<Viewer Content Selecting Unit 204>

The viewer content selecting unit 204 selects a viewer content according to an input from a viewer input receiving unit 103 or a predetermined rule (for example, selecting a latest viewer content). Alternatively, the viewer content selecting unit 204 selects a viewer content based on a matching degree between viewer information items, as according to Embodiment 1.

<Display Control Unit 205>

The display control unit 205 calculates a display parameter of the viewer content selected by the viewer content selecting unit 204, based on header information generated by the header information generating unit 202 or meta information generated by the meta information generating unit 203 (that is, a viewer information item of the current viewer) in order to display a viewing target content and the viewer content according to the behavior or attitude of the viewer so that the viewer can easily view the contents. Hereinafter, a method of calculating a display parameter based on a sight line position of the viewer in the meta information will be described as an example.

For example, since the viewer contents are not displayed to be superimposed on the viewing target content in a display example of FIG. 11A, each of the sub-screens can be viewed. In contrast, since the viewer contents and the viewing target contents are displayed with superimposition in the display examples of FIGS. 11B and 11C, the display control unit 205 calculates each display parameter based on a sight line position of each viewer or the transition of the sight line position in order for the viewer to easily view both of the viewing target contents and the viewer contents.

First, the display control unit 205 estimates a region within a viewing target content on which the viewer does not focus attention (hereinafter referred to as a non-attention region) to display the viewing target content to be easily viewed, and determines the non-attention region as a display target region of a viewer content. When the video display screen 301 is very large in particular, the display control unit 205 may estimate an effective visual field of each viewer, and determine a common portion between the non-attention region and the effective visual field as a display target region of a viewer content.

In order to implement this, the display control unit 205 extracts a viewing position and an orientation of a head of a viewer from meta information of the viewer information item, (1) estimates a "non-attention region" on a content on which the viewer does not focus attention, (2) estimates an "effective visual field" of the viewer, (3) determines a viewer-content displayed recommendation region, and (4) calculates a display parameter (display size, display position) of the viewer content.

Hereinafter, operations of the content playback apparatus 200 according to Embodiment 2 will be described with reference to FIGS. 14A to 19. Since processes S200 to S206 in FIG. 19 correspond to the processes S100 to S107 in FIG. 12, the description thereof will be omitted. However, a viewer content may be selected based on a parameter other than a matching degree at S206 in FIG. 19

(1) Estimation of a Non-Attention Region

The non-attention region estimation unit 206 estimates a non-attention region of a viewer who is currently viewing a viewing target content (S207). The non-attention region is a region of a viewing target content on which no viewer focuses attention, and is estimated from an attention region on which each viewer focuses attention.

More specifically, a viewer information item includes information for identifying a position of a view point of the first viewer on the video display screen 301. Then, the non-attention region estimation unit 206 estimates, as a non-attention region, a region outside of a predetermined region including all positions, on the video display screen 301, at each of which a view point of the first viewer identified by the viewer information item is fixed for a predetermined fixation time or longer within a predetermined time period.

An example of a method of estimating a non-attention region will be described using examples in FIGS. 14A to 14C and 15.

The meta information generating unit 203 detects an orientation of eye balls by extracting a region of the face and a region of the eyes of the viewer from a viewer content using image processing to estimate a sight line position of the viewer in real time.

There are various methods of estimating a sight line position and an attention region of a viewer from the sight line position. FIG. 15 illustrates an example of a method of estimating an attention region of each viewer based on the transition and fixation of a sight line position for a predetermined time period.

It is assumed herein that on the video display screen 301, seven attention points are detected for a predetermined time period (T seconds). The attention point is a position at which a sight line of a viewer is fixed for a predetermined fixation time (x seconds) or longer. Among polygons generated by connecting any of the attention points by straight lines, the largest polygon including all the attention points is generated (a pentagon is generated in FIG. 15). Furthermore, another polygon generated by adding a distance y to a perimeter of the polygon is estimated as an attention region of a viewer. Here, y is provided for considering an error when a sight line position is estimated.

Figure 14A:
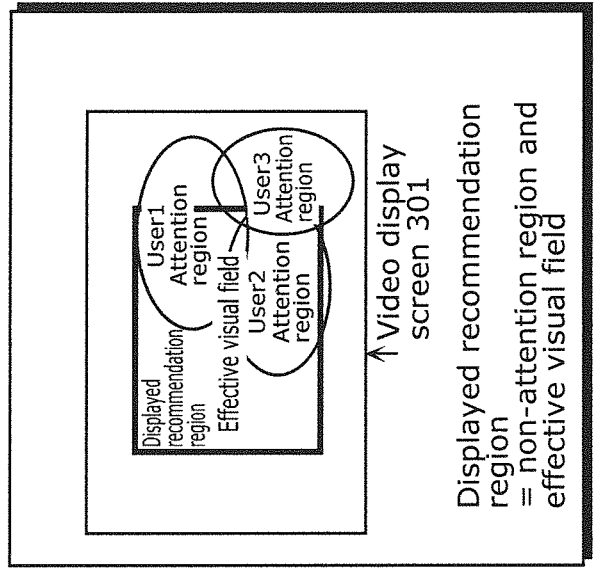
FIG. 14A illustrates an example of a method of estimating a non-attention region according to Embodiment 2.

The viewers in this example are the three users of User1, User2, and User3. When an attention region of each of the viewers for a predetermined time period (T seconds) is estimated as illustrated in FIG. 14A, the non-attention region of the viewers is estimated using Equation 2 based on a union of the attention regions of all the viewers. In Equation 2, "Display region" represents a display region of the video display screen 301, "N" denotes the number of viewers, and "+" denotes a logical sum.

[Math. 2]

Non-attention region=Display region−(attention region of User1+attention region of User2+ . . . +attention region of User$N$) (Equation 2)

Here, the length of a predetermined time T may be arbitrarily defined. For example, the length of the predetermined time T may be an average of time periods during which the number of transitions of a sight line position is fixed to a value equal to or smaller than a predetermined value, that is, the sight line position becomes stable. The length of the predetermined time T may be calculated from information of the sight line position estimated when the same content as the viewing target content that is stored in the viewer information storage unit 402 has been viewed.

Furthermore, the length of the fixation time x may be arbitrarily defined, for example, calculated using an average fixation time at one attention point.

There are various methods of estimating an attention region based on a sight line position. Other methods may be used, not limited to these methods.

(2) Estimation of an Effective Visual Field

The effective visual field estimation unit 207 estimates an effective visual field of each viewer on the video display screen 301 (S208). It is said that the effective visual field is a range that the viewer can visually recognize by the eyes without moving the head, and varies according to a psychological state. In general, the effective visual field is defined as a range approximately between 30 degrees in a horizontal direction and 20 degrees in a vertical direction with respect to a view point.

More specifically, a viewer information item includes information for identifying a position of a view point of the first viewer on the video display screen 301. Then, the effective visual field estimation unit 207 estimates a predetermined region with respect to the position of the view point of the first viewer identified by the viewer information item, as an effective visual field.

When the distance between the viewer and the video display screen 301 is constant, as the display region on the video display screen 301 is larger, a region outside of the effective visual field becomes larger. When a viewer content is displayed outside of the effective visual field, it is highly likely that the viewer will not notice that the viewer content is displayed on the video display screen 301. Furthermore, even when the viewer notices that the viewer content is being displayed, the viewer has to move the head or the upper body. As a result, the burden of the viewer increases according to increase in a change amount in posture or an amount of movement. Thus, the viewer content is desirably displayed within the effective visual field as much as possible.

Figure 16:
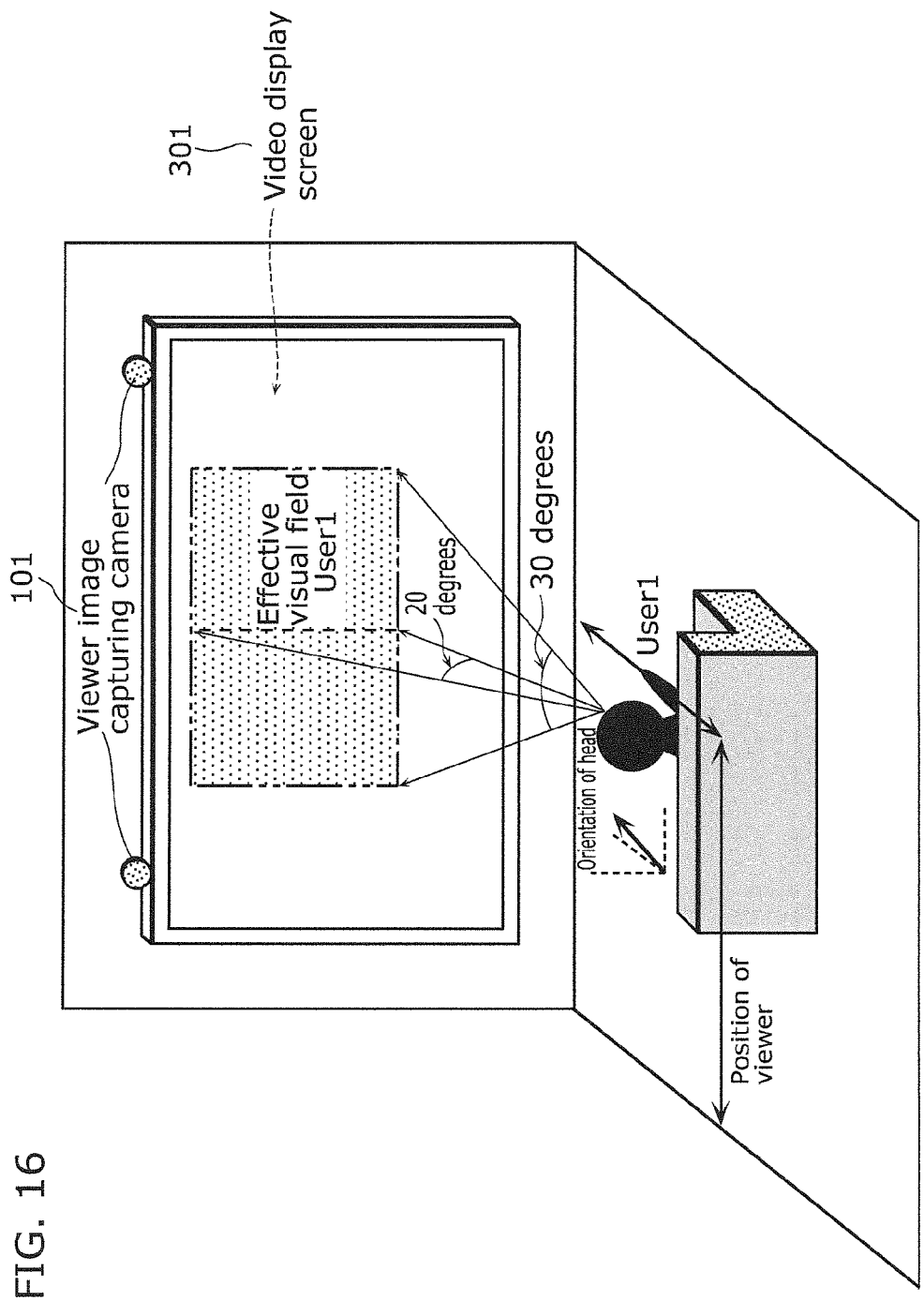
FIG. 16 illustrates an example of procedure for estimating an effective visual field of a viewer using an effective visual field estimation unit according to Embodiment 2.

The effective visual field estimation unit 207 can estimates an effective visual field from a position of the viewer and an orientation of the head. Since the meta information generating unit 203 generates such information, the effective visual field estimation unit 207 can obtain the effective visual field with reference to the viewer information storage unit 402 or directly from the meta information generating unit 203. For example, as illustrated in FIG. 16, the effective visual field estimation unit 207 estimates the effective visual field of the viewer on the video display screen 301, using a position of the viewer, a distance between the viewer and the video display screen 301, an orientation of the head, and a predetermined effective visual field.

Figure 14B:
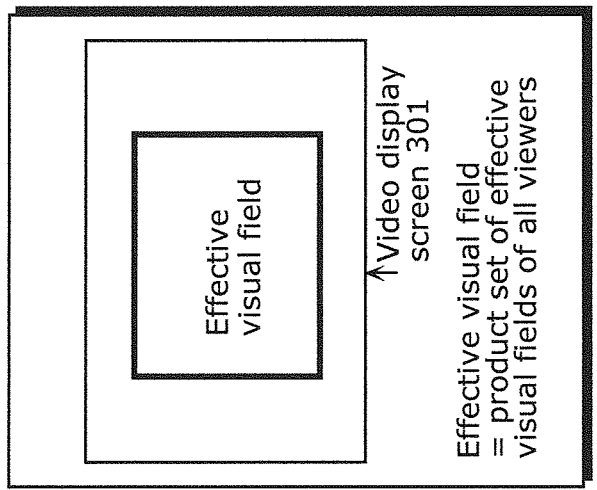
FIG. 14B illustrates an example of a method of estimating an effective visual field according to Embodiment 2.
Figure 17:
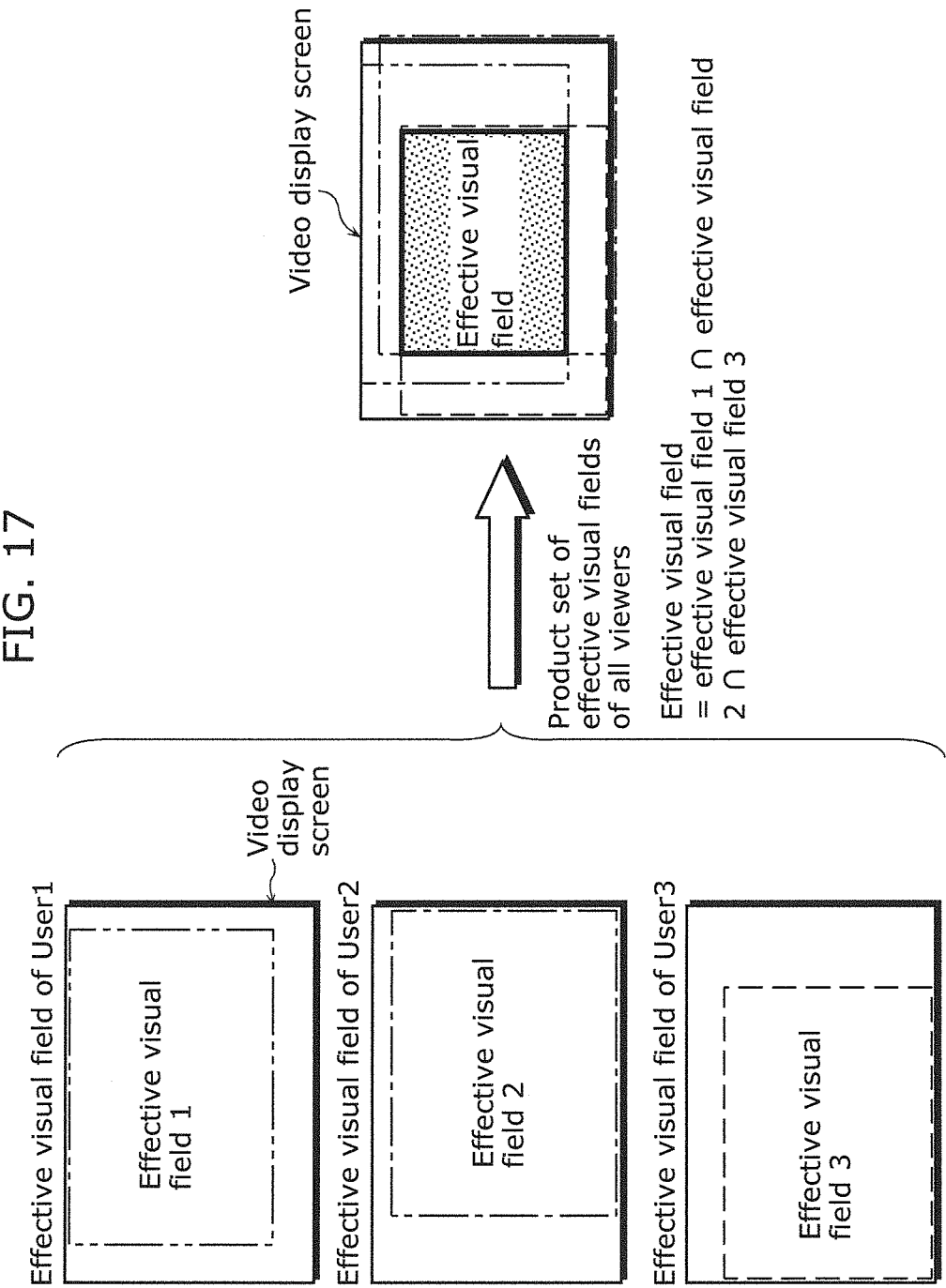
FIG. 17 illustrates an example of procedure for estimating an effective visual field between viewers using an effective visual field estimation unit according to Embodiment 2.

When the effective visual field of each viewer is estimated as illustrated in FIG. 17, an effective visual field of this viewer group is estimated using Equation 3 as a product set of the effective visual fields of all the viewers, thus obtaining an example effective visual field as illustrated in FIG. 14B. N denotes the number of viewers, and "×" denotes a logical product.

[Math. 3]

Effective visual field=effective visual field of User1× effective visual field of User2× . . . ×effective visual field of User$N$ (Equation 3)

(3) Determination of a Viewer-Content Displayed Recommendation Region

Figure 14C:
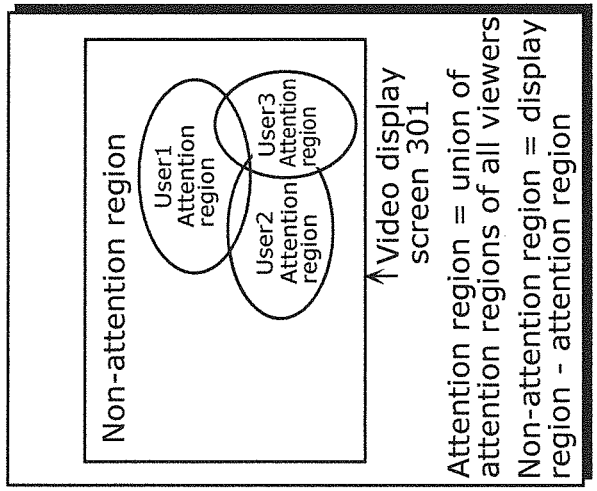
FIG. 14C illustrates an example of a method of determining a viewer-content displayed recommendation region according to Embodiment 2.

The viewer-content displayed recommendation region determining unit 208 determines a region within a non-attention region of a viewing target content and possibly within an effective visual field, as a viewer-content displayed recommendation region that is a region appropriate for displaying a viewer content (hereinafter referred to as displayed recommendation region) (S209). As illustrated in FIG. 14C, a displayed recommendation region of a viewer content is determined using Equation 4 based on the non-attention region estimated by Equation 2 and the effective visual field estimated by Equation 3. Here, "×" denotes a logical product in Equation 4.

[Math. 4]

viewer-content displayed recommendation region=non-attention region×effective visual field (Equation 4)

Although not illustrated in the configuration of FIG. 13, since various information items estimated or determined by the non-attention region estimation unit 206, the effective visual field estimation unit 207, and the viewer-content displayed recommendation region determining unit 208 are obtained based on a viewer information item, the obtained information may be stored in the viewer information storage unit 402 as a viewer information item.

(4) Calculation of Display Parameters of a Viewer Content

The display size calculating unit 209 calculates a display size, and the display position calculating unit 210 calculates a display position, among the display parameters of a viewer content (S210).

Figure 18:
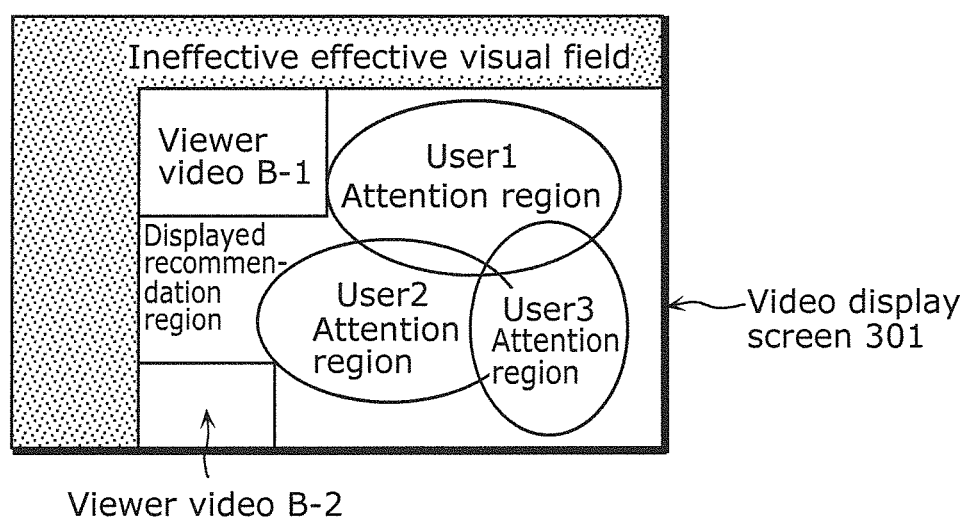
FIG. 18 illustrates an example of procedure for calculating display parameters of viewer contents using a display control unit according to Embodiment 2.
Figure 19:
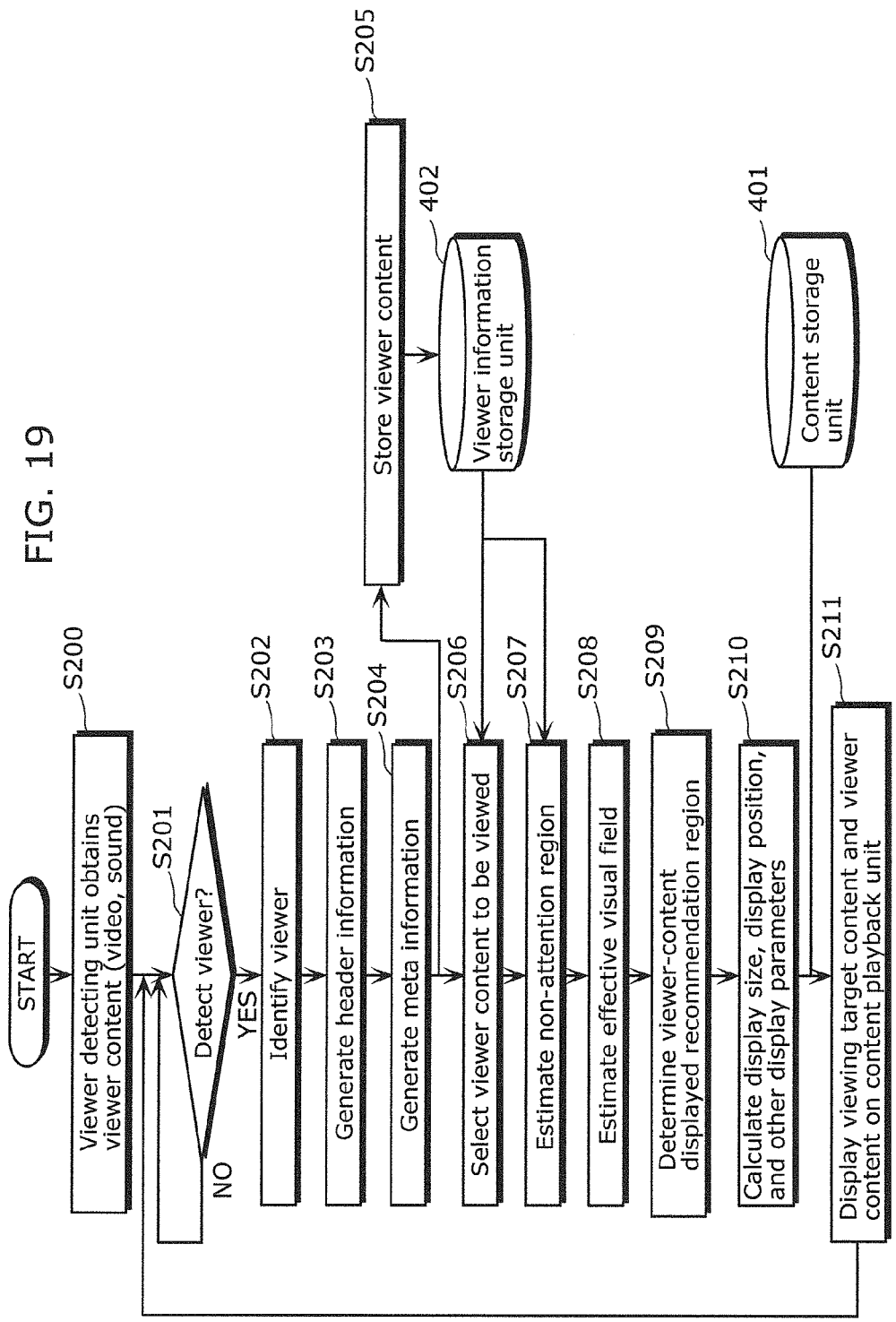
FIG. 19 is a flowchart indicating an example of operations performed by the content playback apparatus according to Embodiment 2.

FIG. 18 illustrates an example of displaying viewer contents to be superimposed on a viewing target content. Assume that the viewer content selecting unit 204 selects two viewer contents B-1 and B-2. Next, priorities for displaying the viewer contents are determined to display the viewer contents in descending order of the display priorities, to be placed at respective positions or with respective sizes such that the viewers can easily view the viewer contents. The display priorities may be arbitrarily determined by the viewer, or based on a viewer information item as according to Embodiment 1. Suppose the display priorities of the viewer contents are determined in the order of B-1 and then B-2, the viewer content B-1 is displayed at a position and with a size that are the easiest viewing position and size for the viewer to view, and next, the display position of the viewer content B-2 is determined.

In other words, when the viewer content selecting unit 204 selects viewer contents, the display control unit 205 determines display positions and display sizes of the selected viewer contents in descending order of the display priorities.

As illustrated in FIG. 18, the display size calculating unit 209 calculates the size of a region in which the viewer content B-1 can be displayed at the maximum size without changing the video aspect ratio, within the viewer-content displayed recommendation region determined by the viewer-content displayed recommendation region determining unit 208. The display position calculating unit 210 calculates the position coordinates of the region. Next, the display size calculating unit 209 calculates the display size and the display position calculating unit 210 calculates the display position of the viewer content B-2 in the same manner as the viewer content B-1, in a region excluding a region for displaying the viewer content B-1 from the viewer-content displayed recommendation region.

When there are three or more viewer contents, the display size calculating unit 209 calculates respective display sizes of the viewer contents and the display position calculating unit 210 calculates respective display positions thereof in the same procedure. When the display size calculating unit 209 determines that the current display size is not suitable for the viewer to view a region in which a viewer content is displayed within the viewer-content displayed recommendation region, the region may be displayed outside of the effective visual field.

Other display parameters (a display time period, a position relationship between contents in a depth direction, transparency, volume, etc.) may be determined based on a predetermined initial value or a value arbitrarily entered by the viewer through the viewer input receiving unit 103.

In view of a possible case where the estimation of a sight line position is not correct, the calculated display size and display position may be arbitrarily changed by the viewer through the viewer input receiving unit 103 after displaying the viewer content.

With the operations, the display control unit 205 can calculate a display parameter based on a viewer information item so that a viewer content can be easily viewed by the viewer.
<Output Device>

The video display screen 301 and the sound output speaker 302 that compose the content playback unit 30 play back a viewing target content and a viewer content, according to the calculated display parameter (S211).

There are various methods of detecting a sight line position using the image processing, and thus the detection is not limited to the method described herein.

Furthermore, a method of calculating an attention region is not limited to the method described herein.

Furthermore, although the display control unit 205 displays a viewer content within a viewer-content displayed recommendation region, the display control unit 205 may set the smallest display area of a viewer content in advance, and display a part of the viewer content to be superimposed on a region outside of the effective visual field estimated by the effective visual field estimation unit 207 when the display size calculating unit 209 calculates a display size that is smaller than the set smallest display area.
<Advantage>

According to the configuration, with the estimation of an attention region based on a viewer information item, a viewer content can be displayed at a position that does not prevents the viewer from viewing the region on which the viewer focuses attention and for which the view position is considered. Furthermore, both the viewing target content and the viewer content can be displayed at positions easily viewed by the viewers.

Embodiment 3

A content playback apparatus 300 according to Embodiment 3 in the present invention will be hereinafter described.

The content playback apparatus 300 according to Embodiment 3 determines a display start time at which a viewer content is displayed together with a viewing target content based on a viewer information item. More specifically, a content playback unit includes a display screen that displays image data included in the viewing target content and the viewer content selected by the viewer content selecting unit. Furthermore, the content playback apparatus further includes a display control unit configured to display the viewer content on the display screen, after a lapse of a predetermined time after displaying the viewing target content on the display screen, and the display control unit includes: an attention region estimation unit configured to estimate, on the display screen, respective attention regions that are regions on which a plurality of first viewers including the first viewer focus attention; an attention region matching degree calculating unit configured to calculate an attention region matching degree that is a matching degree between the attention regions of the plurality of first viewers estimated by the attention region estimation unit; and a display time control unit configured to set the predetermined time longer as the attention region matching degree calculated by the attention region matching degree calculating unit is higher.

Figure 20:
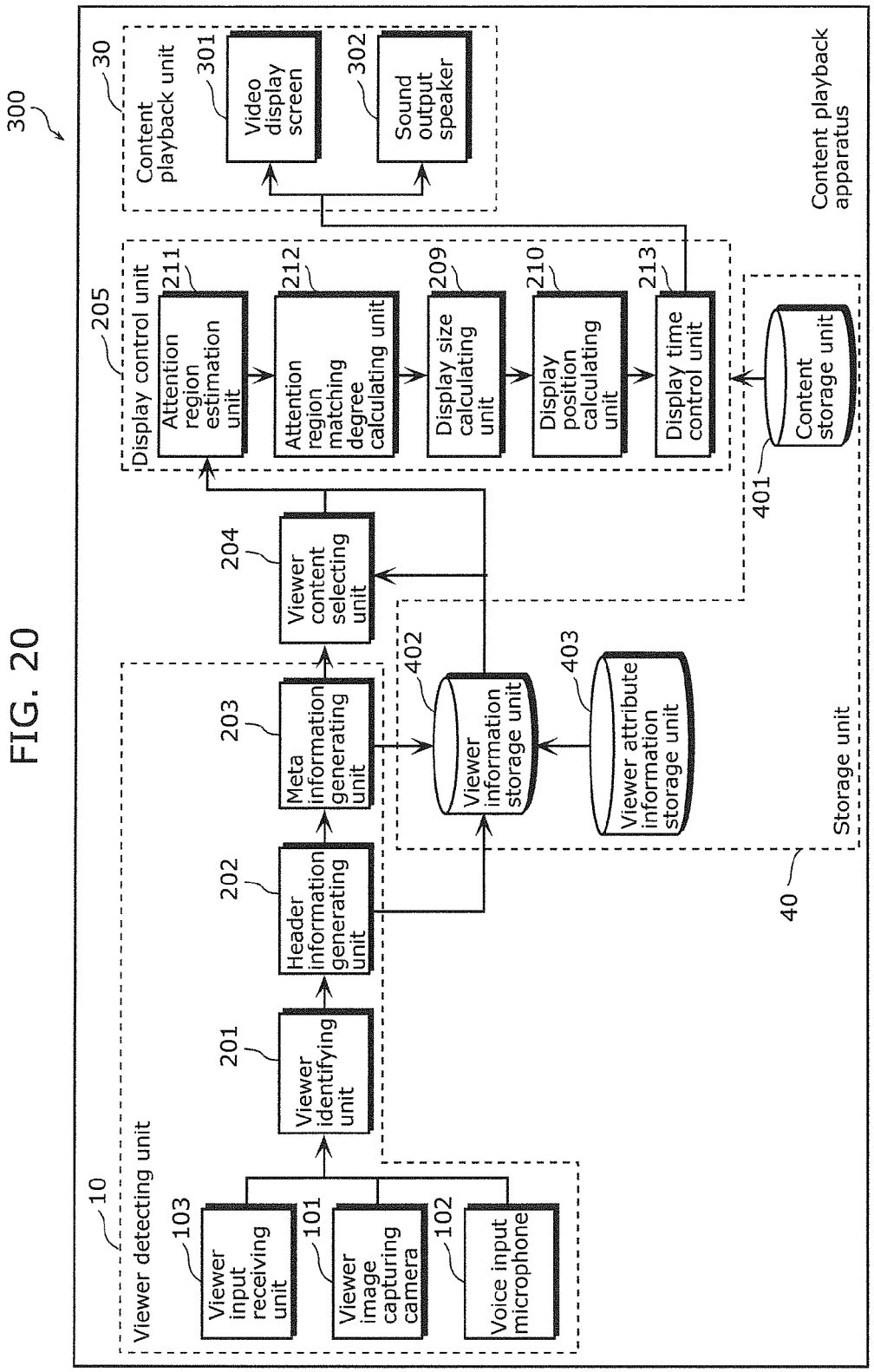
FIG. 20 is a block diagram illustrating a configuration of a content playback apparatus according to Embodiment 3 in the present invention.

FIG. 20 is a block diagram illustrating a configuration of the content playback apparatus 300 according to Embodiment 3. Since the content playback apparatus 300 according to Embodiment 3 has almost the same configuration as those of the content playback apparatuses 100 and 200 according to Embodiments 1 and 2, the detailed description of the constituent elements having the same functions as those in Embodiments 1 and 2 will be omitted using the same reference numerals.
<Configuration>

The content playback apparatus 300 according to Embodiment 3 includes a viewer detecting unit 10, a storage unit 40, a viewer content selecting unit 204, a display control unit 205, and a content playback unit 30. Since the constituent elements other than the display control unit 205 have the same functions as those according to Embodiments 1 and 2, the detailed description thereof will be omitted in Embodiment 3.

The display control unit 205 includes an attention region estimation unit 211 and an attention region matching degree calculating unit 212. The attention region estimation unit 211 estimates an attention region from a sight line position of a viewer or the transition of the sight line position, based on a viewer information item. The attention region matching degree calculating unit 212 estimates matching degrees between attention regions of the current all viewers.

Furthermore, the display control unit 205 includes a display size calculating unit 209, a display position calculating unit 210, and a display time control unit 213. The display time control unit 213 calculates a display start time of a viewer content among display parameters, based on one of the matching degrees between the attention regions calculated by the attention region matching degree calculating unit 212. Since the display size calculating unit 209 and the display position calculating unit 210 perform operations as according to Embodiment 2, the description thereof will be omitted. The display control unit 205 outputs a viewer content and a viewing target content to the content playback unit 30, according to the calculated display parameter.

The viewer identifying unit 201 identifies a viewer in the same operations as according to Embodiment 1. The header information generating unit 202 generates header information, the meta information generating unit 203 generates meta information, and the viewer information item is stored in the viewer information storage unit 402 together with the viewer content.

The viewer content selecting unit 204 selects a viewer content, according to an input from the viewer input receiving unit 103 or a predetermined rule (for example, selecting a latest viewer content). Alternatively, the viewer content selecting unit 204 selects a viewer content based on a matching degree between viewer information items, as according to Embodiment 1.

<Display Control Unit 205>

The display control unit 205 calculates a display parameter of the viewer content selected by the viewer content selecting unit 204, based on header information or meta information in order to display a viewing target content and a viewer content according to the behavior or attitude of the viewer so that the viewer can easily view the contents, as according to Embodiment 2. Embodiment 3 describes, in detail, a method of calculating, in particular, a display start time of a viewer content among display parameters.

One of the purposes of displaying a viewer content is to provide topics on a viewing target content that are obtained from the past viewers, using the viewer content, thus promoting conversation between the current viewers and making the viewers enjoy viewing the viewing target content. For that, the timing of displaying a viewer content for viewers is important. Thus, in Embodiment 3, the display control unit 205 calculates a degree in which attention regions of viewers in a viewing target content match, and calculates the appropriate timing for displaying a viewer content.

When there is a tendency for the current viewers to match the attention regions in a viewing target content, the display control unit 205 determines that the viewers are highly likely to have conversation about the attention regions, and delays the display timing of the viewer content. Conversely, when there is a tendency for the viewers not to match the attention regions in a viewing target content, the display control unit 205 determines that the viewers are less likely to have conversation about the attention regions, and starts to display the display timing of the viewer content early.

In order to implement these, based on viewer information items, the display control unit 205 (1) estimates an attention region on which the viewers focus attention on a viewing target content, (2) calculates an attention region matching degree between the viewers, and (3) calculates a display parameter (display start time) of the viewer content.

Hereinafter, operations of the content playback apparatus 300 according to Embodiment 3 will be described with reference to FIGS. 21A to 24. Since processes S300 to S306 in FIG. 24 correspond to the processes S200 to S206 in FIG. 19, the description thereof will be omitted.

(1) Estimation of a Non-Attention Region

The attention region estimation unit 211 estimates an attention region of each current viewer (S307). The attention region is a region of a viewing target content on which each viewer focuses attention. The non-attention region estimation unit 206 according to Embodiment 2 first estimates an attention region in order to estimate a non-attention region. In the same manner, the attention region estimation unit 211 has only to estimate an attention region between viewers.

The method of estimating an attention region is not limited to this method but may be other methods.

(2) Calculation of an Attention Region Matching Degree

The attention region matching degree calculating unit 212 calculates a degree in which the attention regions of viewers estimated by the attention region estimation unit 211 match (S308). Assuming an attention region matching degree as M, the attention region matching degree calculating unit 212 calculates each matching degree in which attention regions of at least two persons even slightly overlap one another.

As an area in which attention regions match is larger, the time during which the matching region is being viewed is longer, and the number of persons who focus attention on the matching region is larger, it can be determined that attention region matching degrees for a viewing target content between viewers are highly likely to match each other. Thus, it is defined that values of the attention region matching degrees are higher in such a case.

In other words, the attention region matching degree calculating unit 212 calculates, for each of overlapping regions in each of which two or more of the attention regions of the first viewers overlap, the attention region matching degree based on a product of (i) an area of the overlapping region, (ii) a length of a time during which the attention regions overlap, and (iii) the number of the first viewers who focus attention on the overlapping region.

First, the attention region matching degree calculating unit 212 calculates areas of attention regions.

Figure 21A:
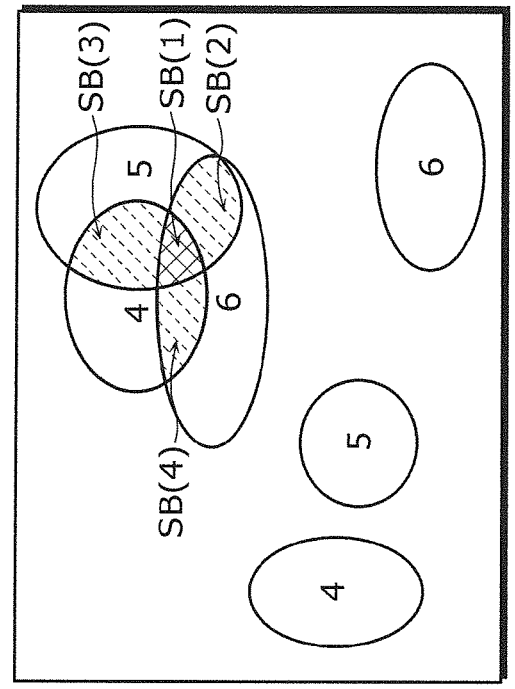
FIG. 21A illustrates an example of procedure for calculating an attention region matching degree in a viewer group A according to Embodiment 3.

FIG. 21A illustrates an example that a viewer group A views a picture C1 in a content C (see FIG. 3B). SA(1) represents an area of a region on which 3 persons, User1, User2, and User3 focus attention. Each of SA(2) to SA(5) represents an area of a region on which the 2 out of the 3 persons focus attention. As clarified from the definition, a region on which only one viewer focuses attention is a region in which no attention region matching degree is to be calculated. Assuming "s" is a constant, an area SA(i) (i=1 to 5) of an attention region is estimated as SA(1)=4 s, SA(2)=2 s, SA(3)=SA(4)=s, and SA(5)=2 s.

Next, a time during which the viewers focus attention on the area SA(i) (i=1 to 5) of the attention region is measured, and a product of viewing times TA(i) (i=1 to 5) is calculated for each of the attention regions as TA(1)=TA(2)=TA(3)=TA(4)=TA(5)=t. Here, "t" is a constant.

Next, for j attention regions in which attention regions of two or more persons overlap, a matching degree M(i) between attention regions i is calculated by dividing, by the number of all viewers n, a product of (1) an area S(i) of a matching attention region, (2) a product T(i) of times during which the viewers focus attention on the attention region, and (3) the number of persons N(i) who focus attention on the region. Then, the matching degree M between attention regions for predetermined T seconds is calculated as a sum of matching degrees M(i) of j attention regions. Based on this idea, the attention region matching degree M is defined using Equation 5.

[Math. 5]

$$M = \sum_{i=1}^{j} M(i) = \sum_{i=1}^{j} \frac{S(i)T(i)N(i)}{n} \quad \text{(Equation 5)}$$

The attention region matching degree MA of the viewer group A is calculated as Equation 6 when the values SA(i) and TA(i) (i=1 to 5) are substituted into Equation 5.

[Math. 6]

$$MA = MA(1) + MA(2) + MA(3) + MA(4) + MA(5)$$ (Equation 6)
$$= \frac{12abst^3}{3} + \frac{4abst^2}{3} + \frac{2abst^2}{3} + \frac{2abst^2}{3} + \frac{4abst^3}{3}$$
$$= abst^2(4t+4)$$

Figure 21B:
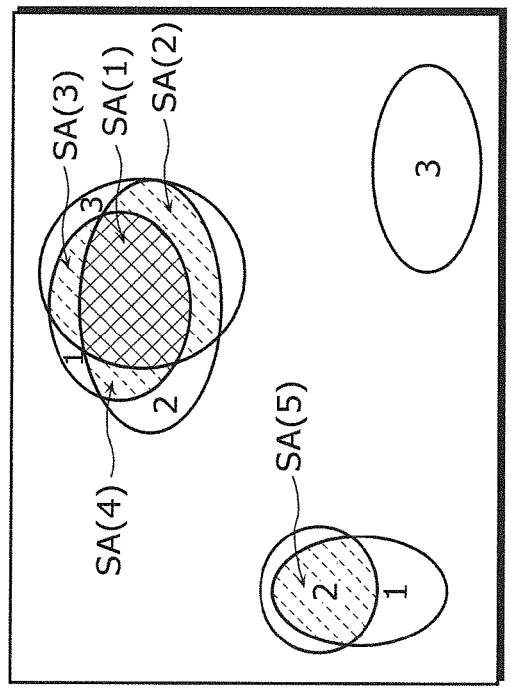
FIG. 21B illustrates an example of procedure for calculating an attention region matching degree in a viewer group B according to Embodiment 3.
Figure 22A:
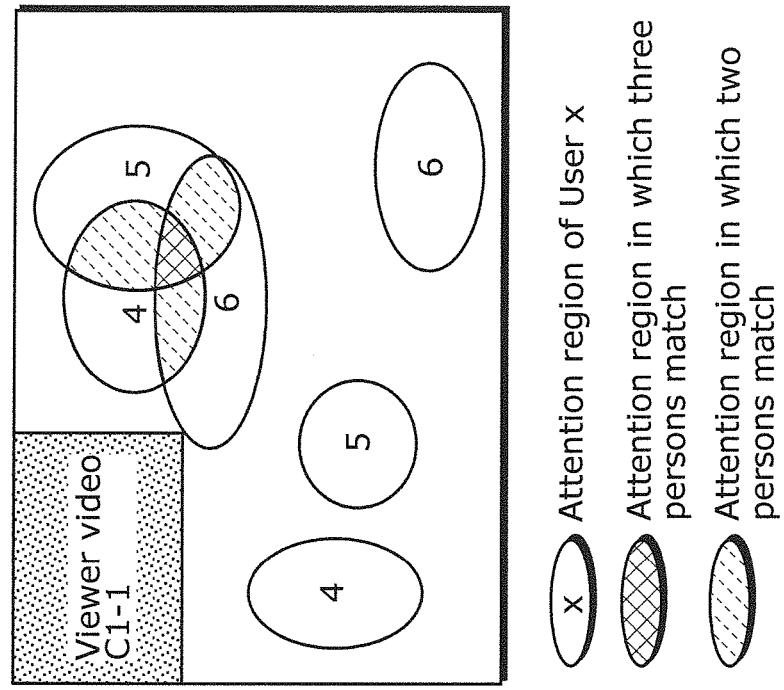
FIG. 22A illustrates an example of procedure for calculating display parameters of a viewer content to be displayed for the viewer group A according to Embodiment 3.
Figure 22B:
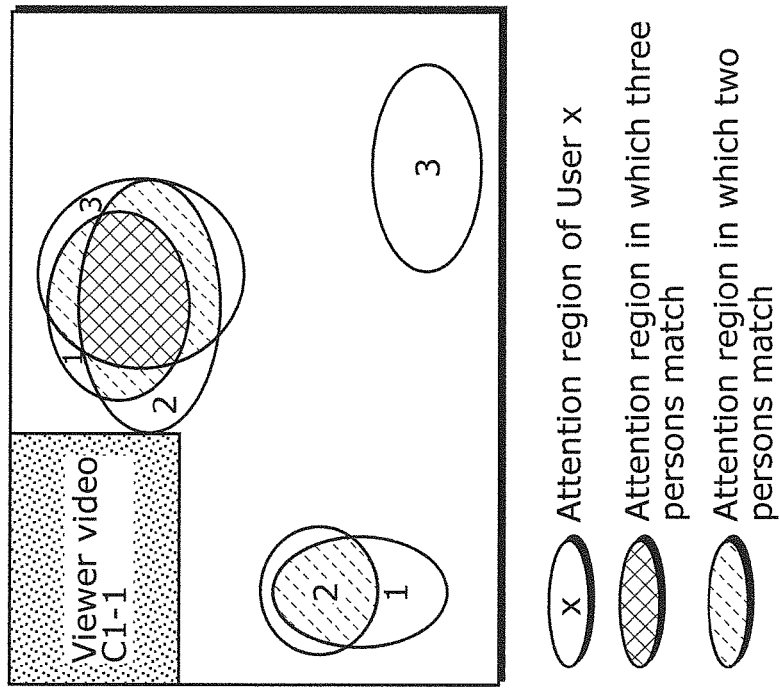
FIG. 22B illustrates an example of procedure for calculating display parameters of a viewer content to be displayed for the viewer group B according to Embodiment 3.

FIG. 21B illustrates an example that a viewer group B (User4, User5, and User6) views the picture C1 included in the content C in a different scene from that by the viewer group A.

SB(1) represents an area of a region on which 3 persons, User4, User5, and User6 of the viewer group B focus attention. Each of SB(2) to SA(4) represents an area of a region on which the 2 out of the 3 persons focus attention. Assuming "s" is a constant, an area SB(i) (i=1 to 4) of an attention region is estimated as SB(1)=s, and SB(2)=SB(3)=SB(4)=2 s in the same manner as the viewer group A.

Next, a time during which the viewers focus attention on the area SB(i) of the attention region (i=1 to 4) is measured, and a product of viewing times TB(i) (i=1 to 4) is calculated for each of the attention regions as TB(1)=TB(2)=TB(3)=TB(4)=t. Here, "t" is a constant.

The attention region matching degree MB of the viewer group B is calculated as Equation 7 when the values SA(i) and TA(i) (i=1 to 5) are substituted into Equation 5.

[Math. 7]

$$MB = MB(1) + MB(2) + MB(3) + MB(4)$$ (Equation 7)
$$= \frac{3abst^3}{3} + \frac{4abst^2}{3} + \frac{4abst^2}{3} + \frac{4abst^2}{3}$$
$$= abst^2(t+4)$$

As a result of Equation 7, since the viewer group A has a higher attention region matching degree for the viewing target content than that of the viewer group B (MA>MB), it is possible to determine that the viewer group A has a higher degree in which viewers of the viewer group A focus attention on the same region than that of the viewer group B.

Although the attention region matching degree is calculated based on a value in proportion to an area of the matching attention region, the viewing time of the matching attention region, and the number of the viewers who focus attention on the matching attention region in the aforementioned example, the method is not limited to this. For example, the attention region matching degree may be calculated in proportion to an arbitrary power of a number, such as a square of an area of an attention region, by changing a weight of each parameter.

(3) Calculation of Display Parameters of a Viewer Content

The display size calculating unit 209 calculates a display size of a viewer content, the display position calculating unit 210 calculates a display position thereof, and the display time control unit 213 calculates a display time thereof, among display parameters (S309).

The display position and display size of a viewer content may be arbitrarily set by the viewer through the viewer input receiving unit 103 as in Embodiment 1, or calculated according to an initial value set according to the number of viewer contents to be displayed. Alternatively, although not illustrated in the configuration of FIG. 20, the display position and display size of a viewer content may be calculated based on a viewer information item as in Embodiment 2. It is assumed herein that the display size and the display position of the selected viewer content C1-1 are calculated as in the examples in FIGS. 22A and 22B, using any one of the aforementioned methods.

The display time control unit 213 calculates a display start time of a viewer content with respect to the time after displaying a viewing target content, based on the attention region matching degree calculated by the attention region matching degree calculating unit 212.

The attention region matching degree of the picture C1 that is a content in the viewer group A is calculated as MA using Equation 6, and the attention region matching degree of the picture C1 in the viewer group B is calculated as MB using Equation 7. When the attention region matching degree is higher, the viewer content starts to be displayed with delay in order to give the viewers time to talk about the matching attention region. Conversely, when the attention region matching degree is lower, the viewer content starts to be displayed early in order to provide the viewers with a viewer content as topics.

Based on such ideas, the time until a viewer content is displayed after displaying the viewing target content Ci, that is, the display start time T (Ci) of the viewer content is defined using Equation 8. Here, Ci is the smallest unit included in a viewing target content C. In Equation 8, the viewing target content C is a slideshow including pictures, and Ci is one of the pictures. Furthermore, T denotes a time necessary for estimating an attention region, and α and β are predetermined constants.

[Math. 8]

$$T(Ci)=\alpha M(Ci)+T+\beta$$ (Equation 8)

As described in Embodiment 2, T in Equation 8 denotes continuously monitoring a sight line position of a viewer for a predetermined time (T seconds), and estimating an attention region based on a collection of attention points that are positions at each of which a sight line position of the viewer is fixed for a predetermined fixation time (x seconds) or longer. Thus, T denotes that a viewer content is displayed with delay by T seconds that is a time necessary for estimating at least an attention region.

Furthermore, the attention region matching degree of the viewer group A is calculated as $MA(C1)=abst^2(4t+4)$ using Equation 6, and the attention region matching degree of the viewer group B is calculated as $MB(C1)=abst^2(t+4)$ using Equation 7.

The display start times TA(C1) and TB(C1) of a viewer content when the viewer groups A and B view the picture C1 included in the viewing target content C are calculated, using Equations 9 and 10, respectively.

[Math. 9]

$$TA(Ci)=\alpha abst^2(4t+4)+T+\beta$$ (Equation 9)

[Math. 10]

$$TA(Ci)=\alpha abst^2(t+4)+T+\beta$$ (Equation 10)

Figure 23A:
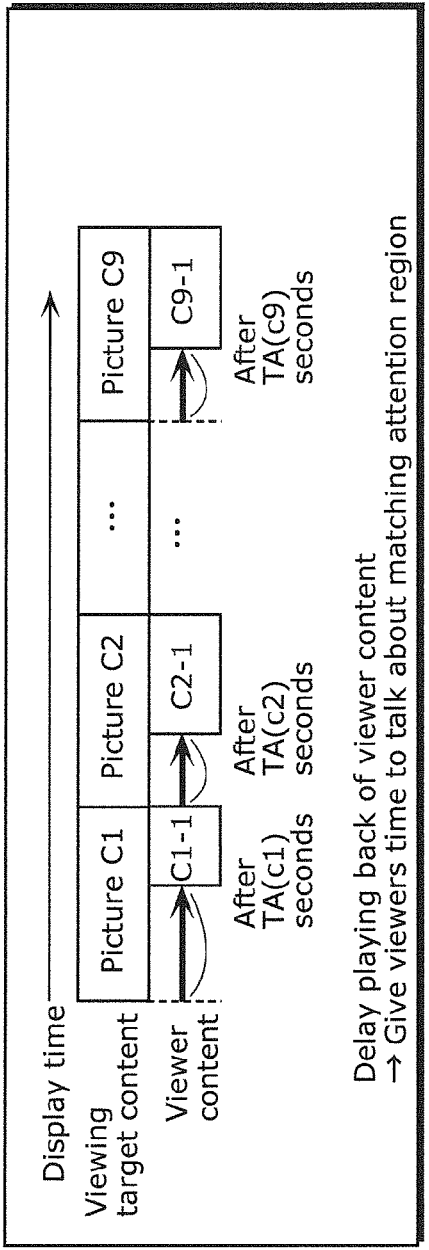
FIG. 23A illustrates an example of display timing of a viewer content to be displayed for the viewer group A according to Embodiment 3.
Figure 23B:
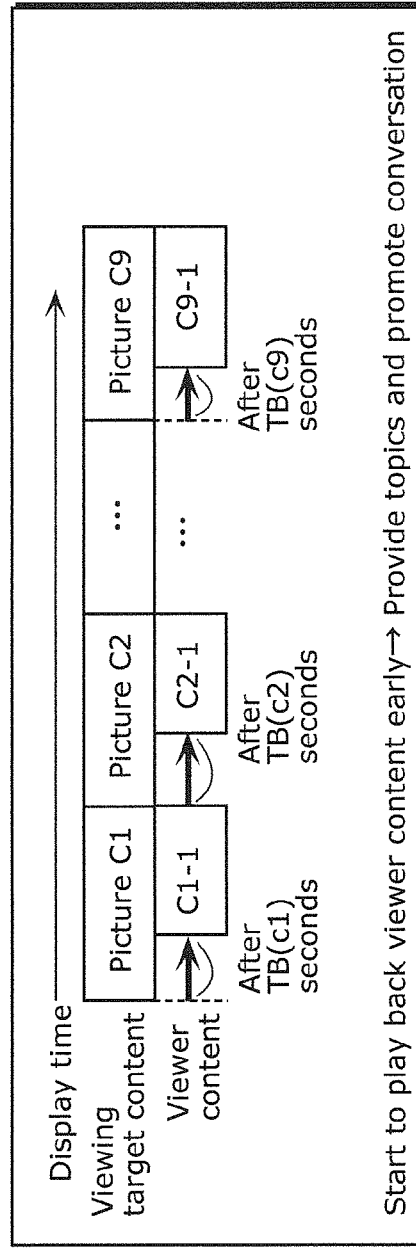
FIG. 23B illustrates an example of display timing of a viewer content to be displayed for the viewer group B according to Embodiment 3.

Due to the relationship MA(C1)>MB(C1), the relationship TA(C1)>TB(C1) is established. As a result, as illustrated in FIGS. 23A and 23B, the viewer content C1-1 for the viewer group A having the higher attention region matching degree is displayed later than that for the viewer group B.

Although the display start time is calculated using the attention region matching degree based on the sight line positions of the viewers, it may be calculated using other viewer information items including a viewer ID, a viewing time of a content, a length of utterance duration of viewers, and a volume of voice. Although not illustrated in the configuration of FIG. 20, the display start time may be calculated in consideration of a content meta information item, such as an elapsed time from a content capturing time and date.

Other display parameters of a viewer content (a position relationship with a viewing target content in a depth direction, transparency, volume, etc.) may be determined based on a predetermined initial value or a value arbitrarily entered by the viewer through the viewer input receiving unit 103.

In view of a possible case where the estimation of a sight line position is not correct, the calculated display size and display position may be arbitrarily changed by the viewer through the viewer input receiving unit 103 after displaying the viewer content.

<Output Device>

The video display screen 301 and the sound output speaker 302 that compose the content playback unit 30 play back a viewing target content and a viewer content, according to the calculated display parameter (S310).

<Advantage>

With the configuration, the display start time of a viewer content is calculated in proportion to an attention region matching degree between viewers for a viewing target content, based on the viewer information item. Thus, when the attention region matching degree is high, the display time for displaying only the viewing target content is prolonged by displaying the viewer content with delay. Thus, a longer time for talking the matching attention region can be provided to the viewers. Conversely, when the attention region matching degree is low, the display time for displaying only the viewing target content is shortened by starting to display the viewer content early. Thus, the viewer content (topics of other viewers) can be provided to the current viewers as topics.

The viewers first talk only about a viewing target content, and then the viewer content is displayed. As a result, the current viewers can compare a conversation of the past viewers with a conversation that is made by the current viewers during the time when only the viewing target content is displayed. Thus, the content playback apparatus 300 enables the viewers to view the content having an increased entertainment value.

Embodiment 4

A content playback apparatus 300 according to Embodiment 4 in the present invention will be hereinafter described.

The content playback apparatus 300 according to Embodiment 4 determines a display start time at which a viewer content is displayed together with a viewing target content based on a viewer information item, as described in Embodiment 3. In particular, the content playback apparatus 300 performs control when there are viewer contents to be displayed. More specifically, a content playback unit includes a display screen that displays image data included in the viewing target content and the viewer content selected by the viewer content selecting unit. The content playback apparatus 300 further includes a display control unit configured to display, when the viewer content selecting unit selects a plurality of viewer contents including the viewer content, the selected plurality of viewer contents on the display screen at different display start times, and the display control unit includes: an attention region estimation unit configured to estimate, on the display screen, attention regions that are regions on which a plurality of first viewers including the first viewer focus attention, based on the viewer information item obtained by the viewer information obtaining unit, and to estimate attention regions on which the second viewer focus attention, based on a plurality of viewer information items associated with the plurality of viewer contents, the plurality of viewer information items including the viewer information item of the second viewer; an attention region matching degree calculating unit configured to calculate attention region matching degrees that are respective matching degrees between the attention regions of the plurality of first viewers and the attention regions of the second viewer, both of the attention regions being estimated by the attention region estimation unit; and a display time control unit configured to determine the display start times of the plurality of viewer contents so that the plurality of viewer contents are displayed on the display screen in descending order of the attention region matching degrees.

Since the block diagram illustrating the configuration of the content playback apparatus 300 according to Embodiment 4 is the same as that in FIG. 20 according to Embodiment 3, the description of the configuration will be omitted.

Assume that the viewer content selecting unit 204 selects two viewer contents. For example, when two viewer contents are in a voiceless section or a volume of one of the viewer contents is lowered, it is not relatively difficult to simultaneously view the two viewer contents. However, when each viewer group corresponding to the two viewer contents talk while focusing attention on a different region included in the viewing target content, it is difficult for the current viewer group to distinguish between voices of the two viewer contents and view the two viewer contents at one time. Thus, when there are two ore more viewer contents, the display priorities of the viewer contents are determined based on viewer information items, each display start time of the viewer contents is calculated, and the viewer contents are displayed one-by-one according to the calculated display start times.

Assume that a current viewer group C views a content C. Then, the viewer content selecting unit 204 selects two viewer contents C-1 and C-2 of the content C that are illustrated in FIG. 25. Furthermore, viewers of the viewer content C-1 belong to the viewer group A, and viewers of the viewer content C-2 belong to the viewer group B.

<Display Control Unit 205>

The display control unit 205 calculates display parameters (a display priority, a display start time) of a viewer content in the same manner as Embodiment 3.

More specifically, the display control unit 205 (1) estimates an attention region on which the viewers focus attention in a content, (2) calculates an attention region matching degree in a viewer group, and (3) calculates display parameters (display priority, display start time) of the viewer content.

Figure 24:
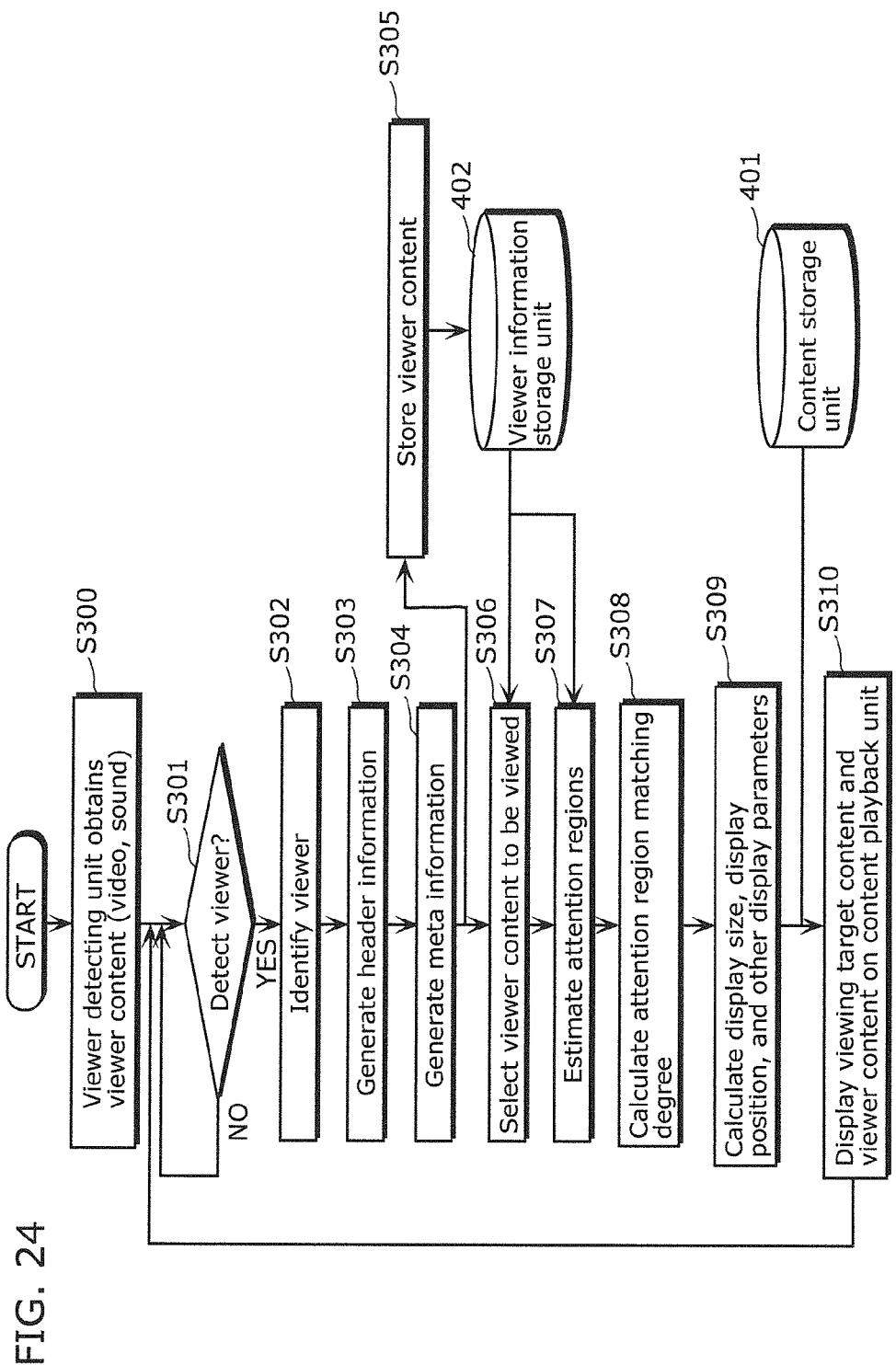
FIG. 24 is a flowchart indicating an example of operations performed by the content playback apparatus according to Embodiment 3.

Hereinafter, operations of the content playback apparatus 300 according to Embodiment 4 will be described with reference to FIGS. 26A to 28D. The procedure is as shown in FIG. 24, and the difference is only in a method of determining a display start time at S309.

(1) Estimation of Attention Regions

The attention region estimation unit 211 estimates attention regions of the current viewer group C for the picture C1, for a predetermined time (T seconds) as in Embodiment 3. Furthermore, the attention region estimation unit 211 estimates attention regions of each of the viewer groups A and B who are the past viewers, for the selected two viewer contents C-1 and C-2.

(2) Calculation of an Attention Region Matching degree

In Embodiment 3, the attention region matching degree calculating unit 212 calculates an attention region matching degree between viewers in the current viewer group at S308 in FIG. 24. In contrast, Embodiment 4 differs from Embodiment 3 in that the attention region matching degree calculating unit 212 calculates an attention region matching degree between the current viewer group and a past viewer group.

First, the attention region matching degree calculating unit 212 first calculates an attention region matching degree between a current viewer group C and a past viewer group A corresponding to the viewer content C-1, and then, an attention region matching degree between the viewer group C and a past viewer group B corresponding to the viewer content C-2. Then, the attention region matching degree calculating unit 212 sets values to the viewer contents, in descending order from a viewer content corresponding to a viewer group having the higher calculated attention region matching degree, as display priorities.

Figure 26A:
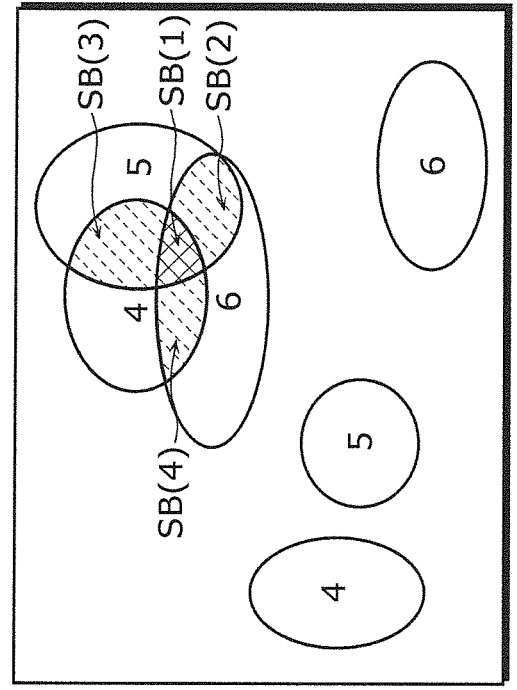
FIG. 26A illustrates an example of procedure for calculating an attention region matching degree in a viewer group A according to Embodiment 4.
Figure 26B:
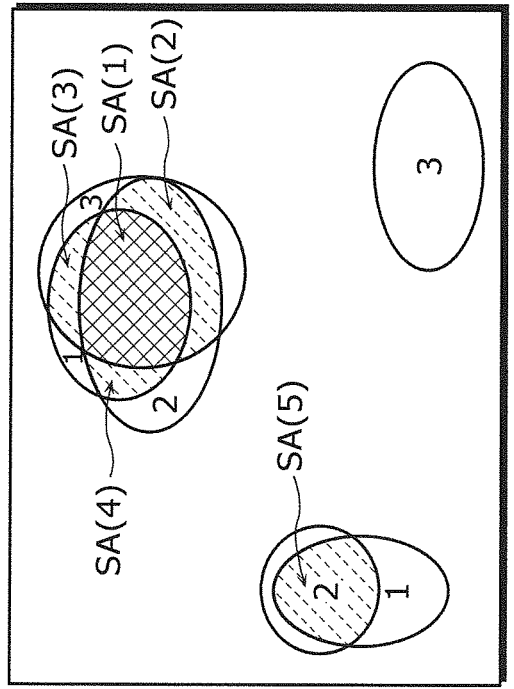
FIG. 26B illustrates an example of procedure for calculating an attention region matching degree in a viewer group B according to Embodiment 4.
Figure 27:
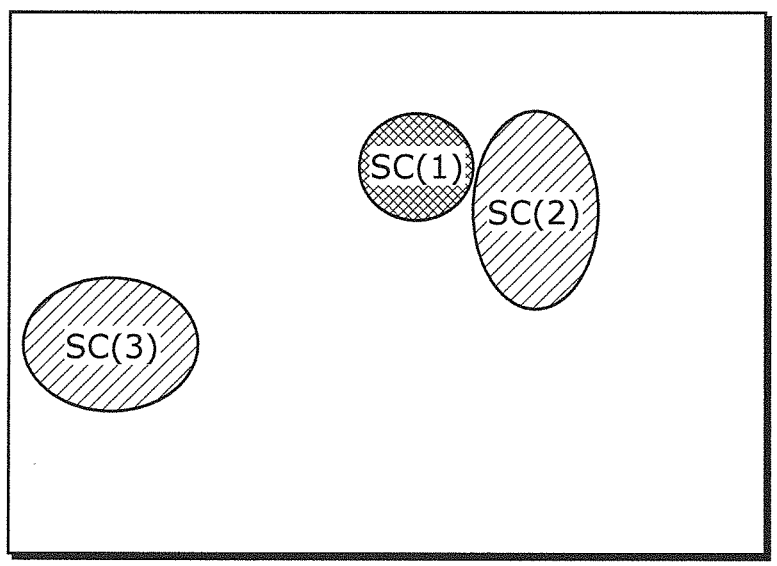
FIG. 27 illustrates an example of procedure for calculating an attention region matching degree using an attention region matching degree calculating unit according to Embodiment 4.

It is assumed that attention regions of the viewer group A who has viewed the picture C1 in the content C in the past are estimated as illustrated in FIG. 26A, attention regions of the viewer group B who has viewed the picture C1 in the content C in the past are estimated as illustrated in FIG. 26B, and attention regions of the viewer group C who is currently viewing the picture C1 in the content C are estimated as illustrated in FIG. 27.

As illustrated in FIG. 26A, it is assumed that one portion of SA(1) on which the three viewers focus attention and four portions of SA(2), SA(3), SA(4), and SA(5) on which the two viewers focus attention are estimated in the viewer group A. As illustrated in FIG. 26B, it is assumed that one portion of SB(1) on which the three viewers focus attention and three portions of SB(2), SB(3), and SB(4) on which the two viewers focus attention are estimated in the viewer group B. Furthermore, as illustrated in FIG. 27, it is assumed that one portion of SC(1) on which the three viewers focus attention and two portions of SC(2) and SC(3) on which the two viewers focus attention are estimated in the current viewer group C.

As calculating an attention region matching degree in a viewer group (Equation 5) according to Embodiment 3, an attention region matching degree between the current viewer group and a past viewer group is calculated using three parameters of (i) an area of a matching region between an attention region of each viewer in the viewer group C and an attention region of the viewer group A or B, (ii) a time during which the matching region has been viewed, and (iii) the number of viewers who focus attention on the matching region.

First, a matching degree M between the attention region SC(1) of the viewer group C and the attention region SA(1) of the viewer group A is calculated using Equation 11. In other words, a logical operator of an area of a matching attention region (that is, an intersection) is multiplied by a product of a time during which each viewer group focuses attention on the attention region and a product of the number of viewers in each of the groups who focus attention on the attention region, and the result is divided by the number of all the viewers.

[Math. 11]

$$M(SC(1) \cap SA(1)) = \frac{a(sC(1) \cap sA(1)) \times b(tC(1) \times tA(1)) \times c(nC(1) \times nA(1))}{nC + nA} \quad \text{(Equation 11)}$$

Similarly, a matching degree M between the attention region SC(1) of the viewer group C and each of other attention regions (SA(2) to SA(5)) of the viewer group A is calculated.

A sum of matching degrees between each of five attention regions SA(i)(i=1 to 5) of the viewer group A calculated as above and the attention region SC(1) of the viewer group C is defined as an attention region matching degree between the attention region SC(1) of the viewer group C and the attention regions of the viewer group A, and is expressed in Equation 12.

[Math. 12]

$$M(SC(1) \cap SA) = \sum_{i=1}^{5} M(SC(1) \cap SA(i)) \quad \text{(Equation 12)}$$

The attention region matching degree between each of other attention regions SC(2) and SC(3) of the viewer group C and a corresponding region in the viewer group A can be calculated as Equation 12.

As expressed in Equation 13, adding up the attention region matching degrees calculated for the attention regions of the viewer group C, the attention region matching degree between the viewer group C and the viewer group A can be calculated.

[Math. 13]

$$M(SC \cap SA) = \sum_{j=1}^{3} \sum_{i=1}^{5} M(SC(j) \cap SA(i)) \quad \text{(Equation 13)}$$

Similarly, the attention region matching degree between the viewer group C and the viewer group B is calculated using Equation 14.

[Math. 14]

$$M(SC \cap SB) = \sum_{j=1}^{3} \sum_{i=1}^{4} M(SC(j) \cap SB(i)) \quad \text{(Equation 14)}$$

In the aforementioned manner, the attention region matching degree between the viewer group C including the current viewers and the viewer group A including the past viewers is calculated, and the attention region matching degree between the viewer group C including the current viewers and the viewer group B including the past viewers is calculated.

Here, as described in the above examples, the attention region matching degree is calculated based on a value in proportion to an area of a matching attention region, a time during which the attention region has been viewed, and the number of viewers who focus attention on the region. However, the method is not limited to this, and the attention region matching degree may be calculated, for example, in proportion to an arbitrary power of a number, such as a square of an area of an attention region.

(3) Calculation of Display Parameters of a Viewer Content

The display size calculating unit 209 calculates a display size of a viewer content, the display position calculating unit 210 calculates a display position thereof, and the display time control unit 213 calculates a display time thereof, among display parameters.

It is assumed herein that the display size and the display position are calculated in the same method as Embodiment 3, and thus, the description of the operations of the display size calculating unit 209 and the display position calculating unit 210 will be omitted.

The display time control unit 213 determines display priorities of viewer contents based on the attention region matching degrees calculated by the attention region matching degree calculating unit 212, and calculates the display start times of the viewer contents with respect to the time after displaying the viewing target content.

As obvious from the method of calculating the attention region matching degrees, it is possible to determine that the current viewer group is highly interested in the viewer content having a higher attention region matching degree. Accordingly, the display priorities are set in descending order of values of attention region matching degrees. Furthermore, the display start times are calculated so that the second viewer content starts to be displayed after displaying of the first viewer content. The display start time $T(Ci)$ of the viewer content to be displayed first can be calculated using Equation 8 according to Embodiment 3.

For example, as illustrated in FIG. 28A, when an attention region matching degree for the picture C1 between the viewer groups C and A is equal to an attention region matching degree for the picture C1 between the viewer groups C and B, the display priorities of the viewer contents are the same. In this case, a viewer content C1-1 associated with the viewer group A and a viewer content C1-2 associated with the viewer group B are simultaneously displayed.

Furthermore, as illustrated in FIG. 28B, when an attention region matching degree for a picture C2 between the viewer groups C and A is higher than an attention region matching degree for the picture C2 between the viewer groups C and B, a viewer content C2-1 associated with the viewer group A is displayed first, and then a viewer content C2-2 associated with the viewer group B is displayed after displaying the viewer content C2-1.

Furthermore, as illustrated in FIG. 28C, when an attention region matching degree for a picture C9 between the viewer groups C and B is higher than an attention region matching degree for the picture C9 between the viewer groups C and A, a viewer content C9-2 associated with the viewer group B is displayed first, and then a viewer content C9-1 associated with the viewer group A is displayed after displaying the viewer content C9-2.

When there are two viewer contents, the display priorities can be determined, and the display times can be calculated according to such procedure.

Although Embodiment 4 exemplifies a case where two viewer contents are selected, even when the viewer contents are selected, the attention region matching degree can be calculated for each of the viewer contents, the display priorities can be determined based on the attention region matching degrees, and the display times can be calculated.

Although the viewer content having a higher attention region matching degree is displayed first in Embodiment 4, conversely, the viewer content having a lower attention region matching degree may be displayed first.

Although each display start time is calculated using the attention region matching degree based on the sight line position of the viewer, it may be calculated using another viewer information item including a viewer ID, a viewing time of a content, a length of utterance duration of viewers, and a volume of voice. Although not illustrated in the configuration of FIG. 20, the display start time may be calculated, in addition to the viewer information item, in consideration of a content meta information item, such as an elapsed time from a content capturing time and date.

Other display parameters of a viewer content (a position relationship with a viewing target content in a depth direction, transparency, volume, etc.) may be determined based on a predetermined initial value or a value arbitrarily entered by the viewer through the viewer input receiving unit 103.

In view of a possible case where the estimation of a sight line position is not correct, the calculated display size and display position may be arbitrarily changed by the viewer through the viewer input receiving unit 103 after displaying the viewer content.

<Advantage>

With the configuration, an attention region matching degree for a viewing target content between the current viewers and the past viewer group associated with a viewer content to be displayed is calculated based on each viewer information item, and the display priorities and display start times of the viewer contents are calculated based on the attention region matching degrees. Thus, a viewer content having a higher attention region matching degree, that is, a viewer content for which the viewers have empathetic feelings can be displayed first. Alternatively, a viewer content having a lower attention region matching degree can be displayed first. In the latter case, topics on a region different from a region on which the current viewers focus attention can be provided to the current viewers.

Embodiment 5

A content playback apparatus 300 according to Embodiment 5 in the present invention will be hereinafter described.

The content playback apparatus 300 according to Embodiment 5 controls a display time of a viewer content to be displayed together with a viewing target content based on a viewer information item, as the content playback apparatus 300 according to Embodiments 3 and 4. In particular, the content playback apparatus 300 controls the display time (length of displaying time) of the viewer content to be shortened or extended. More specifically, the content playback apparatus 300 includes a control unit configured to adjust a play-back time of the viewer content selected by the viewer content selecting unit, and to control the content playback unit to play back the viewer content in which the play-back time is adjusted, wherein the control unit is configured to estimate a viewing time of the viewing target content that is viewed by the first viewer, and to extend or shorten the play-back time of the viewer content to be closer to the estimated viewing time of the viewing target content.

Since the content playback apparatus 300 according to Embodiment 5 is the same as that in FIG. 20 according to Embodiment 3, the description thereof will be omitted.

The time for playing back a viewer content is a time during which the past viewer views the content, and is equal to the time during which the viewer content has been captured. Since the excitement and view differ in each viewer group, it is probable that the viewing time of a content is relatively longer when the viewers talk longer and are excited, and the viewing time of a content is relatively shorter when the viewers talk less. As such, the time for viewing a viewing target content differs in each viewer group, and there is a high probability that the time during which the current viewer group views the viewing target content is different from the time during which a viewer content is played back.

Thus, when the current viewer group tends to view the viewing target content for a time period longer than the time during which the viewer content is played back, the viewer content is shortened so that the current viewer group can effectively view the viewer content. Conversely, when the current viewer group tends to view the viewing target content for a time period shorter than the time during which a viewer content is played back, after playing back the viewer content, another viewer content is selected and played back. Accordingly, the viewing time is spuriously extended. Hereinafter, a method of controlling a play-back time of a viewer content according to a viewing tendency of current viewers as described above will be described.

Assume that the viewer group C views the content A and the viewer content selecting unit 204 selects the viewer content A-1.

As illustrated in FIG. 3B, the content A includes the 10 pictures of A1 to A10. It is assumed that the content A has been viewed five times, and the viewer information storage unit 402 stores the viewer contents A-1 to A-5 captured at the viewing, and the header information and meta information corresponding to each of the viewer contents A-1 to A-5.

Thus, the content A is to be viewed by the viewer group C for the sixth time. The current viewer group C views the content A as a viewing target content, together with the viewer content A-1. The viewer group C has already finished viewing the picture A, and intends to view the picture T-10 next.

<Display Control Unit 205>

Figure 30:
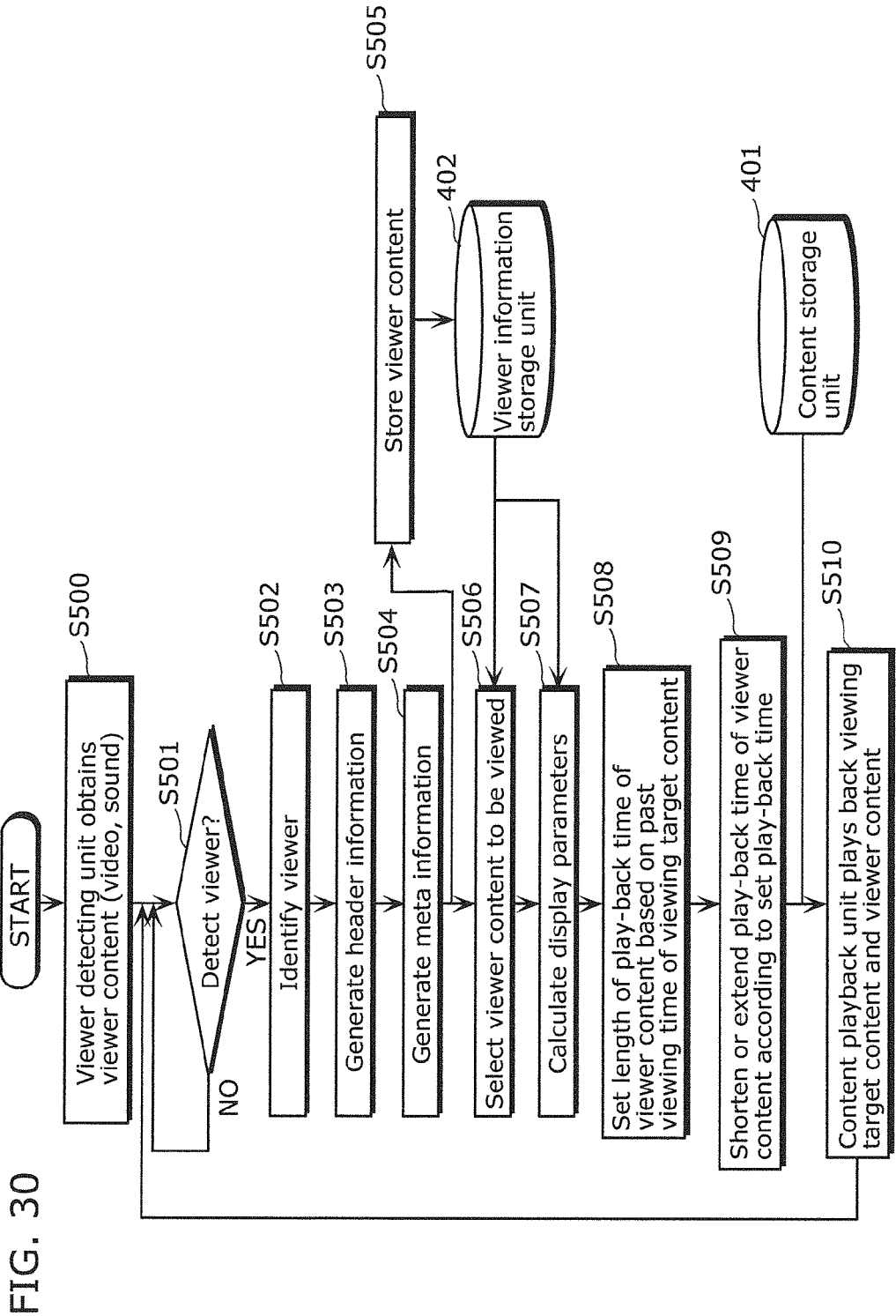
FIG. 30 is a flowchart indicating an example of operations performed by a content playback apparatus according to Embodiment 5.

Hereinafter, operations of the content playback apparatus 300 according to Embodiment 5 will be described with reference to FIGS. 29A to 30. Since processes S500 to S506 in FIG. 30 correspond to the processes S300 to S306 in FIG. 24, the description thereof will be omitted.

The display control unit 205 includes a display size calculating unit 209, a display position calculating unit 210, and a display time control unit 213. As in Embodiments 3 and 4, the display size calculating unit 209 calculates a display size of a viewer content, and the display position calculating unit 210 calculates a display position of the viewer content (S507). Next, the procedure that the display time control unit 213 controls a play-back time of a viewer content to be shortened or extended, based on a viewing time of the content will be described.

The viewing time for viewing each of the pictures in the content A is equal to the capturing time of the viewer content, and is recorded in the viewer information storage unit 402 as header information for each of the viewer contents A-1 to A-5 as the example illustrated in FIG. 5. First, an average viewing time Ta (A-1) for the 10 pictures A1 to A10 in the viewer content A-1 is calculated using the header information in FIG. 29A. Furthermore, an average viewing time Ta (A-6) for the 9 pictures A1 to A9 that has already been viewed by the viewer group C who is still viewing a viewing target content is calculated.

Then, the display time control unit 213 compares the average viewing time Ta (A-6) of the viewer group C with the average viewing time Ta (A-1) of the past viewer group associated with the viewer content A-1, and controls a play-back time of a viewer content to be displayed together with the picture A10, based on the result of comparison (S508, S509).

(1) When Ta(A-6)<Ta(A-1)

In other words, an average viewing time of the viewer group C that is currently viewing a viewing target content is shorter than an average viewing time of a viewer group associated with the viewer content A-1, it is possible to determine that the viewer group C is highly likely to finish viewing the viewing target content for a time period shorter than the play-back time of the viewer content A-1. Thus, the display time of the viewer content A10-1 (a viewer content when the picture A10 has been first viewed) is shortened. The specific method of shortening a viewer content is, for example, skipping a part of a section in the viewer content or fast-forwarding the viewer content. The skipping and fast-forwarding methods will be described next.

(1.1) When Skipping

A section to be skipped in a viewer content is determined based on the meta information of the viewer content A10-1. For example, based on a voice level of a viewer content, video in a section having a voice level equal to or smaller than a threshold can be extracted. Alternatively, based on an attention region matching degree between viewers calculated in Embodiment 3, video in a section having the matching degree equal to or smaller than a threshold can be extracted. Assuming the section extracted in such a manner as a skipped section, a section during which the viewers talk about the viewer content A10-1 and only a section having a higher attention region matching degree between viewer groups can be played back.

Next, a threshold for determining a skipped section is calculated. For example, assuming that a time t(seconds) during which the viewer group C views the picture A10 is in proportion to the average content viewing time as illustrated in FIGS. 29A and 29B, Equation 15 is established. Then, the time t is calculated as Equation 16.

[Math. 15]

$$t : Ta(A-6) = 31 : Ta(A-1) \quad \text{(Equation 15)}$$

[Math. 16]

$$t = \frac{Ta(A-6) \times 31}{Ta(A-1)} \quad \text{(Equation 16)}$$

The threshold for determining a skipped section is determined so that the time t which is estimated using Equation 16 and during which the viewer group C views the picture A10 is equal to or closer to 31 seconds that is the play-back time of the viewer content A10-1.

Accordingly, the probability that the viewer content is displayed for a longer time period than the estimated viewing time of the current viewer group can be reduced.

Here, the estimated viewing time t may be calculated using, but not limited to Equation 16, another equation. For example, an average viewing time of the viewer contents A10-$i$ ($i$=1 to 5) in FIGS. 29A and 29B may be used instead of Ta(A-1).

(1.2) When Fast-Forwarding

The section in which a viewer content is fast-forwarded is determined in the same method as calculating a skipped section, and the section is fast-forwarded. The fast-forwarding speed may be arbitrarily set. Alternatively, the fast-forwarding speed may be calculated so that the play-back time of the viewer content A10-1 matches the estimated viewing time of the picture A10 by the current viewer group C that is obtained using Equation 16. Such a calculation is based on the premise that the play-back speed is set to the maximum speed at which the viewers can listen even when the content is fast-forwarded. When the speed exceeds the maximum speed, the play-back time may exceed the play-back time estimated using Equation 16.

When the current viewer group C views a next viewer content (a picture in this example) and the play-back time of a viewer content is longer than the estimated viewing time, the viewer content can be played back by shortening the length of the viewer content based on the viewer information item, and the viewer content can be effectively displayed.

The method of determining a skipped section and a fast-forwarded section is not limited to these methods but other viewer information items may be used. For example, some sections are extracted using image processing, such as a section in which the viewers smile and a section in which an amount of movement of the viewers is large. The movement includes dynamic gesture, moving head, and approaching a video display screen. The extracted sections may be used as meta information.

(2) Ta(A-6)>Ta(A-1)

In other words, when an average viewing time of the viewer group C that is currently viewing a viewing target content is longer than an average viewing time of a viewer group associated with the viewer content A-1, it is possible to determine that the viewer group C is highly likely to finish viewing the viewing target content for a time period longer than the playback time of the viewer content A-1. When this relationship holds, after playing back the viewer content A10-1, another viewer content is reselected and displayed.

It is desired that the viewer content selecting unit 204 selects a viewer content to be displayed next as the preprocess in order to display the new viewer content immediately. The viewer content may be obtained using the same method as described in Embodiments 1 to 4. In other words, the viewer content is selected based on a viewer information item, or arbitrarily by the viewer through the viewer input receiving unit 103.

When it is estimated that an entire of the reselected viewer content cannot be viewed within an estimated viewing time, the play-back time may be shortened using the method of shortening the viewer content as described in (1).

When using the method, displaying of the viewer content is completed during the time when the viewer group C is viewing the picture A10, another viewer content can be continuously displayed.

The content playback unit 30 displays video data included in a viewing target content and a viewer content, on the video display screen 301 according to the display parameter determined by the display control unit 205, and outputs the sound data from the sound output speaker 302 (S510).

Although Embodiment 5 exemplifies a case where a viewer content to be displayed together with a viewing target content is a single viewer content, even when there are two or more viewer contents, the play-back time can be shortened or extended using the same method.

Here, since the viewing time needs to be estimated, the play-back time of the first data element of a content (the picture A1-*i* in this example) is not controlled.

<Advantage>

With the configuration, when it is estimated that the viewing time of a viewing target content of the current viewers is shorter than the play-back time of a viewer content, the viewer content can be shortened and effectively displayed. Alternatively, when it is estimated that the viewing time of a viewing target content of the current viewers is longer than the play-back time of a viewer content, the viewer content can be extended and displayed. Even after the viewers finish viewing the viewer content, another viewer content can be continuously displayed. In other words, since the play-back time of a viewer content is shortened or extended so as to be equal to or closer to the viewing time estimated as necessary to view a viewing target content, the content playback apparatus 300 can play back the viewer content to match the viewing pace of the viewers.

Embodiment 6

A content playback apparatus 100 according to Embodiment 6 in the present invention will be hereinafter described.

The content playback apparatus 100 according to Embodiment 6 extracts a still image from a viewer content based on a viewer information item. The still image is called a viewer still image. The content playback apparatus 100 extracts at least one viewer still image from each of the viewer contents associated with the same content as the viewing target content. The content playback apparatus 100 displays all the extracted viewer still images in a slideshow mode or a thumbnail mode before displaying a viewing target content, and then starts displaying the viewing target content.

More specifically, a content playback unit includes a display screen that displays image data included in the viewing target content and the viewer content selected by the viewer content selecting unit. The viewer content selecting unit is configured to extract, as a still image, a most exciting portion in each of one or more viewer contents associated with the viewing target content, and to output the extracted one or more still images as the viewer content. The content playback unit is configured to display the one or more still images as the viewer content in a slideshow mode or a thumbnail mode, before displaying the viewing target content.

Although each of the content playback apparatuses 100, 200, and 300 according to Embodiments 1 to 5 displays a viewer content together with a viewing target content, the content playback apparatus 100 according to Embodiment 6 displays a viewer still image extracted from the viewer content, before displaying the viewing target content.

Since the configuration of the content playback apparatus 100 according to Embodiment 6 is the same as that in FIG. 2B according to Embodiment 1, the description of the configuration will be omitted.

Hereinafter, operations of the content playback apparatus 100 according to Embodiment 6 will be described with reference to FIGS. 31A to 32. Since processes S600 to S605 in FIG. 32 correspond to the processes S300 to S305 in FIG. 24, the description thereof will be omitted. Furthermore, a case where the current viewer group A views the content A as a viewing target content will be described.

<Meta Information Generating Unit 203>

The meta information generating unit 203 further calculates meta information for extracting a viewer still image from a viewer content at S604. For example, the meta information generating unit 203 calculates an excitement degree when a scene in which the viewers are the most exited in viewing the content A is extracted as a viewer still image.

The meta information generating unit 203 determines a scene in which a viewer group is the most exited in viewing each viewer content obtained when the content A is viewed, using the speech processing technique and the image processing technique. For example, assume that a criterion of excitement is that the volume of uttered voice of viewers is the largest and the number of viewers determined as smiling is the largest in a scene. When scenes having the largest excitement degree are extracted from one viewer content, another criterion is added. For example, the meta information generating unit 203 calculates an excitement degree again by defining a degree of smile based on an amount of change in shape of eyes or a mouth and adding a condition for determining excitement that a sum of degrees of smile of all the viewers is the largest.

The criteria for determining excitement are not limited to these, but other criteria may be used.

The criteria for extracting a viewer still image are not limited to the excitement but may be other criteria.

Figures 31A, 31B, 31C:
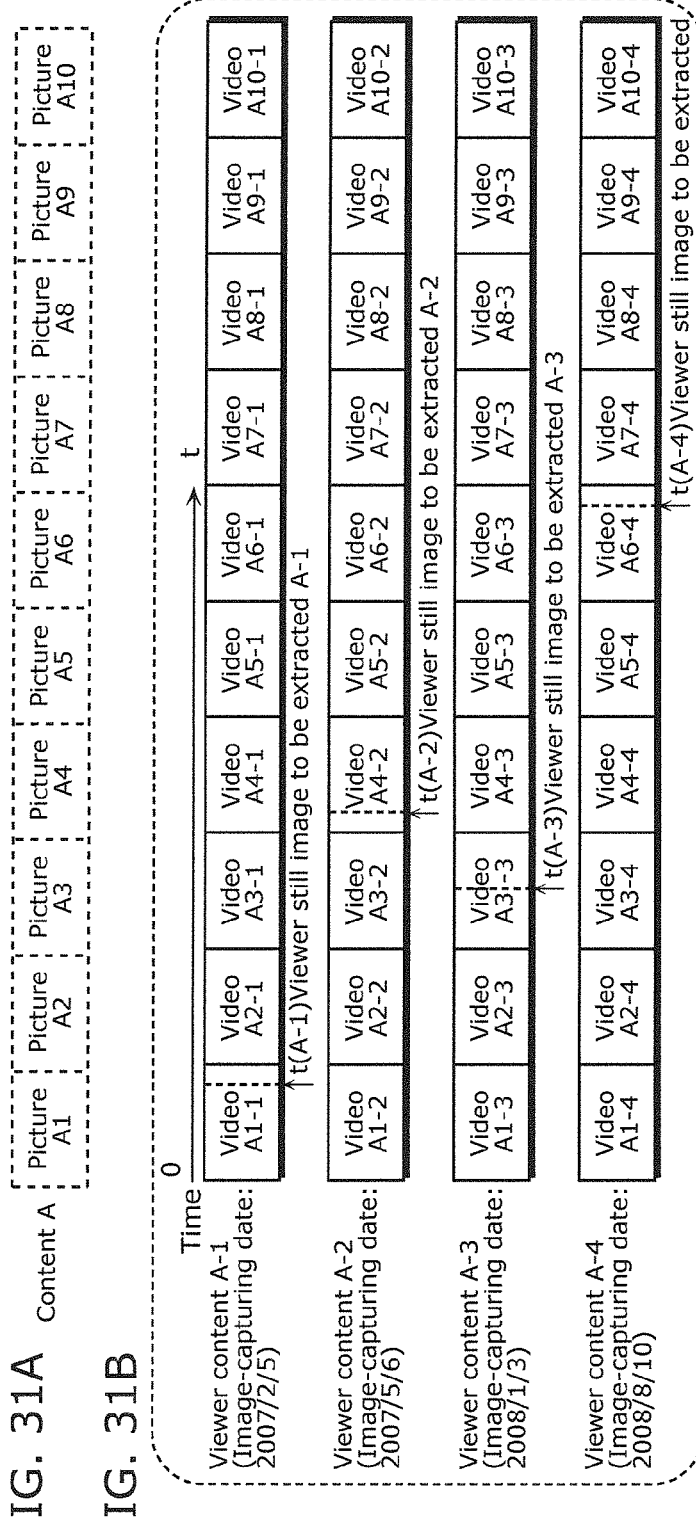
FIG. 31A illustrates an example of a data structure of a viewing target content according to Embodiment 6 in the present invention.
FIG. 31B illustrates an example of timing to extract a viewer still image from each viewer content according to Embodiment 6.
FIG. 31C illustrates an order of playing back viewer contents and a viewing target content according to Embodiment 6.
Figure 32:
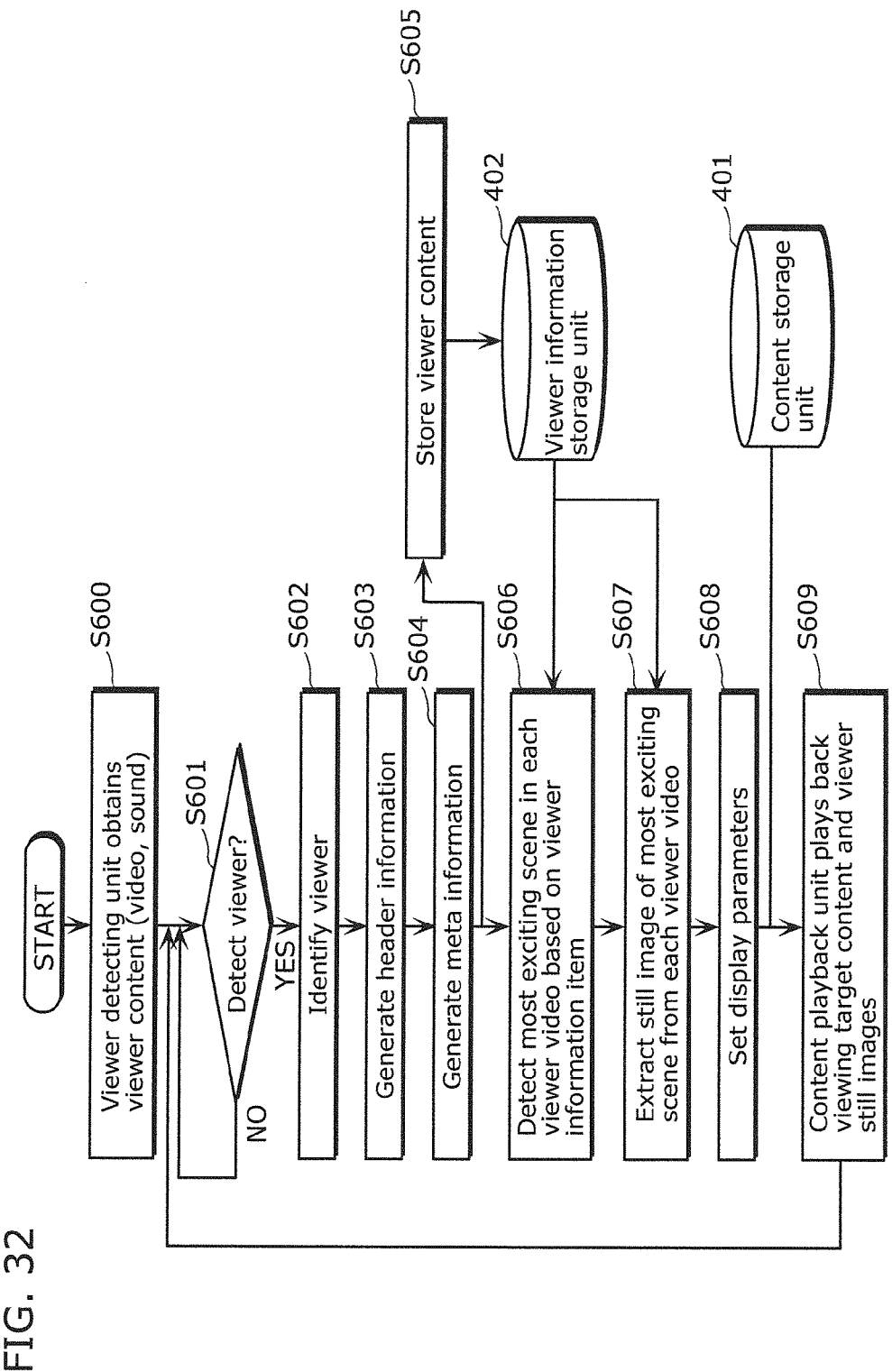
FIG. 32 is a flowchart indicating an example of operations performed by a content playback apparatus according to Embodiment 6.

For example, as illustrated in FIG. 31A, the content A includes the 10 pictures A1 to A10. Furthermore, as illustrated in FIG. 31B, each of viewer video contents A-1 to A-4 associated with the content A is assumed to be partitioned into portions A1-$n$ to A10-$n$ (n=1 to 4) corresponding to the pictures A1 to A10 of the content A.

In such a case, the viewer still image may be extracted using, as criteria, the length of a play-back time of each of the portions corresponding to the pictures A1 to A10. More specifically, the meta information generating unit 203 may extract any scene, for example, a scene having the largest amount of movement of viewers, as a viewer still image, from the portions A1-1 to A1-4 corresponding to the picture A1 from among the viewer contents A-1 to A-4.

Alternatively, the meta information generating unit 203 may select a viewer still image based on a viewer information item of the viewer group A. For example, the meta information generating unit 203 identifies a person from subjects in each of the pictures A1 to A10 in the content A, with reference to the viewer information storage unit 402. Assume that the meta information generating unit 203 obtains a result that the picture A6 includes images of three persons and each of the other pictures includes images of two or less persons, from the viewer group A. Among the viewer contents A-1 to A-4, portions A6-$n$ (n=1, 2, 3, and 4) corresponding to the picture A6 including images of the largest number of viewers from the current viewer group as the subjects may be portions from which viewer still images are extracted. Other than that, a still image in any scene may be extracted from the rest of the portions A6-$n$ (n=1, 2, 3, and 4).

In this manner, the meta information generating unit 203 determines, for example, a scene in which the viewers are the most excited from each of the viewer contents obtained when the content A is viewed, based on the viewer information item, and generates times of the scenes as the meta information (S606). In the example of FIG. 31B, it is determined that the portion A1-1 corresponding to the picture A1 in the viewer content A-1, the portion A4-2 corresponding to the picture A4 in the viewer content A-2, the portion A3-3 corresponding to the picture A3 in the viewer content A-3, and the portion A6-4 corresponding to the picture A6 in the viewer content A-4 include the scenes in which the viewers are the most excited, and the corresponding times t(A-1), t(A-2), t(A-3), and t(A-4) are recorded as the meta information.

<Viewer Content Selecting Unit 204>

The viewer content selecting unit 204 extracts a viewer still image from each of the viewer contents A-1 to A-4 based on the meta information generated by the meta information generating unit 203 (S607). In the example of FIG. 31B, the most exciting scenes from the viewer contents A-1 to A-4 as the meta information are at the time t(A-1) for the viewer content A-1, the time t(A-2) for the viewer content A-2, the time t(A-3) for the viewer content A-3, and the time t(A-4) for the viewer content A-4, and thus, the viewer content selecting unit 204 extracts viewer still images A-1, A-2, A-3, and A-4 at each of the times.

<Display Control Unit 205>

The display control unit 205 calculates display parameters, such as each display position, display size, display time, and display order of the viewer still images selected by the viewer content selecting unit 204 and the viewing target content (S608).

The initial value of the display parameters of viewer still images is predetermined. Regarding the display positions and display sizes, the viewer still images are displayed in a full-screen mode on the video display screen 301. Furthermore, assuming the initial value of a display time (displayed in a slideshow mode herein) as an arbitrary time T, with regard to the display order, viewer still images are first displayed in a slideshow mode, and then, the viewing target content is displayed. The viewer still images are displayed in order from a viewer still image extracted from the original viewer content captured in the most previous image-capturing time and date.

When the initial value of the display parameters is defined as above, in the example of FIG. 31C, the content playback unit 30 first displays the viewer still images in order from A-1 to A-4 for the play-back times T in a slideshow mode, and displays the content A that is a viewing target content (S609).

The display parameters may be arbitrarily changed by the viewer through the viewer input receiving unit 103 from its initial value.

Furthermore, the display parameters may be determined based on the viewer information item. For example, viewer still images may be displayed in descending order of excitement degrees calculated by the meta information generating unit 203.

Furthermore, although viewer still images are displayed in a slideshow mode, they may be displayed as thumbnails at one time.

<Advantage>

With the configuration, the viewers can get an overview of states of all the viewers who previously view the same content as the viewing target content, by viewing the viewer still images extracted from all the viewer contents based on the viewer information item, when the current viewers are to view the viewing target content. Accordingly, the current viewers can effectively understand the states and reactions for the content.

Each of Embodiments 1 to 6 exemplifies, but not limited to, the case using a slideshow content as a viewing target content. For example, the viewing target content may be a video content, such as a movie. In such a case, a viewing target content is desirably played back in synchronization with a viewer content. Accordingly, the viewers can know the reaction of other viewers in each scene of the viewing target content.

Furthermore, each of Embodiments 1 to 6 exemplifies, but not limited to, the case using a viewer content obtained in the past. For example, the viewer content selecting unit may select the viewer content obtained from the second viewer who views the same content as the viewing target content at a place different from a place of the first viewer and at a same time as the first viewer. In other words, the viewer content may be any as long as it is obtained under temporally or spatially different conditions.

(Other Modifications)

Although the present invention is described based on Embodiments, obviously, the present invention is not limited to these Embodiments. The present invention includes the following cases.

Each of the above apparatuses is specifically a computer system including a microprocessor, a ROM, a RAM, a hard disk unit, a display unit, a keyboard, and a mouse. The RAM or the hard disk unit stores a computer program. The microprocessor operates according to the computer program, so that each of the apparatuses fulfills the function. Here, in order to fulfill a predetermined function, the computer program is programmed by combining instruction codes each indicating an instruction for a computer.

Part or all of the constituent elements included in each of the above apparatuses may be included in one system large scale integration (LSI). The system LSI is a super-multifunctional LSI manufactured by integrating the constituent elements on one chip and is, specifically, a computer system including a microprocessor, a ROM, and a RAM. The computer program is stored in the RAM. The microprocessor operates according to the computer program, so that the system LSI fulfills its function.

Part or all of the constituent elements included in each of the above apparatuses may be included in an IC card removable from each of the apparatuses or in a stand alone module. The IC card or the module is a computer system including a microprocessor, a ROM, and a RAM. The IC card or the module may include the above super-multifunctional LSI. The microprocessor operates according to the computer program, so that the IC card or the module fulfills its function. The IC card or the module may have tamper-resistance.

The present invention may be any of the above methods. Furthermore, the present invention may be a computer program which causes a computer to execute these methods, and a digital signal included in the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc (BD), and a semiconductor memory. In addition, the present invention may be the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a microprocessor and a memory. The memory may store the above computer program, and the microprocessor may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

Embodiments and Modifications may be combined.

Although Embodiments are described with reference to the drawings, the present invention is not limited to the illustrated Embodiments. Various modifications and revisions may be added to the illustrated Embodiments within the scope of the present invention or within the scope of equivalents of the present invention.

INDUSTRIAL APPLICABILITY

The content playback apparatus according to the present invention is useful for large-screen displays to be viewed by viewers so that the viewers easily view an appropriate viewer content together with contents. Furthermore, the content playback apparatus may be useful as a content creating apparatus that creates a private content having an increased entertainment value for viewers having a friendly relationship, for example, a family and friends.

REFERENCE SIGNS LIST

10 Viewer detecting unit
20 Viewing target content obtaining unit
30 Content playback unit
40 Storage unit
100, 200, 300 Content playback apparatus
101 Viewer image capturing camera
102 Voice input microphone
103 Viewer input receiving unit
201 Viewer identifying unit
202 Header information generating unit
203 Meta information generating unit
204 Viewer content selecting unit
205 Display control unit
206 Non-attention region estimation unit
207 Effective visual field estimation unit
208 Viewer-content displayed recommendation region determining unit
209 Display size calculating unit
210 Display position calculating unit
211 Attention region estimation unit
212 Attention region matching degree calculating unit
213 Display time control unit
301 Video display screen
302 Sound output speaker
401 Content storage unit
402 Viewer information storage unit
403 Viewer attribute information storage unit

The invention claimed is:

1. A content playback apparatus that plays back a viewing target content for a viewer, said apparatus comprising:
a microprocessor; and
a non-transitory memory having stored thereon executable instructions that, when executed by said microprocessor, cause said content playback apparatus to function as:
a viewing target content obtaining unit configured to obtain the viewing target content;
a viewer detecting unit configured to detect a first viewer who views the viewing target content played back by said content playback apparatus;
a viewer content selecting unit configured to select, from among a plurality of viewer contents, a viewer content having a matching degree higher than a predetermined threshold, the matching degree indicating an amount of common points between the first viewer detected by said viewer detecting unit and a second viewer who views a same content as the viewing target content under temporally or spatially a different condition, and each of the plurality of viewer contents including information of video or sound of the second viewer who views the same content; and
a content playback unit configured to play back the viewing target content obtained by said viewing target content obtaining unit and the viewer content selected by said viewer content selecting unit,
wherein said viewer detecting unit includes:
a viewer content obtaining unit configured to obtain a viewer content including information of video or sound of the first viewer who is currently viewing the viewing target content played back by said content playback apparatus; and
a viewer information obtaining unit configured to obtain a viewer information item on the first viewer, from the viewer content obtained by said viewer content obtaining unit,
said content playback apparatus further comprises a memory configured to store, in association with each other, (i) a plurality of viewer contents of the second viewer that are obtained in the past and (ii) a plurality of viewer information items of the second viewer that are obtained from the viewer content,
said viewer content selecting unit is configured to calculate matching degrees between the viewer information item of the first viewer detected by said viewer detecting unit and each of the plurality of viewer information items of the second viewer stored in said memory, and to select, from among the plurality of viewer contents of the second viewer stored in said memory, a viewer content associated with the viewer information item of the second viewer, the viewer information item of the second viewer having one of the matching degrees higher than the predetermined threshold, said content playback unit includes a display screen that displays image data included in the viewing target content and the viewer content selected by said viewer content selecting unit, said executable instructions, when executed by said microprocessor, cause said content playback apparatus to further function as a display control unit configured to display the viewing target content on said display screen, and to display the viewer content to be superimposed on a part of the viewing target content, said display control unit includes:

a non-attention region estimation unit configured to estimate, on said display screen, a non-attention region that is a region outside of a region on which the first viewer focuses attention; and an effective visual field estimation unit configured to estimate an effective visual field of the first viewer on said display screen, and said display control unit is configured to display the viewer content within the non-attention region and the effective visual field.

2. The content playback apparatus according to claim 1, wherein the viewer information item includes a plurality of viewer IDs for identifying one or more viewers included in the viewer content, and said viewer content selecting unit is configured to select the viewer content associated with a viewer information item including a largest number of a plurality of viewer IDs included in the viewer information item of the first viewer, from among the plurality of viewer information items of the second viewer that are stored in said memory.

3. The content playback apparatus according to claim 2, wherein said viewer content selecting unit is configured to select the viewer content associated with a viewer information item including a smallest number of a plurality of viewer IDs that are not included in the viewer information item of the first viewer, from among the plurality of viewer information items of the second viewer that are stored in said memory.

4. The content playback apparatus according to claim 2, wherein said memory is further configured to store, in advance, the plurality of viewer IDs of the viewers and a plurality of facial images of the viewers in association with each other, and said viewer information obtaining unit is configured to extract a plurality of facial images of the first viewer from the viewer content obtained by said viewer content obtaining unit, and to obtain a plurality of viewer IDs associated with a plurality of facial images that match the extracted facial images, from among the plurality of facial images stored in said memory as the viewer information item of the first viewer.

5. The content playback apparatus according to claim 1, wherein said display control unit is configured to determine, when said viewer content selecting unit selects a plurality of viewer contents including the viewer content, display positions of the plurality of viewer contents in descending order of the matching degrees of the plurality of viewer contents.

6. The content playback apparatus according to claim 1, wherein the viewer information item includes information for identifying a position of a view point of the first viewer on said display screen, and said non-attention region estimation unit is configured to estimate, as the non-attention region, a region outside of a predetermined region including all positions on said display screen at each of which the view point of the first viewer identified by the viewer information item is fixed for a predetermined fixation time or longer within a predetermined time period.

7. The content playback apparatus according to claim 6, wherein said viewer content obtaining unit includes an image capturing unit configured to capture an image of the first viewer who is currently viewing the viewing target content played back by said content playback apparatus, and to output the captured image as the obtained viewer content, and said viewer information obtaining unit is configured to extract the information for identifying the position of the view point of the first viewer, from the image captured by said image capturing unit.

8. The content playback apparatus according to claim 1, wherein the viewer information item includes information for identifying a position of a view point of the first viewer on said display screen, and said effective visual field estimation unit is configured to estimate, as the effective visual field, a predetermined region having the position of the view point of the first viewer identified by the viewer information item as a center.

9. The content playback apparatus according to claim 1, wherein said display control unit is further configured to display the viewer content on said display screen, after a lapse of a predetermined time after displaying the viewing target content on said display screen, and said display control unit further includes:

an attention region estimation unit configured to estimate, on said display screen, respective attention regions that are regions on which a plurality of first viewers including the first viewer focus attention;

an attention region matching degree calculating unit configured to calculate an attention region matching degree that is a matching degree between the attention regions of the plurality of first viewers estimated by said attention region estimation unit; and a display time control unit configured to set the predetermined time longer as the attention region matching degree calculated by said attention region matching degree calculating unit is higher.

10. The content playback apparatus according to claim 9, wherein said attention region matching degree calculating unit is configured to calculate, for each of overlapping regions in each of which two or more of the attention regions of the plurality of first viewers overlap, the attention region matching degree based on a product of (i) an area of the overlapping region, (ii) a length of a time during which the attention regions overlap, and (iii) the number of the plurality of first viewers who focus attention on the overlapping region.

11. The content playback apparatus according to claim 1, wherein said display control unit is further configured to display, when said viewer content selecting unit selects a plurality of viewer contents including the viewer content, the selected plurality of viewer contents on said display screen at different display start times, and said display control unit further includes:

an attention region estimation unit configured to estimate, on said display screen, attention regions that are regions on which a plurality of first viewers including the first viewer focus attention, based on the viewer information item obtained by said viewer information obtaining unit, and to estimate attention regions on which the second viewer focus attention, based on a plurality of viewer information items associated with the plurality of viewer contents, the plurality of viewer information items including the viewer information item of the second viewer;

an attention region matching degree calculating unit configured to calculate attention region matching degrees that are respective matching degrees between the attention regions of the plurality of first viewers and the attention regions of the second viewer, both of the attention regions being estimated by said attention region estimation unit; and a display time control unit configured to determine the display start times of the plurality of viewer contents so that the plurality of viewer contents are displayed on said display screen in descending order of the attention region matching degrees.

12. The content playback apparatus according to claim 1, wherein the executable instructions, when executed by said microprocessor, cause said content playback apparatus to further function as a control unit configured to adjust a play-back time of the viewer content selected by said viewer content selecting unit, and to control said content playback unit to play back the viewer content in which the play-back time is adjusted, wherein said control unit is configured to estimate a viewing time of the viewing target content that is viewed by the first viewer, and to extend or shorten the play-back time of the viewer content to be closer to the estimated viewing time of the viewing target content.

13. The content playback apparatus according to claim 1, wherein said viewer content selecting unit is configured to extract, as a still image, a most exciting portion in each of one or more viewer contents associated with the viewing target content, and to output the extracted one or more still images as the viewer content, and said content playback unit is configured to display the one or more still images as the viewer content in a slideshow mode or a thumbnail mode, before displaying the viewing target content.

14. The content playback apparatus according to claim 1, wherein said viewer content selecting unit is configured to select the viewer content obtained from the second viewer who views the same content as the viewing target content at a place different from a place of the first viewer and at a same time as the first viewer.

15. A content playback method of playing back a viewing target content for a viewer, said method comprising:
obtaining the viewing target content;
detecting a first viewer who views the viewing target content;
selecting, from among a plurality of viewer contents, a viewer content having a matching degree higher than a predetermined threshold, the matching degree indicating an amount of common points between the first viewer detected in said detecting and a second viewer who views a same content as the viewing target content under temporally or spatially a different condition, and each of the plurality of viewer contents including information of video or sound of the second viewer who views the same content; and
playing back the viewing target content obtained in said obtaining and the viewer content selected in said selecting,
wherein said detecting includes:
obtaining a viewer content including information of video or sound of the first viewer who is currently viewing the viewing target content being played back; and
obtaining a viewer information item on the first viewer, from the obtained viewer content,
said content playback method further comprises storing, in association with each other, (i) a plurality of viewer contents of the second viewer that are obtained in the past and (ii) a plurality of viewer information items of the second viewer that are obtained from the viewer content,
said selecting comprises calculating matching degrees between the viewer information item of the first viewer detected in said detecting and each of the plurality of stored viewer information items of the second viewer, and selecting, from among the plurality of stored viewer contents of the second viewer, a viewer content associated with the viewer information item of the second viewer, the viewer information item of the second viewer having one of the matching degrees higher than the predetermined threshold,
said playing back includes displaying, on a display screen, image data included in the viewing target content and the viewer content selected in said selecting,
said content playback method further comprises controlling (i) the display of the viewing target content such that the viewing target content is displayed on the display screen, and (ii) the display of the viewer content such that the viewer content is superimposed on a part of the viewing target content,
said controlling includes:
estimating, on the display screen, a non-attention region that is a region outside of a region on which the first viewer focuses attention;
estimating an effective visual field of the first viewer on the display screen; and
controlling the display of the viewer content such that the viewer content is displayed within the non-attention region and the effective visual field.

16. A non-transitory computer-readable recording medium on which a program is recorded, the program causing a computer that plays back a viewing target content for a viewer to execute:
obtaining the viewing target content;
detecting a first viewer who views the viewing target content;
selecting, from among a plurality of viewer contents, a viewer content having a matching degree higher than a predetermined threshold, the matching degree indicating an amount of common points between the first viewer detected in the detecting and a second viewer who views a same content as the viewing target content under temporally or spatially a different condition, and each of the plurality of viewer contents including information of video or sound of the second viewer who views the same content; and
playing back the viewing target content obtained in the obtaining and the viewer content selected in the selecting,
wherein said detecting includes:
obtaining a viewer content including information of video or sound of the first viewer who is currently viewing the viewing target content being played back; and
obtaining a viewer information item on the first viewer, from the obtained viewer content, said content playback method further comprises storing, in association with each other, (i) a plurality of viewer contents of the second viewer that are obtained in the past and (ii) a plurality of viewer information items of the second viewer that are obtained from the viewer content, said selecting comprises calculating matching degrees between the viewer information item of the first viewer detected in said detecting and each of the plurality of stored viewer information items of the second viewer, and selecting, from among the plurality of stored viewer contents of the second viewer, a viewer content associated with the viewer information item of the second viewer, the viewer information item of the second viewer having one of the matching degrees higher than the predetermined threshold, said playing back includes displaying, on a display screen, image data included in the viewing target content and the viewer content selected in said selecting, said content playback method further comprises controlling (i) the display of the viewing target content such that the viewing target content is displayed on the display screen, and (ii) the display of the viewer content such that the viewer content is superimposed on a part of the viewing target content, said controlling includes:

estimating, on the display screen, a non-attention region that is a region outside of a region on which the first viewer focuses attention;

estimating an effective visual field of the first viewer on the display screen; and controlling the display of the viewer content such that the viewer content is displayed within the non-attention region and the effective visual field.

17. An integrated circuit that plays back, using a content playback apparatus, a viewing target content for a viewer, said circuit comprising:

a viewing target content obtaining circuit configured to obtain the viewing target content;

a viewer detecting circuit configured to detect a first viewer who views the viewing target content played back by said content playback apparatus;

a viewer content selecting circuit configured to select, from among a plurality of viewer contents, a viewer content having a matching degree higher than a predetermined threshold, the matching degree indicating an amount of common points between the first viewer detected by said viewer detecting circuit and a second viewer who views a same content as the viewing target content under temporally or spatially a different condition, and each of the plurality of viewer contents including information of video or sound of the second viewer who views the same content; and a content playback circuit configured to play back the viewing target content obtained by said viewing target content obtaining circuit and the viewer content selected by said viewer content selecting circuit, wherein said viewer detecting circuit includes:

a viewer content obtaining circuit configured to obtain a viewer content including information of video or sound of the first viewer who is currently viewing the viewing target content played back by said content playback apparatus; and a viewer information obtaining circuit configured to obtain a viewer information item on the first viewer, from the viewer content obtained by said viewer content obtaining circuit, said integrated circuit further comprises a memory configured to store, in association with each other, (i) a plurality of viewer contents of the second viewer that are obtained in the past and (ii) a plurality of viewer information items of the second viewer that are obtained from the viewer content, said viewer content selecting circuit is configured to calculate matching degrees between the viewer information item of the first viewer detected by said viewer detecting circuit and each of the plurality of viewer information items of the second viewer stored in said memory, and to select, from among the plurality of viewer contents of the second viewer stored in said memory, a viewer content associated with the viewer information item of the second viewer, the viewer information item of the second viewer having one of the matching degrees higher than the predetermined threshold, the content playback apparatus includes a display screen that displays image data included in the viewing target content and the viewer content selected by said viewer content selecting circuit, said integrated circuit further comprises a display control circuit configured to display the viewing target content on the display screen, and to display the viewer content to be superimposed on a part of the viewing target content, said display control circuit includes:

a non-attention region estimation circuit configured to estimate, on the display screen, a non-attention region that is a region outside of a region on which the first viewer focuses attention; and an effective visual field estimation circuit configured to estimate an effective visual field of the first viewer on the display screen, and said display control circuit is configured to display the viewer content within the non-attention region and the effective visual field.

* * * * *